US011880896B2

(12) United States Patent
Lee et al.

(10) Patent No.: US 11,880,896 B2
(45) Date of Patent: Jan. 23, 2024

(54) VENDOR MANAGEMENT PLATFORM

(71) Applicant: AON RISK SERVICES, INC. OF MARYLAND, New York, NY (US)

(72) Inventors: Lewis C. Lee, Atherton, CA (US); Louise Janice Luvina Bowman, Redmond, WA (US); Samuel Cameron Fleming, Spokane, WA (US); David Christopher Ledgerwood, Spokane, WA (US); Jesus Gonzalez, Brookfield, IL (US)

(73) Assignee: AON RISK SERVICES, INC. OF MARYLAND NY (US)

( * ) Notice: Subject to any disclaimer, the term of this patent is extended or adjusted under 35 U.S.C. 154(b) by 51 days.

(21) Appl. No.: 16/908,523

(22) Filed: Jun. 22, 2020

(65) Prior Publication Data

US 2021/0398234 A1 Dec. 23, 2021

(51) Int. Cl.
*G06Q 50/00* (2012.01)
*G06Q 50/18* (2012.01)
*G06Q 10/10* (2023.01)
*G06Q 40/08* (2012.01)
*G06Q 30/018* (2023.01)
(Continued)

(52) U.S. Cl.
CPC ......... *G06Q 50/184* (2013.01); *G06F 3/0482* (2013.01); *G06F 9/451* (2018.02); *G06Q 10/10* (2013.01); *G06Q 20/1235* (2013.01); *G06Q 30/0185* (2013.01); *G06Q 40/08* (2013.01); *G06Q 50/265* (2013.01); *H04L 67/306* (2013.01)

(58) Field of Classification Search
CPC .................................................. G06Q 50/184
See application file for complete search history.

(56) References Cited

U.S. PATENT DOCUMENTS 7,117,443 B1 10/2006 Zilka et al.
7,949,728 B2 * 5/2011 Rivette .................. G06Q 10/10
709/219
(Continued)

FOREIGN PATENT DOCUMENTS

WO WO-2008140683 A2 * 11/2008 ............. G06Q 10/06

OTHER PUBLICATIONS

Small and mid-sized enterprise intellectual property rights financing mode analysis (Year: 2012).*
(Continued)

*Primary Examiner* — Bruce I Ebersman
(74) *Attorney, Agent, or Firm* — Lee & Hayes, P.C.

(57) ABSTRACT

Systems and methods for generation and use of vendor management platform architectures are disclosed. A compliance component may be utilized to receive user input data indicating supply contracts between a client and a vendor. The user input data may be utilized to determine insurable obligations associated with the supply contract and provide indications as to whether or not the vendor is compliant with the insurable obligation required by the supply contract. An exposure assessment component may be utilized to determine an exposure score associated with a client account and/or a vendor account based on various compliance factors, spending amounts, and/or properties associated with at least one of goods and/or services that a vendor will supply to a client.

20 Claims, 24 Drawing Sheets

(51) Int. Cl.
  *H04L 67/306* (2022.01)
  *G06Q 50/26* (2012.01)
  *G06F 9/451* (2018.01)
  *G06F 3/0482* (2013.01)
  *G06Q 20/12* (2012.01)

(56) References Cited

U.S. PATENT DOCUMENTS

| | | | |
|---|---|---|---|
| 11,188,985 B1* | 11/2021 | Lietz | G06Q 50/184 |
| 2001/0047276 A1* | 11/2001 | Eisenhart | G06F 21/6236 |
| | | | 705/37 |
| 2003/0036945 A1* | 2/2003 | Del Vecchio | G06Q 10/10 |
| | | | 705/310 |
| 2003/0050804 A1 | 3/2003 | Hendershot | |
| 2003/0182213 A1 | 9/2003 | Kansal | |
| 2003/0212604 A1 | 11/2003 | Cullen, III | |
| 2005/0049891 A1* | 3/2005 | Wilson | G06Q 10/10 |
| | | | 705/311 |
| 2005/0125358 A1 | 6/2005 | Levin et al. | |
| 2007/0027799 A1 | 2/2007 | Manelis et al. | |
| 2007/0073561 A1* | 3/2007 | Malackowski | G06Q 50/18 |
| | | | 705/4 |
| 2008/0201211 A1 | 8/2008 | Frank et al. | |
| 2009/0083176 A1* | 3/2009 | Sandor | G06Q 40/04 |
| | | | 705/37 |
| 2009/0144125 A1* | 6/2009 | Bandyopadhyay | |
| | | | G06Q 10/0631 |
| | | | 705/7.11 |
| 2009/0182606 A1* | 7/2009 | Chug | G06Q 10/0639 |
| | | | 705/30 |
| 2009/0327039 A1* | 12/2009 | Cox | G06Q 30/06 |
| | | | 705/7.29 |
| 2010/0088244 A1 | 4/2010 | Frank et al. | |
| 2011/0173093 A1* | 7/2011 | Psota | G06Q 40/02 |
| | | | 705/26.35 |
| 2012/0046770 A1 | 2/2012 | Becker et al. | |
| 2012/0203708 A1* | 8/2012 | Psota | G06Q 30/06 |
| | | | 705/347 |
| 2014/0258032 A1* | 9/2014 | Psota | G06Q 30/0609 |
| | | | 705/26.35 |
| 2014/0304505 A1* | 10/2014 | Dawson | G06F 21/6227 |
| | | | 713/165 |
| 2015/0039359 A1* | 2/2015 | Katakol | G06Q 10/063 |
| | | | 705/7.11 |
| 2015/0073929 A1* | 3/2015 | Psota | G06Q 30/0605 |
| | | | 705/26.2 |
| 2015/0193709 A1* | 7/2015 | Ramesh Babu | G06Q 10/0637 |
| | | | 705/7.28 |
| 2015/0193872 A1 | 7/2015 | Ivanoff et al. | |
| 2017/0103466 A1* | 4/2017 | Syed | G06Q 50/188 |
| 2017/0206604 A1* | 7/2017 | Al-Masoud | G06Q 40/08 |
| 2021/0158451 A1* | 5/2021 | Blazek | G06Q 40/08 |
| 2021/0398221 A1 | 12/2021 | Lee et al. | |
| 2021/0398222 A1 | 12/2021 | Lee et al. | |
| 2021/0398223 A1 | 12/2021 | Lee et al. | |

OTHER PUBLICATIONS

Development, Management and Use of Intellectual Property.*
Contractual and regulatory compliance challenges in grid computing environments, IEEE (Year: 2005).*
European innovation procurement "Pre-Commercial-Procurement" and Cloud computing by reference to the research project "Cloud for Europe", IEEE (Year: 2017).*
Office Action for U.S. Appl. No. 16/908,569, dated Oct. 22, 2021, Lee, "Vendor Management Platform", 43 Pages.
The International Search Report and Written Opinion for PCT App No. PCT/US21/38455, dated Sep. 28, 2021, 9 pages.
Office Action for U.S. Appl. No. 16/908,551, dated Mar. 25, 2022, Lee, "Vendor Management Platform", 24 Pages.
Office Action for U.S. Appl. No. 16/908,569, dated May 4, 2022, Lee, "Vendor Management Platform", 49 Pages.
Office Action for U.S. Appl. No. 16/908,551, dated Sep. 16, 2022, Lee, "Vendor Management Platform", 11 pages.
Extending support for contracts in ebXML; Proceedings Workshop on Information Technology for Virtual Enterprises. ITVE 2001 (pp. 119-127); J. Cole, Z. Milosevic, Jan. 29, 2001. (Year: 2001 ).
Office Action for U.S. Appl. No. 16/908,587, dated Mar. 9, 2023, Inventor #1 Lewis C. Lee, "Vendor Management Platform", 12 pages.
Office Action for U.S. Appl. No. 16/908,569, dated Dec. 22, 2022, Lee, "Vendor Management Platform" 21 pages.
Office Action for U.S. Appl. No. 16/908,551, dated Feb. 2, 2023, Lee, "Vendor Management Platform", 12 pages.
Office Action for U.S. Appl. No. 16/908,587, dated Sep. 15, 2023, Lewis C. Lee, "Vendor Management Platform", 18 pages.
Sergeyev, et al., "Agent-Based Modelling and Simulation of Inter-Organizational Integration and Coordination of Supply Chain Participants", 2019 IEEE 21st Conference on Business Informatics (CBI), 2019, vol. 1, pp. 436-444.
Office Action for U.S. Appl. No. 16/908,569, dated Jun. 23, 2023, Lewis C. Lee, "Vendor Management Platform", 23 pages.

* cited by examiner

Provider
Vendor Verification Program

- Home
- Vendors — 310
- Templates

Client Company Name

Vendors

[Actions ▼] — 314

[Filter] — 314   [Reset Filters]   ← ⋮

312

| Name | Template Name | Contract # | Evergreen | Start Date | ID | End Date | Status |
|---|---|---|---|---|---|---|---|
| ☐ > Vendor - 001 | | | | | 11284 | | (Pending Contract Acceptance) |
| ☐ ∨ Vendor - 002 | | | | | 58796 | | (Compliant) |
| | Vendor – 002 Contract_1 | VCN2-001 | Yes | 18-Mar-2020 | | 18-Mar-2021 | Accepted |

[Add Contract] — 314

[Add Contract] ⋮

Contracts (1)

Insurance (1)
Required Insurance | 1yr Extending Reporting | Required Coverage | Current Coverage ∨ Standalone Cyber Insurance | Starts 18-Mar-2020 – Ends 18-Mar-2021 | $2,000,000 $200,000 DED | $2,000,000 $200,000 DED Insurance Provider Name
View COI Status  Terminate > Errors and Omissions Insurance | | $2,000,000 $200,000 DED | $2,000,000 $200,000 DED
> Intellectual Property Infringement Insurance | | $3,000,000 $300,000 DED | $3,000,000 $300,000 DED ☐ > Vendor - 003 | | | | | 32654 | | (Non-Compliant Insurance) ⋮

- Company Profile
- Support
- Account

```
┌─────────────────────────────────────────────────────────────────┐
│ Receive, from a first entity associated with a client account,  │
│ first data indicating a business and a predefined vendor        │
│ grouping associated with a vendor account, the vendor grouping  │
│ indicating an insurable obligation associated with the vendor   │
│ account                                                          │
│ 1802                                                             │
└─────────────────────────────────────────────────────────────────┘
                                 │
                                 ▼
┌─────────────────────────────────────────────────────────────────┐
│ Receive, from a second entity associated with the vendor        │
│ account, second data including a business classification of the │
│ business associated with the vendor account                     │
│ 1804                                                             │
└─────────────────────────────────────────────────────────────────┘
                                 │
                                 ▼
┌─────────────────────────────────────────────────────────────────┐
│ Determine a threshold coverage value corresponding to the       │
│ insurable obligation based at least in part on the first data   │
│ and the second data                                              │
│ 1806                                                             │
└─────────────────────────────────────────────────────────────────┘
                                 │
                                 ▼
┌─────────────────────────────────────────────────────────────────┐
│ Determine a level of compliance associated with the insurable   │
│ obligation based at least in part on the threshold coverage     │
│ value                                                            │
│ 1808                                                             │
└─────────────────────────────────────────────────────────────────┘
                                 │
                                 ▼
┌─────────────────────────────────────────────────────────────────┐
│ Generate a graphical user interface (GUI) configured to display │
│ on at least one of a first computing device associated with the │
│ client account or a second computing device associated with the │
│ vendor account, the GUI indicating the level of compliance      │
│ associated with the insurable obligation                        │
│ 1810                                                             │
└─────────────────────────────────────────────────────────────────┘
```

FIG. 18

VENDOR MANAGEMENT PLATFORM

BACKGROUND

Determining a type of insurable obligation, amount of coverage, and an exposure level indicating an insurance risk in association with a supply contract between a client and vendor can be valuable. However, determining if a vendor is compliant with the contract, particularly in a large supply chain, is difficult. Described herein are improvements in technology and solutions to technical problems that can be used to, among other things, identify and assess insurable obligations in a vendor supply chain.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3B illustrates an example user interface for displaying data associated with a client account representing a vendor listing and/or one or more actionable elements.

FIG. 18 illustrates an example flow diagram of another example process for the vendor management platform to utilize vendor account data and/or client account data to determine a level of compliance of a vendor account associated with an intellectual-property related obligation required by a supply contract.

DETAILED DESCRIPTION

Figure 1:
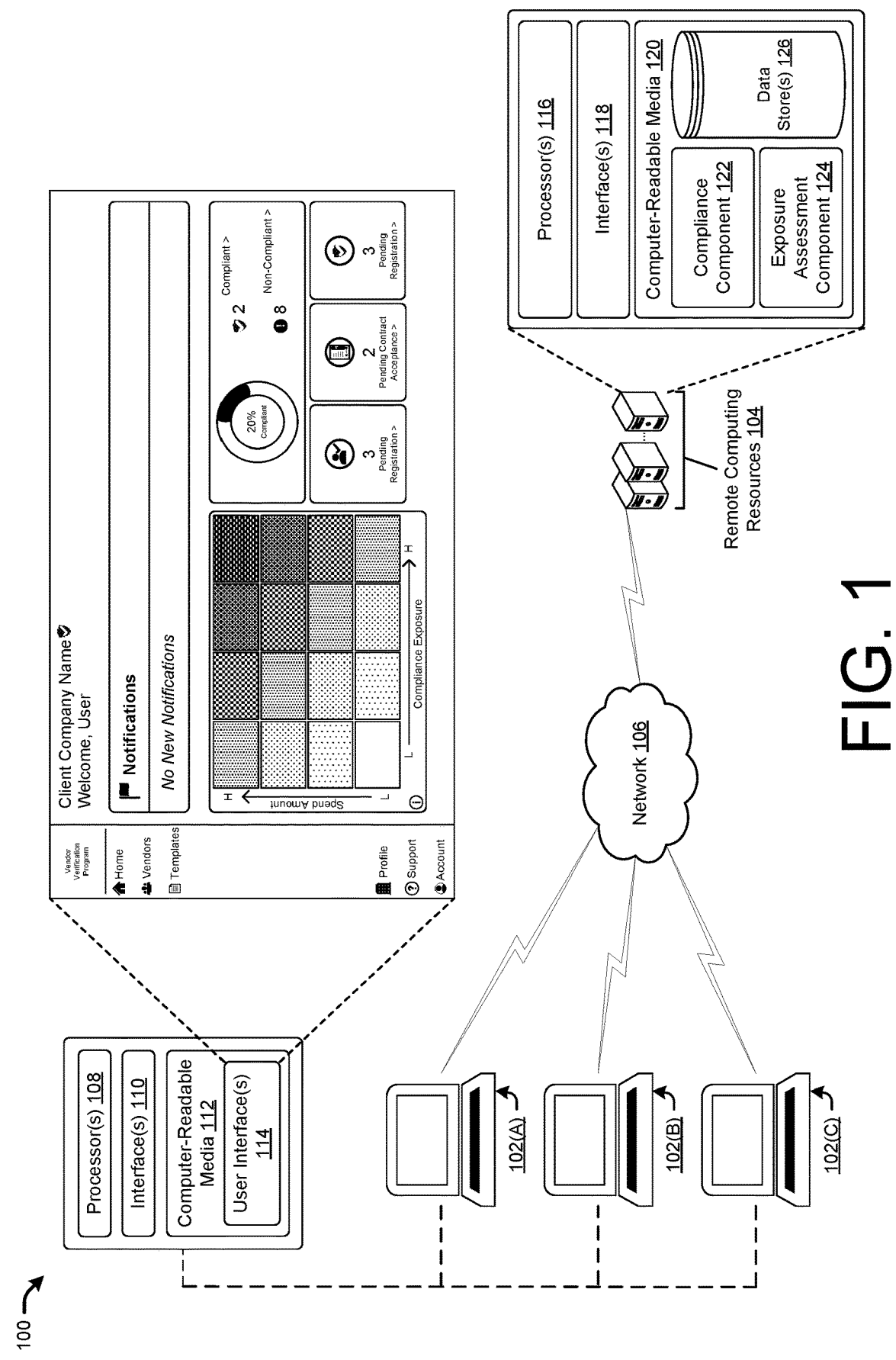
FIG. 1 illustrates a schematic diagram of an example environment for a vendor management platform architecture.

Systems and methods for generation and use of a vendor management platform are disclosed. Take, for example, an entity that would find it beneficial to utilize a platform to identify supply contracts indicating insurable obligations associated with vendor entities supplying goods and/or services to the entity and to determine which vendor entities have the insurance required and are thus in compliance with the supply contact. For example, a client entity may offer various products containing components and/or utilizing technologies that were manufactured and/or developed by a vendor entity. The client entity may specify a performance standard of the supplied components so that they meet the requirements for the product and have various vendor entities that supply the components and/or technologies to them. However, keeping track of the various vendor entities and the supply contracts, particularly the indemnification clauses within those contracts, that govern those vendors may be difficult. Generally, an indemnification clause defines under what terms a vendor entity will elect supply of the desired component. For example, the clause may define under what terms would the vendor entity accept an indemnity obligation in the event that a patent is asserted by a third-party entity against that component and/or technology that is being supplied. However, the vendor entity may resist paying out the indemnity obligation. For example, the vendor entity may not agree that they are the responsible party in that the component and/or technology may be supplied by a sub-contracted vendor entity, the patent covers a technology not utilizing the supplied component and/or technology, or the vendor entity lacks an insurance policy with coverage that is sufficient to satisfy the indemnity obligation. In light of this, a vendor management platform that is configured to identify supply contracts between a client entity and multiple vendor entities and determine which vendor entities have insurance policies that comply with the supply contract would be beneficial. Additionally, periodic compliance checks, client and/or vendor entity risk assessment, and an enforced baseline insurance coverage may be desirable to make compliance determinations across multi-vendor supply contracts.

Described herein is a vendor management platform that is configured to produce compliance determinations associated with supply contracts between clients and vendors and to produce exposure scores associated with client accounts and/or vendor accounts, respectively. The system may include a compliance component, an exposure assessment component, and a datastore. Generally, the compliance component may be utilized to identify supply contracts entered into between a client entity and multiple vendor entities to determine which vendor entities have insurance policies that comply with the supply contract. The exposure assessment component may be utilized to assess the level of exposure associated with a client account and/or a vendor account, generate an exposure score the client account and/or vendor account based on the level of exposure, and/or generate a ranking of the client account and/or vendor account based on the exposure score relative to the exposure scores of additional client accounts and/or vendor accounts. The datastore may be a secure datastore accessible by the system and utilized to securely store the supply contracts between client entity and vendor entity, account data associated with client accounts and/or vendor accounts, and/or insurance templates. The vendor management platform may be accessible to users via one or more user interfaces that may be configured to display information associated with the supply contracts, the client account(s), and/or the vendor account(s). Additionally, or alternatively, the user interface(s) may be configured to receive user input.

For example, the vendor management platform may be configured to receive data representing a supply contract. The supply contacts may be provided to the vendor management platform by users uploading an electronic copy of the supply contract, an identifier of the supply contract, data representing information associated with the supply contract, and/or by the vendor management platform fetching or otherwise retrieving those supply contract(s). While examples described here discuss the analysis of indemnification clauses from the supply contracts, other components and/or clauses of supply contracts may also be analyzed. Furthermore, when supply contracts are described herein as being received and/or sent to the vendor management platform, it should be understood that such sending and/or receiving includes the sending and/or receiving of data representing those supply contracts. The data representing the supply contracts may be received at the vendor management platform and may be stored in the contract library database that is associated with the vendor management platform.

The vendor management platform may be configured to display a user interface for presenting information associated with the supply contracts and/or analysis of the supply contracts. For example, the user interface may include selectable portions that when selected, may present information associated with the compliance component and or information associated with the exposure assessment component. Additionally, or alternatively, the vendor management platform may be configured to cause the user interface may present the information associated with the compliance component and or information associated with the exposure assessment component using different views with respect to a client account and/or a vendor account. When the user accesses the vendor management platform using a client account, the user interface may be caused to display the information associated with the compliance component and/ or information associated with the exposure assessment component using a view configured for a client account type, such that the user interface may only display information that is relevant to a client. Additionally, or alternatively, when the user accesses the vendor management platform using a vendor account, the user interface may be caused to display the information associated with the compliance component and/or information associated with the exposure assessment component using a view configured for a vendor account type, such that the user interface only display information that is relevant to a vendor. The user interface may include one or more information windows associated with the determined client account and/or vendor account view for displaying the information associated with the compliance component and or information associated with the exposure assessment component in an organized manner on a device associated with the client account and/or the vendor account.

When a user accesses the vendor management platform using a client account, the user interface may be caused to display selectable portions, or pages, that present portions of the information associated with the compliance component and/or information associated with the exposure assessment component information using information windows relevant to that page. Pages associated with a client account may include, for example, a home page, a vendors page, and/or a templates page. As mentioned above, each page presents information using information windows relevant to that page.

When a client account accesses the home page, the user interface may be caused to display information windows associated with the home page. For example, the user interface may be caused to display a client notifications window, an exposure overview window, and/or one or more compliance overview windows. The one or more compliance overview windows may include, for example, a compliance overview window and one or more compliance indication windows.

In some examples, the client notifications window may include one or more notifications presenting information associated with the client account and/or vendor accounts associated with the client account. For example, the client notifications window may include a notification that a vendor account in which the client account has entered into a contract with is no longer in compliance with an associated supply contract. In some examples, the exposure overview window may include a graphic representing an analysis of the level of exposure associated with a client account. In some examples, the graphic may be a data graph, such as, for example, a heatmap, a bar graph, a line graph, and/or any trend analysis graph. For example, the graphic may include a heat map comprised of cells, each cell indicating a level of exposure associated with a grouping of supply relationships between a client and its vendors. The level of exposure may be based on an amount of annual spending between a client and a vendor, a level of compliance exposure associated with a vendor account, and/or an age of the vendor account and/or the contract associated with the client account and the vendor account. For example, a client that has entered into a supply contract with a vendor in which the annual amount of spending is high relative to additional annual amounts of spending associated with additional supply contracts, and the vendor account has a low level of compliance with the contract associated with the client, then the relationship between the client account and that vendor account may be represented as a high level of exposure on the heatmap. Additionally, or alternatively, as that supply contract ages, then the level of exposure representing the relationship between the client account and the vendor account may continue to increase. Additionally, or alternatively, each cell of the heatmap may include a visual indication of the exposure level, such as, for example, a color. Additionally, or alternatively, each cell of the heatmap may include an indication of the amount of spending between the client account and each of the vendor accounts that are associated with that cell. Additionally, or alternatively, each cell of the heatmap may include an indication of the age of an associated supply contract and/or an amount of time a vendor account has resided in that cell (exposure category). In some examples, the one or more compliance overview windows may include a compliance overview window including content to provide an indication of the number of compliant vendor accounts that are associated with the client account. Additionally, or alternatively, the compliance overview window may include content to provide an indication of the number of non-compliant vendor accounts that are associated with the client account. In some examples, the content may include a percentage, a graphic indicating the number, or the like. Additionally, or alternatively, the compliance overview window may include one or more compliance indication windows that may include an indication of the number of vendor accounts associated with the client account that are pending registration, the number of vendor accounts associated with the client account that are pending contract acceptance, and/or the number of vendor accounts associated with the client account that have non-compliant insurance.

When a client account accesses the vendors page, the user interface may be caused to display information windows associated with the vendors page. For example, the user interface may be caused to display a vendor listing window and/or one or more action elements. The one or more action elements being configured to, when selected, cause the system to perform an associated action.

In some examples, the vendor listing window may include a listing of the vendor accounts that have entered into a supply contract with the client account. The listing of the vendor accounts may be presented using individual cells for each vendor account. In some examples, each cell may include an indication of the name of the vendor, an indication of the vendor identification number, and an indication of compliance status representing the vendors compliance with one or more contract(s) associated with the client. Additionally, or alternatively, each cell may actionable and include additional information associated with the vendor account, such as, for example, an indication of the contracts between the client account and the vendor account, information associated with the contracts, required insurance coverage associated with the vendor account, current insurance coverage associated with the vendor account, and/or information associated with the insurance coverage. In some examples, the one or more action elements may include a filter action element configured to filter the listing of the vendor accounts as selected. Additionally, or alternatively, the one or more action elements may include an add contract action element configured to allow a client to add a new contract between the client account and a vendor account.

When a client account accesses the templates page, the user interface may be caused to display information windows associated with the templates page. For example, the user interface may be caused to display a template listing window and/or one or more action elements. The one or more action elements being configured to, when selected, cause the system to perform an associated action.

In some examples, the template listing window may include a listing of the supply contract templates defined by the client account. The supply contract templates may specify a class of vendor that the template applies to and may include one or more insurance requirements. The listing of the supply contract templates may be presented using individual cells for each template. In some examples, each cell may include information indicating the template name, a description of the template, one or more insurance requirements of a vendor, and/or whether the template is active or inactive. In some examples, the one or more action elements may include a new template action element configured to allow a client to create a new supply contract template for use in the system.

When the user accesses the vendor management platform using a vendor account, the user interface may be caused to display selectable portions, or pages, that present portions of the information associated with the compliance component and/or information associated with the exposure assessment component information using information windows relevant to that page. Pages associated with a vendor account may include, for example, a home page, an insurance page, and/or a clients page. As mentioned above, each page presents information using information windows relevant to that page.

When a vendor account accesses the home page, the user interface may be caused to display information windows associated with the home page. For example, the user interface may be caused to display a vendor notifications window and/or an insurance coverages window.

In some examples, the vendor notification window may include one or more notifications presenting information associated with the vendor account and/or client accounts associated with the vendor account. For example, the client notifications window may include a notification of a new contract between a client account and the vendor account that required action by the vendor. In some examples, the insurance coverages window may include information associated with the insurance coverages associated with the vendor account. In some examples, the insurance coverages associated with the vendor account may be one of multiple lines of coverage, such as, for example, errors and omissions coverage, standalone cyber coverage, intellectual property infringement coverage, general liability coverage, and the like. In some examples the information associated with the insurance coverages may be presented using individual cells for each line of insurance coverage. For example, each cell may include information associated with the insurance coverages indicating the line of insurance coverage, a required amount of insurance coverage, a current amount of insurance coverage, and/or an indication of compliance. In some examples, the indication of compliance may include, for example, compliant and non-compliant. In some examples, the indication of compliance may be based on the current amount of insurance coverage relative to the required amount of insurance coverage. In some examples, the required amount of insurance coverage for a line of insurance coverage may be determined by analyzing all of the contracts associated with the vendor account that include the line of insurance coverage and selecting a value that meets or exceeds the required amount of insurance coverage for all of the contracts that include the line of insurance coverage.

When a vendor account accesses the insurance page, the user interface may be caused to display information windows associated with the insurance page. For example, the user interface may be caused to display a line of coverage listing window and/or a line of coverage information window.

In some examples, the line of coverage listing window may include a listing of the lines of insurance coverages associated with the vendor account and an associated indication of compliance associated with the line of coverage. The listing of the lines of insurance coverages may be presented on the user interface as selectable cells that when selected, may cause the line of coverage information window to present information associated with the selected line of insurance coverage. For example, the line of coverage information window may include information indicating the selected line of insurance coverage, a required amount of insurance coverage, a current amount of insurance coverage, insurance policies corresponding to the line of coverage that the vendor account has uploaded, insurance applications corresponding to the line of coverage that the vendor has applied for, the level of compliance associated with the line of coverage, and/or one or more actionable elements. In some examples, the one or more actionable elements may include a get a quote actionable element configured to, when selected, present an insurance application associated with the line of coverage to the vendor account. In some examples, the compliance component may determine a required amount of insurance coverage that is sufficient to bring all of the vendors contracts that include the selected line of insurance into compliance with the terms specified therein. Additionally, or alternatively, the insurance component may determine a required amount of insurance coverage that is sufficient to bring only a single contract associated with the vendor into compliance with the terms specified therein. In some examples, the one or more actionable elements may include an add a policy actionable element configured to, when selected, allow the vendor to upload additional policies associated with the selected line of coverage. Additionally, or alternatively, when selected, the add a policy actionable element may cause the user interface to display one or more additional elements configured to intake user input from the vendor account.

When a vendor account accesses the clients page, the user interface may be caused to display information windows associated with the clients page. For example, the user interface may include a client listing window and/or a client information window.

In some examples, the client listing window may include a listing of the client accounts that are associated with the vendor account, such that the vendor account has entered into respective contracts with the client accounts. The listing of the client accounts may be presented on the user interface as selectable cells that when selected, may cause the client information window to present information associated with the selected client account. For example, the client information window may include information indicating insurance requirements associated with a client account and/or contracts associated with a client account. In some examples, the information indicating the insurance requirements associated with the client account may include information indicating a required line of insurance, a required amount of insurance coverage associated with the required line of insurance, a current amount of insurance coverage associated with the required line of insurance, and/or a level of compliance associated with the required line of insurance. In some examples, the required amount of insurance coverage for a line of insurance coverage may be determined by analyzing all of the contracts associated with the vendor account that include the line of insurance coverage and selecting a value that meets or exceeds the required amount of insurance coverage for all of the contracts that include the line of insurance coverage. Additionally, or alternatively, the information indicating the contracts associated with a client account may include blocks of information associated with each contract, each block of information indicating a company name associated with the vendor account, an identification number associated with the contract, a start date associated with the contract, an end date associated with the contract, and/or whether or not the contract is an evergreen contract. Additionally, or alternatively, the information indicating the contracts associated with a client account may include a recommendation associated with a contract. In some examples, the recommendation is generated dynamically by a recommendation component executing as a subcomponent of the compliance component. In some examples, the recommendation may include an actionable element configured such that, when selected, causes the user interface to present information corresponding to the recommendation.

Additionally, or alternatively, the user interface may be caused to display selectable portions, or pages, that present portions of information associated with the client account and/or the vendor account relevant to that page. Pages associated with the client account and/or the vendor account may include, for example, a company profile page, a support page, and/or an account page. For example, when a client account and/or a vendor account accesses the company profile page, the user interface may be caused to display information windows associated with the company profile page. For example, the user interface may be caused to display a company information window, a company location window, and/or a company revenue window. Additionally, or alternatively, the user interface may include one or more actionable elements. In some examples, the actionable elements may be configured such that, when selected, the user interface may allow user input to edit the information displayed on the company profile page.

As mentioned above, the vendor management platform may include a compliance component utilized to identify supply contracts entered into between a client entity and one or more vendor entities to determine which of the vendor entities have insurance policies that comply with the supply contract. In some examples, the compliance component may include one or more sub-components. For example, the compliance component may include a recommendation component, an insurance component, and/or a user interface generation component. In some examples, the compliance component may utilize the one or more sub-components to make determinations and/or generate data to be displayed on the user interface.

The user interface generation component may be configured to generate user interface element(s) and/or user interface pages described above using data received from other components utilized by the system. In some examples, the user interface generation component may be communicatively coupled to the other components stored thereon the computer-readable media. In some examples, the user interface generation component may generate user interfaces configured to present information associated with client accounts and/or vendor accounts. Additionally, or alternatively, the user interface generation component may generate user interfaces including confidential information and may be configured to be accessible by only users with predetermined qualifications. For example, the user interface generation component may cause only a portion of information to be displayed based on the type of account that is accessing the system. For example, when a user accesses the system, the system may determine that the account type of the account that the user has utilized to access the system may be one of, for example, an internal attorney, a purchasing manager, and/or an exposure manager. In some examples, the user interface generation component may generate notifications to send to the client accounts and/or vendor accounts including indications of compliance/non-compliance, dynamic recommendations, and/or information associated with client accounts and/or vendor accounts.

The recommendation component may be configured to generate recommendations that the system has determined to improve compliance levels associated with contracts. In some examples, the recommendation component may be configured to generate recommendations associated with a client account, a vendor account, and/or a supply contract. In some examples, the recommendation component may utilize data associated with the client account, vendor account, and/or supply contract to generate the recommendations. For example, the recommendation component may generate a dynamic recommendation based on a level of compliance associated with the client account, the vendor account, and/or the contract. In some examples, the recommendation component may determine that a vendor account may improve the associated level of compliance with a supply contract associated with a client account by performing one or more actions and may generate a recommendation including the one or more actions. Additionally, or alternatively, the recommendation may include an actionable element configured such that, when selected, causes the user interface to present information corresponding to the recommendation and/or causes the user interface to transition to a page associated with the recommendation. Take for example a client account having an associated supply contract with a vendor account. The recommendation component may generate recommendation data such that the user interface may include a recommendation including an indication of the vendor accounts level of compliance with the contract, such as, for example, pending registration, pending contract acceptance, non-compliant, and/or compliant. For example, if the vendor account has completed registration and has accepted the contract but does not meet the insurance requirements specified by the contract, the recommendation may include an indication that the vendor account has accepted the contract, is non-compliant with the contract, and/or may recommend completing the insurance requirements associated with the contract.

In some examples, the insurance component may include one or more sub-components. For example, the insurance component may include a policy upload component and/or a policy quote component. In some examples, the insurance component may utilize the one or more sub-components to make determinations and/or to generate data to be displayed on the user interface. Additionally, or alternatively, the insurance component may be configured to make determinations associated with insurable obligations of a supply contract. In some examples, the insurable obligations may require different lines of coverage such as, for example, errors and omissions insurance, intellectual-property related insurance (e.g., intellectual-property infringement insurance), standalone cyber insurance, and/or general liability insurance. For example, the insurance component may utilize an insurable obligation of a vendor account that is specified by a client account to determine a supply contract template associated with the supply contract. In some examples, the insurance component may be configured to generate data to enable user interface elements for accepting user input. For example, the insurance component may be communicatively coupled to the compliance component and/or the user interface generation component and may receive one or more indications of compliance associated with a client account and/or a vendor account.

Take for example a client account having an associated supply contract with a vendor account. In this example, the vendor account may have completed registration and has accepted the supply contract but does not meet the insurance requirements specified for the contract. The vendor may utilize elements of the user interface to input current line of coverage information associated with the vendor account and/or upload a current line of coverage and the policy upload component may receive and process the current line of coverage. In some examples, elements of the user interface may be configured to receive information indicating an insurance company associated with the insurance coverage, a coverage amount associated with the insurance coverage, a deductible amount associated with the insurance coverage, a period of time in which the insurance coverage is valid, an extended reporting period associated with the insurance coverage, and/or a virtual document representing the insurance coverage. Additionally, or alternatively, the policy quote component may communicate with the user interface generation component to generate a user interface including an insurance application associated with an insurable obligation required by a supply contract such that a vendor may utilize elements of the user interface to receive a quote from the system for a line of coverage including the required insurance coverages required by the supply contract. Additionally, or alternatively, the quote from the system may be for a line of coverage that does not include the required insurance coverages required by the supply contract, such that the system may provide a quote for any line of coverage including any insurance coverage value.

In some examples, the compliance component may be configured to make various determinations, data generations, and facilitate the communication of data across multiple components of the system. For example, the compliance component may be configured to determine if the parties that have entered into supply contracts are in compliance with the insurable obligations of the supply contract. Additionally, or alternatively, the compliance component may be configured to determine a level of compliance associated with a client account and/or a vendor account, such as, for example, pending registration, pending contract acceptance, non-compliant, and/or compliant. In some examples, the compliance component may determine that the vendor account associated with a supply contract has not completed registration with the system and may determine for the vendor account associated with the supply contract, a level of compliance indicating that the vendor account is pending registration. Additionally, or alternatively, the compliance component may determine that the vendor account associated with the supply contract has completed registration with the system but has not accepted the terms of the supply contract and may determine for the vendor account associated with the supply contract, a level of compliance indicating that the vendor account is pending acceptance of the contract. Additionally, or alternatively, the compliance component may determine that the vendor account associated with the supply contract has completed registration with the system, has accepted terms of the supply contract, and may determine for the vendor account associated with the supply contract, a level of compliance indicating that the vendor account has compliant insurance and/or non-compliant insurance. For example, the compliance component may determine if the vendor account associated with a supply contract has a current insurance policy that covers the insurable obligation of the supply contract. For example, the compliance component may identify an insurance coverage value corresponding to the insurable obligation and a threshold coverage value associated with the insurable obligation. If the insurance coverage value satisfies the threshold coverage value associated with the insurable obligation, then the vendor account is at least in compliance with that insurable obligation associated with the supply contract. Additionally, or alternatively, if one or more insurance coverage values corresponding respective insurable obligations of a supply contract do not meet the one or more threshold coverage values associated with the respective insurable obligations, then the vendor account may be determined to not be in compliance with the supply contract.

The compliance component may be configured to periodically determine that the vendor account is in compliance with a supply contract. For example, the compliance component may determine, for the vendor account and at a first time, a first level of compliance associated with the supply contract, utilizing any of the techniques described above. The compliance component may also determine, for the vendor account and at a second time that is after the first time, a second level of compliance associated with the supply contract. In some examples, the first level of compliance may indicate that the vendor account is in compliance with the supply contract and the second level of compliance may indicate that the vendor account is not in compliance with the supply contract. The compliance component may then utilize the user interface generation component to generate a notification to send to the client account and/or the vendor account including an indication that the vendor account is no longer in compliance with the supply contract. Additionally, or alternatively, the first level of compliance may indicate that the vendor account is not in compliance with the supply contract and the second level of compliance may indicate that the vendor account is in compliance with the supply contract. The compliance component may then utilize the user interface generation component to generate a notification to send to the client account and/or the vendor account including an indication that the vendor account is now in compliance with the supply contract.

The compliance component may be configured to determine compliance associated with sub-vendor accounts, such that a sub-vendor account has entered into a supply contract with a vendor account indicating that the sub-vendor will supply at least one of goods or services to the vendor account. Take for example, a supply contract associated with a client account and vendor account. The compliance component may determine a level of compliance associated with the vendor account and respective levels of compliance associated with each sub-vendor account that is providing goods and/or services to the vendor account. For example, the compliance component may determine that the vendor account has an insurance policy that includes an insurance coverage value corresponding to the insurable obligation that satisfies a threshold coverage value associated with the insurable obligation and may determine that the vendor account is in compliance with the supply contract. Additionally, or alternatively, the compliance component may determine that the sub-vendor account does not have an insurance coverage value corresponding to the insurable obligation that satisfies a threshold coverage value associated with the insurable obligation, and thus may determine that the sub-vendor account is not in compliance with the supply contract. The compliance component may then determine that the vendor account is not in compliance with the supply contract based at least on the non-compliant sub-vendor account associated with the vendor account.

The compliance component may be configured to determine, for a supply contract between a client account and a vendor account, a level of compliance associated with a vendor account based at least on previous supply contracts associated with the vendor account. For example, the compliance component may be configured to identify, based on the vendor account data, previous supply contracts associated with the vendor account and additional client accounts. The compliance component may then determine if the previous contracts include an insurance coverage value corresponding to an insurable obligation of the supply contract. The compliance component may then determine, for the vendor account, a level of compliance associated with the supply contract, and may determine that the level of compliance is sufficient to meet the contractual obligations associated with the contract. The compliance component may then utilize the user interface generation component to cause the user interface to display, to the client account and/or the vendor account, an indication that the level of compliance is sufficient and/or an indication that the previous contracts associated with the vendor account include the insurance coverage value associated with the insurable obligation.

As mentioned above, the vendor management platform may include an exposure assessment component be utilized to assess the level of exposure associated with a client account and/or a vendor account, generate an exposure score the client account and/or vendor account based on the level of exposure, and/or generate a ranking of the client account and/or vendor account based on the exposure score relative to the exposure scores of additional client accounts and/or vendor accounts. In some examples, the exposure assessment component may include one or more sub-components. For example, the exposure assessment component may include a scoring component. In some examples, the exposure assessment component may utilize the one or more sub-components to make determinations and/or generate data to be displayed on the user interface.

In some examples, the scoring component may be configured to generate an exposure score associated with a client account and/or a vendor account. Additionally, or alternatively, the scoring component may be configured to communicate with the user interface generation component to generate a user interface including a graphic representing the exposure score of a vendor account. Additionally, or alternatively, the scoring component may be configured to generate a ranking of client accounts and/or vendor accounts and may communicate with the user interface generation component to generate a user interface configured to display a listing of the client accounts and/or vendor accounts according to the ranking. Additionally, or alternatively, the scoring component may be configured to identify one or more intellectual-property assets associated with a vendor account and determine respective intellectual-property asset scores associated with the individual intellectual-property assets.

In some examples, the scoring component may be configured to generate an exposure score associated with a client account and/or a vendor account. For example, the scoring component may determine an exposure score associated with a vendor account based at least in part on a level of compliance of a vendor account associated with an insurable obligation, an age of the supply contract between a client account and a vendor account, and/or an annual value associated with the at least one of goods or services associated with the supply contract. Additionally, or alternatively, the scoring component may determine a first exposure score associated with a vendor account based at least in part on the level of compliance with the contract, a second exposure score associated with the vendor account based at least in part on the annual value associated with the at least one of goods and services, and/or a third exposure score associated with the age of a supply contract and/or an amount of time the vendor account has held a level of compliance associated with a supply contract. Additionally, or alternatively, the scoring component may be configured to generate an exposure score associated with a client account based at least in part on an aggregated level of compliance associated with the client account, the aggregated level of compliance based at least in part on the level of compliance associated with respective vendor accounts associated with the client account and the annual value associated with the at least one of goods or services associated with the respective vendor accounts.

In some examples, the scoring component may be configured to communicate with the user interface generation component to generate a user interface including a graphic representing the exposure score of a vendor account. In other words, the exposure score may represent, for a vendor account, the contract compliance status and/or the duration of time since the vendor account joined the vendor management platform. For example, the scoring component may determine, based at least in part on the first exposure score, a first exposure sub-grouping of multiple first exposure sub-groupings associated with respective levels of compliance. Additionally, or alternatively, the scoring component may determine, based at least in part on the second exposure score, a second exposure sub-grouping of multiple second exposure sub-groupings associated with respective amounts of annual value. The scoring component may then determine, based at least in part on the first exposure sub-grouping and the second exposure sub-grouping, an exposure grouping of multiple exposure groupings indicating respective exposure scores associated with vendor accounts. In some examples, the exposure score may be altered based on the duration of time since the vendor account joined the vendor management platform, such that, an older account that has not become compliant with the contractual obligations specified in associated supply contracts may have an increased exposure score. Additionally, or alternatively, the user interface generation component may generate a graphic representing the exposure score of the vendor account. For example, the user interface generation component may generate a heatmap displaying the multiple exposure groupings and an indication of the vendor account in association with the determined exposure grouping.

In some examples, the scoring component may be configured to generate a ranking of the vendor accounts associated with a client account. For example, the scoring component may generate a ranking associated with a vendor account based at least in part on the exposure score associated with the vendor account relative to one or more additional exposure scores of additional vendor accounts associated with the client account. Additionally, or alternatively, the scoring component may communicate with the user interface generation component to generate a user interface configured to display a listing of the client accounts and/or vendor accounts according to the ranking. For example, the user interface component may generate a graphical user interface configured to cause display of the exposure score of the vendor account relative to the one or more additional exposure scores of the additional vendor accounts based at least in part on the ranking.

In some examples, the vendor account may be associated with one or more intellectual-property assets. The scoring component may be configured to identify the one or more intellectual-property assets associated with the vendor account and determine respective intellectual-property asset scores associated with the individual intellectual-property assets. The scoring component may determine that the one or more intellectual-property assets include subject matter associated with at least one of goods or services associated with a supply contract of the vendor account. The scoring component may determine the intellectual-property asset score indicating at least a comparative breadth of an intellectual-property asset relative to one or more additional intellectual-property assets. The scoring component may then determine if the intellectual-property asset score satisfies a threshold intellectual-property score. In some examples, if the intellectual-property asset score satisfies the threshold intellectual-property asset score, the threshold coverage value that is associated with an insurable obligation associated with the at least one of goods or services may be decreased. Additionally, or alternatively, if the intellectual-property asset score does not satisfy the threshold intellectual-property asset score, the threshold coverage value may be increased.

In some examples, the exposure assessment component may be configured to make various determinations, data generations, and facilitate the communication of data across multiple components stored thereon the computer-readable media. The exposure assessment component may be configured to determine a level of exposure associated with a client account and/or a vendor account using various client account data and/or vendor account data. For example, the exposure assessment component may identify data indicating an insurance claim history associated with the vendor account and may utilize this data when determining the level of exposure associated with the client account. Additionally, or alternatively, the exposure assessment component may determine a product type associated with the goods and/or services offered by a vendor account and may adjust the level of exposure associated with the vendor account based on the product type. Additionally, or alternatively, the exposure assessment component may determine a technical field associated with the goods and/or services offered by the vendor account and may adjust the level of exposure associated with the vendor account based at least on part on an aggregated vendor exposure level associated with the technical field. Additionally, or alternatively, the exposure assessment component may identify data indicating a standard industrial classification (SIC), corresponding to an industry, associated with a client account and/or a vendor account, may determine a litigation exposure associated with the industry based on a litigation history of the industry, and may adjust the level of exposure associated with the client account and/or the vendor account based on the litigation exposure associated with the industry. Additionally, or alternatively, the exposure assessment component may determine an aggregated level of exposure of vendor accounts associated with a client account based on a vendor type associated with the respective vendor accounts and may adjust the level of exposure associated with the client account based at least in part on the aggregated level of exposure.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for a vendor management platform architecture. The architecture 100 may include, for example, one or more client-side devices 102(a)-(c) and/or vendor-side devices 102(a)-(c), also described herein as electronic devices 102(a)-(c), and/or a remote computing resources 104 associated with a vendor management platform. Some or all of the devices and systems may be configured to communicate with each other via a network 106.

The electronic devices 102 may include components such as, for example, one or more processors 108, one or more network interfaces 110, and/or computer-readable media 112. The computer-readable media 112 may include components such as, for example, one or more user interfaces 114. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative and should not be considered the exclusive example of the components of the electronic device 102.

By way of example, the user interface(s) 114 may include one or more of the user interfaces described elsewhere herein, such as the user interfaces described with respect to FIGS. 3A-4C, corresponding to a client home user interface, a client vendors user interface, a client templates user interface, a vendor home user interface, a vendor insurance user interface, a vendor clients user interface, a company profile user interface, etc. It should be understood that while the user interface(s) 114 are depicted as being a component of the computer-readable media 112 of the electronic devices 102(a)-(c), the user interface(s) 114 may additionally or alternatively be associated with the remote computing resources 104. The user interface(s) 114 may be configured to display information associated with the vendor management platform and to receive user input associated with the vendor management platform.

The remote computing resources 104 may include one or more components such as, for example, one or more processors 116, one or more network interfaces 118, and/or computer-readable media 120. The computer-readable media 120 may include one or more components, such as, for example, a compliance component 122, an exposure assessment component 124, and/or one or more data store(s) 126. The compliance component 122 may be configured to receive user input data as described herein for indicating that a supply contract has been entered into between a client associated with a client account and a vendor associated with a vendor account, the contract indicating that the vendor will supply at least one of goods or services to the client. The compliance component 122 may also be configured to utilize the input data, as well as other data associated with a contract, a client account, and/or a vendor account in question, to identify an insurable obligation associated with the vendor account, an insurance coverage value corresponding to the insurable obligation, and/or a threshold coverage value associated with the insurable obligation. The compliance component 122 may also be configured to determine if the vendor account and/or sub-contracted vendor accounts associated with the vendor account are in compliance with the supply contract between the client and the vendor. The exposure assessment component 124 may be configured to determine an exposure score associated with a client account and/or a vendor account indicating a level of exposure and adjust the score periodically based on a number of determining factors. The exposure assessment component 124 may also be configured to generate a ranking of vendor accounts associated with a client account and present the ranked vendor accounts using various graphical user interface elements, graphics, and/or lists. The data store(s) 126 of the remote computing resources 104 may include data corresponding to client accounts and/or vendor accounts, insurance templates, and/or contracts. Those contracts may include, for example, supply contracts and/or non-supply legal contracts. The contracts may be stored with respect to a contract library of the data store 126. The client accounts and/or vendor accounts may be stored with respect to user account data of the data store 126. The insurance templates may be stored with respect to insurance template library of the data store 126.

Figure 2:
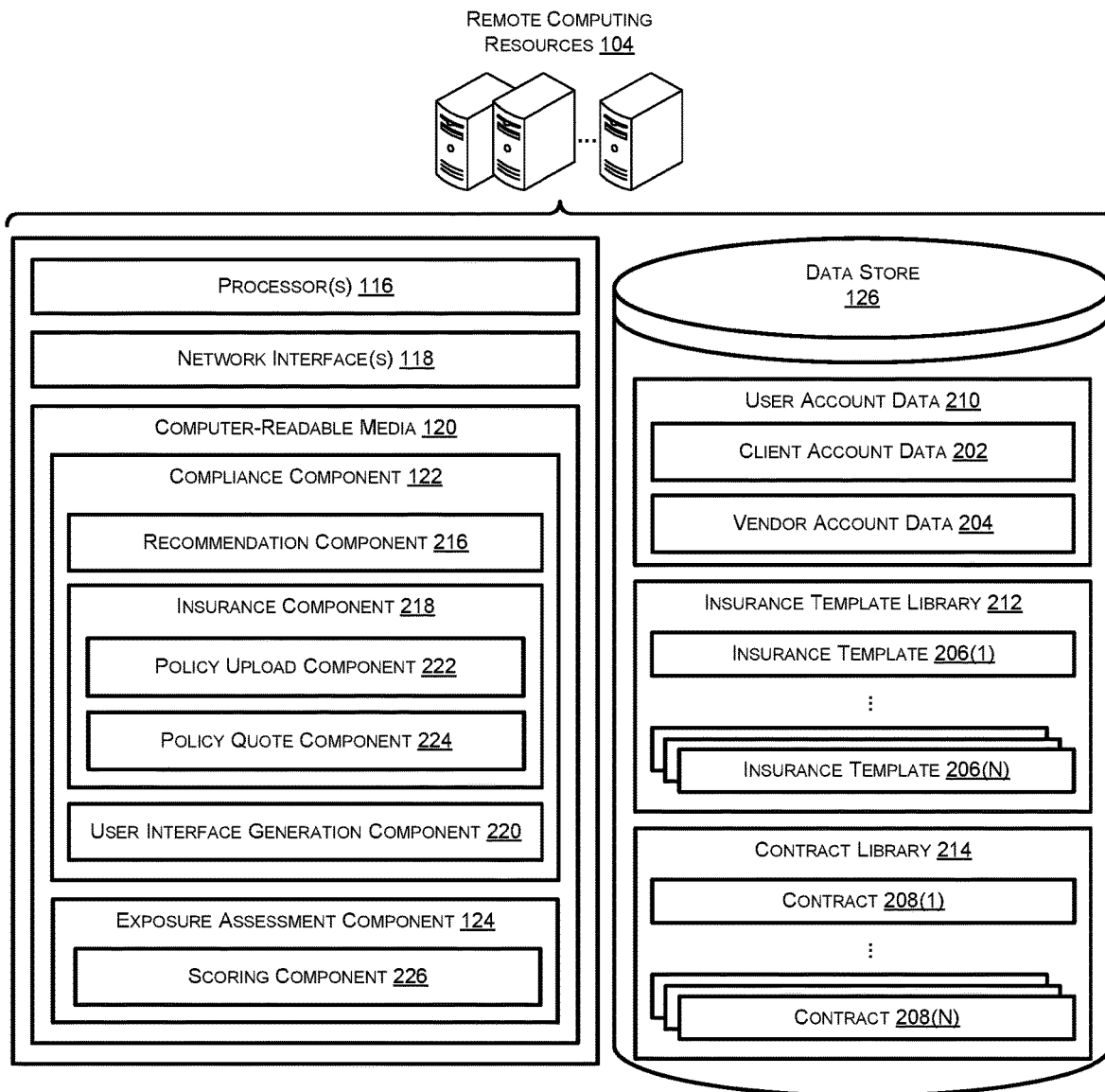
FIG. 2 illustrates a component diagram of example components of a remote computing resource for the vendor management platform.

As shown in FIG. 2, several of the components of the remote computing resources 104 and/or the electronic devices 102 and the associated functionality of those components as described herein may be performed by one or more of the other systems and/or by the electronic devices 102. Additionally, or alternatively, some or all of the components and/or functionalities associated with the electronic devices 102 may be performed by the remote computing resource(s) 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 108 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 116 may possess its own local memory, which also may store program components, program data, and/or one or more operating systems.

The computer-readable media 112 and/or 120 may include volatile and nonvolatile memory, removable and non-removable media implemented in any method or technology for storage of information, such as computer-readable instructions, data structures, program component, or other data. Such computer-readable media 112 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 and/or 120 may be implemented as computer-readable storage media ("CRSM"), which may be any available physical media accessible by the processor(s) 108 and/or 116 to execute instructions stored on the computer-readable media 112 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 112 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or 118 may enable messages between the components and/or devices shown in system 100 and/or with one or more other remote systems, as well as other networked devices. Such network interface(s) 110 and/or 118 may include one or more network interface controllers (NICs) or other types of transceiver devices to send and receive messages over the network 106.

For instance, each of the network interface(s) 110 and/or 118 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 118 may include a wide area network (WAN) component to enable message over a wide area network.

In some instances, the remote computing resources 104 may be local to an environment associated with the electronic device(s) 102. For instance, the remote computing resources 104 may be located within the electronic device(s) 102. In some instances, some or all of the functionality of the remote computing resources 104 may be performed by the electronic device(s) 102. Also, while various components of the remote computing resources 104 have been labeled and named in this disclosure and each component has been described as being configured to cause the processor(s) 108 and/or 116 to perform certain operations, it should be understood that the described operations may be performed by some or all of the components and/or other components not specifically illustrated.

FIG. 2 illustrates a component diagram of example components 100 of a remote computing resource 104 for the vendor management platform. The remote computing resource 104 may include one or more components such as, for example, one or more processor(s) 116, one or more network interfaces 118, and/or computer-readable media 120. The computer-readable media may include one or more components, such as, for example, a compliance component 122, an exposure assessment component 124, and/or one or more data stores 126. Some or all of the components and functionalities may be configured to communicate with each other.

The data store(s) 126 may include data corresponding to client account(s) 202, vendor account(s) 204, insurance templates 206(1)-(N), and/or contracts 208(1)-(N). Those contracts 208 may include, for example, supply contracts and/or non-supply legal contracts. The client account data 202 and/or the vendor account data 204 may be stored with respect to user account data 210. The insurance templates 206(1)-(N) may be stored with respect to an insurance template library 212. The contracts 208 may be stored with respect to a contract library 214.

As mentioned with respect to FIG. 1, the compliance component 122 may be configured to receive user input data as described herein for indicating that a supply contract 208 has been entered into between a client associated with client account data 202 and a vendor associated with vendor account data 204, the contract 208 indicating that the vendor will supply at least one of goods or services to the client. The compliance component 122 may also be configured to utilize the input data, as well as other data associated with a contract 208, client account data 202, and/or vendor account data 204, to identify an insurable obligation associated with the vendor account, an insurance coverage value corresponding to the insurable obligation, and/or a threshold coverage value associated with the insurable obligation. The compliance component 122 may also be configured to determine if the vendor account and/or sub-contracted vendor accounts associated with the vendor account are in compliance with the supply contract 208 between the client and the vendor. The compliance component 122 may include one or more components, such as, for example, a recommendation component 216, an insurance component 218, and/or a user interface generation component 220. Additionally, or alternatively, the compliance component 122 may be configured to perform the operations described below with respect to the one or more components.

The recommendation component 216 may be configured to generate recommendations to present via a user interface configured to display on a computing device associated with the client account and/or the vendor account, the recommendations including recommended steps and/or actions a user can perform to bring a vendor account into compliance with a supply contract 208. In some examples, the recommendation component 216 may utilize client account data 202, vendor account data 204, and/or data representing the supply contract 208 to generate the recommendations. For example, the recommendation component 216 may generate a dynamic recommendation based on a level of compliance associated with the client account, the vendor account, and/or the contract 208. In some examples, the recommendation component 216 may determine that a vendor account may improve the associated level of compliance with a supply contract 208 associated with a client account by performing one or more actions and may generate a recommendation including the one or more actions. Additionally, or alternatively, the recommendation component 216 may generate a recommendation including an actionable element configured such that, when selected, causes the user interface to present information corresponding to the recommendation and/or causes the user interface to transition to a page associated with the recommendation.

The insurance component 218 may be configured to make determinations associated with insurable obligation(s) required by a supply contract 208. In some examples, the insurance component 218 may determine that the insurable obligation(s) require different lines of coverage such as, for example, errors and omissions insurance, intellectual-property related insurance (e.g., intellectual-property infringement insurance), standalone cyber insurance, and/or general liability insurance. For example, the insurance component 218 may identify data representing an insurable obligation associated with a vendor account and utilize the data to determine an insurance template 206 associated with the supply contract 208. Additionally, or alternatively, the insurance component 218 may be configured to generate data to enable user interface elements for accepting user input. For example, the insurance component 218 may be communicatively coupled to the compliance component 122 and/or the user interface generation component and may receive one or more indications of compliance associated with a client account and/or a vendor account. The insurance component 218 may include one or more components, such as, for example, a policy upload component 222 and/or a policy quote component 224. Additionally, or alternatively, the insurance component 218 may be configured to perform the operations described below with respect to the one or more components.

The policy upload component 222 may be configured to receive user input data as described herein for indicating current line of coverage information associated with the vendor account. In some examples, the policy upload component 222 may be configured to receive information indicating an insurance company associated with the insurance coverage, a coverage amount associated with the insurance coverage, a deductible amount associated with the insurance coverage, a period of time in which the insurance coverage is valid, an extended reporting period associated with the insurance coverage, and/or a virtual document representing the insurance coverage.

The policy quote component 224 may be configured to receive user input data as described herein for indicating a desired line of coverage that a vendor may wish to obtain through the vendor management platform. In some examples, the policy quote component 224 may be configured to generate data to be presented via a user interface displayed on a computing device associated with a vendor account, the data representing an insurance application associated with an insurable obligation required by a supply contract 208. Additionally, or alternatively, the policy quote component 224 may be configured to generate a quote for a line of coverage including the required insurance coverages required by the supply contract 208. In some examples, the quote may be associated with a line of coverage that includes an insurance coverage value configured to bring the vendor account into compliance with all of the vendor accounts associated supply contracts 208. Additionally, or alternatively, the policy quote component 224 may be configured to generate a quote including an amount of insurance coverage that is sufficient to bring only a single supply contract 208 associated with the vendor account into compliance with the terms specified therein.

The user interface generation component 220 may be configured to generate user interface element(s) and/or user interface pages described below with respect to FIGS. 3A-4C using data received from other components utilized by the vendor management platform. In some examples, the user interface generation component 220 may be communicatively coupled to the other components stored thereon the computer-readable media 120. In some examples, the user interface generation component 220 may generate user interfaces configured to present information associated with client account data 202 and/or vendor account data 204.

Additionally, or alternatively, the user interface generation component 220 may generate user interfaces including confidential information and may be configured to be accessible by only users with predetermined qualifications. For example, the user interface generation component 220 may cause only a portion of information to be displayed based on the type of account that is accessing the platform. For example, when a user accesses the system, the user interface generation component 220 may determine that the account type of the account that the user has utilized to access the system may be one of, for example, an internal attorney, a purchasing manager, and/or an exposure manager, and may only include a portion of the information to be displayed that is associated with that account type. In some examples, the user interface generation component 220 may generate notifications to send to the client accounts and/or vendor accounts including indications of compliance/non-compliance, dynamic recommendations, and/or information associated with client accounts and/or vendor accounts.

The compliance component 122 may also be configured to make various determinations, data generations, and facilitate the communication of data across multiple components of the platform. For example, the compliance component may be configured to determine if a vendor that has entered into a supply contract 208 with a client is in compliance with the insurable obligations required by the supply contract 208. Additionally, or alternatively, the compliance component 122 may also be configured to determine a level of compliance associated with a client account and/or a vendor account, such as, for example, pending registration, pending contract acceptance, non-compliant, and/or compliant. In some examples, the compliance component 122 may also be configured to determine that the vendor account associated with a supply contract has not completed registration with the vendor management platform and may determine for the vendor account associated with the supply contract 208, a level of compliance indicating that the vendor account is pending registration. Additionally, or alternatively, the compliance component 122 may also be configured to determine that the vendor account associated with the supply contract 208 has completed registration with the vendor management platform but has not accepted the terms of the supply contract 208 and may determine for the vendor account associated with the supply contract 208, a level of compliance indicating that the vendor account is pending acceptance of the contract 208. Additionally, or alternatively, the compliance component 122 may also be configured to determine that the vendor account associated with the supply contract 208 has completed registration with the system, has accepted terms of the supply contract 208, and may determine for the vendor account associated with the supply contract 208, a level of compliance indicating that the vendor account has compliant insurance and/or non-compliant insurance.

The compliance component 122 may also be configured to periodically determine that the vendor account is in compliance with a supply contract 208. For example, the compliance component 122 may be configured to determine, for the vendor account and at a first time, a first level of compliance associated with the supply contract 208, utilizing any of the techniques described above. The compliance component 122 may also be configured to determine, for the vendor account and at a second time that is after the first time, a second level of compliance associated with the supply contract 208. In some examples, the first level of compliance may indicate that the vendor account is in compliance with the supply contract 208 and the second level of compliance may indicate that the vendor account is not in compliance with the supply contract 208. The compliance component 122 may also be configured to communicate data to the user interface generation component 220 to generate a notification to send to the client account and/or the vendor account including an indication that the vendor account is no longer in compliance with the supply contract 208. Additionally, or alternatively, the first level of compliance may indicate that the vendor account is not in compliance with the supply contract 208 and the second level of compliance may indicate that the vendor account is in compliance with the supply contract 208. The compliance component 122 may also be configured to communicate the data to the user interface generation component 220 to generate a notification to send to the client account and/or the vendor account including an indication that the vendor account is now in compliance with the supply contract 208.

The compliance component 122 may also be configured to determine compliance associated with sub-vendor accounts, such that a sub-vendor account has entered into a supply contract 208 with a vendor account indicating that the sub-vendor will supply at least one of goods or services to the vendor account. Take for example, a supply contract 208 associated with a client account and vendor account. The compliance component 122 may determine a level of compliance associated with the vendor account and respective levels of compliance associated with each sub-vendor account that is providing goods and/or services to the vendor account. The compliance component 122 may also be configured to determine that the vendor account data 204 indicates a line of coverage that includes an insurance coverage value corresponding to the insurable obligation that satisfies a threshold coverage value associated with the insurable obligation and may determine that the vendor account is in compliance with the supply contract 208. Additionally, or alternatively, the compliance component 122 may also be configured to determine that the sub-vendor account data indicates that the sub-vendor does not have a line of coverage that includes an insurance coverage value corresponding to the insurable obligation that satisfies a threshold coverage value associated with the insurable obligation, and thus may determine that the sub-vendor account is not in compliance with the supply contract 208. The compliance component 122 may also be configured to determine that the vendor account is not in compliance with the supply contract based at least on the non-compliant sub-vendor account associated with the vendor account.

The compliance component 122 may also be configured to determine, for a supply contract 208 between a client account and a vendor account, a level of compliance associated with a vendor account based at least on the vendor account data 202 and/or client account data 202 indicating previous supply contracts 208 associated with the vendor account. For example, the compliance component may be configured to identify, based on the vendor account data 202, previous supply contracts associated with the vendor account and additional client accounts. The compliance component 122 may also be configured to determine if the previous contracts include an insurance coverage value corresponding to an insurable obligation of the supply contract 208. The compliance component 122 may also be configured to determine, for the vendor account, a level of compliance associated with the supply contract 208 and may determine that the level of compliance is sufficient to meet the contractual obligations associated with the contract 208. The compliance component 122 may also be configured to transmit data to the user interface generation component 220 to cause the user interface to display, on a computing device associated with the client account and/or the vendor account, an indication that the level of compliance is sufficient and/or an indication that the previous contracts 208 associated with the vendor account include the insurance coverage value associated with the insurable obligation.

As mentioned above with respect to FIG. 1, the exposure assessment component 124 may be configured to determine an exposure score associated with a client account and/or a vendor account indicating a level of exposure and adjust the score periodically based on a number of determining factors. The exposure assessment component 124 may also be configured to generate a ranking of vendor accounts associated with a client account and present the ranked vendor accounts using various graphical user interface elements, graphics, and/or lists. The exposure assessment component 124 may include one or more components, such as, for example, a scoring component 226.

The scoring component 226 may be configured to generate an exposure score associated with a client account and/or a vendor account. Additionally, or alternatively, the scoring component 226 may also be configured to communicate with the user interface generation component 220 to generate a user interface including a graphic representing the exposure score of a vendor account. In some examples, the exposure score may represent, for a vendor account, the contract compliance status and/or the duration of time since the vendor account joined the vendor management platform. Additionally, or alternatively, the scoring component 226 may also be configured to generate a ranking of client accounts and/or vendor accounts and may communicate with the user interface generation component to generate a user interface configured to display a listing of the client accounts and/or vendor accounts according to the ranking. Additionally, or alternatively, the scoring component 226 may be configured to identify one or more intellectual-property assets associated with a vendor account and determine respective intellectual-property asset scores associated with the individual intellectual-property assets.

In some examples, the scoring component 226 may be configured to generate an exposure score associated with a client account and/or a vendor account. For example, the scoring component 226 may be configured to determine an exposure score associated with a vendor account based at least in part on a level of compliance of a vendor account associated with an insurable obligation and/or an annual value associated with the at least one of goods or services associated with the supply contract 208. Additionally, or alternatively, the scoring component 226 may also be configured to determine a first exposure score associated with a vendor account based at least in part on the level of compliance with the contract 208, a second exposure score associated with the vendor account based at least in part on the annual value associated with the at least one of goods and services, and/or a third exposure score based on the duration of time since the vendor account joined the vendor management platform. Additionally, or alternatively, the scoring component 226 may also be configured to generate an exposure score associated with a client account based at least in part on an aggregated level of compliance associated with the client account, the aggregated level of compliance based at least in part on the level of compliance associated with respective vendor accounts associated with the client account and the annual value associated with the at least one of goods or services associated with the respective vendor accounts.

In some examples, the scoring component 226 may also be configured to communicate with the user interface generation component 220 to generate a user interface including a graphic representing the exposure score of a vendor account. For example, the scoring component 226 may be configured to determine, based at least in part on the first exposure score, a first exposure sub-grouping of multiple first exposure sub-groupings associated with respective levels of compliance. Additionally, or alternatively, the scoring component 226 may be configured to determine, based at least in part on the second exposure score, a second exposure sub-grouping of multiple second exposure sub-groupings associated with respective amounts of annual value. The scoring component 226 may be configured to determine, based at least in part on the first exposure sub-grouping and the second exposure sub-grouping, an exposure grouping of multiple exposure groupings indicating respective exposure scores associated with vendor accounts. In some examples, the exposure score may be altered based on the duration of time since the vendor account joined the vendor management platform, such that, an older account that has not become compliant with the contractual obligations specified in associated supply contracts may have an increased exposure score. Additionally, or alternatively, the user interface generation component 220 may generate a graphic representing the exposure score of the vendor account. For example, the user interface generation component 220 may generate a heatmap displaying the multiple exposure groupings and an indication of the vendor account in association with the determined exposure grouping.

In some examples, the scoring component 226 may also be configured to generate a ranking of the vendor accounts associated with a client account. For example, the scoring component 226 may be configured to generate a ranking associated with a vendor account based at least in part on the exposure score associated with the vendor account relative to one or more additional exposure scores of additional vendor accounts associated with the client account. Additionally, or alternatively, the scoring component 226 may also be configured to communicate with the user interface generation component 220 to generate a user interface configured to display a listing of the client accounts and/or vendor accounts according to the ranking. For example, the user interface component 220 may generate a graphical user interface configured to cause display of the exposure score of the vendor account relative to the one or more additional exposure scores of the additional vendor accounts based at least in part on the ranking.

In some examples, a vendor account may be associated with one or more intellectual-property assets. The scoring component 226 may also be configured to identify the one or more intellectual-property assets associated with a vendor account and determine respective intellectual-property asset scores associated with the individual intellectual-property assets. The scoring component 226 may be configured to determine that the one or more intellectual-property assets include subject matter associated with at least one of goods or services associated with a supply contract 208 of the vendor account. The scoring component 226 may also be configured to determine the intellectual-property asset score indicating at least a comparative breadth of an intellectual-property asset relative to one or more additional intellectual-property assets. The scoring component 226 may be configured to determine if the intellectual-property asset score satisfies a threshold intellectual-property score. In some examples, the scoring component 226 may be configured to decrease the threshold coverage value that is associated with an insurable obligation associated with the at least one of goods or services if the intellectual-property asset score satisfies the threshold intellectual-property asset score. Additionally, or alternatively, the scoring component 226 may be configured to increase the threshold coverage value if the intellectual-property asset score does not satisfy the threshold intellectual-property asset score.

The exposure assessment component 124 may also be configured to determine a level of exposure associated with a client account and/or a vendor account using various client account data 202 and/or vendor account data 204. For example, the exposure assessment component 124 may be configured to identify data indicating an insurance claim history associated with the vendor account and may utilize this data when determining the level of exposure associated with the client account. Additionally, or alternatively, the exposure assessment 124 component may also be configured to determine a product type associated with the goods and/or services offered by a vendor account and may adjust the level of exposure associated with the vendor account based on the product type. Additionally, or alternatively, the exposure assessment component 124 may also be configured to determine a technical field associated with the goods and/or services offered by the vendor account and may adjust the level of exposure associated with the vendor account based at least on part on an aggregated vendor exposure level associated with the technical field. Additionally, or alternatively, the exposure assessment component 124 may also be configured to identify data indicating a standard industrial classification (SIC), corresponding to an industry, associated with a client account and/or a vendor account, may determine a litigation exposure associated with the industry based on a litigation history of the industry, and may adjust the level of exposure associated with the client account and/or the vendor account based on the litigation exposure associated with the industry. Additionally, or alternatively, the exposure assessment component 124 may also be configured to determine an aggregated level of exposure of vendor accounts associated with a client account based on a vendor type associated with the respective vendor accounts and may adjust the level of exposure associated with the client account based at least in part on the aggregated level of exposure.

Figure 3A:
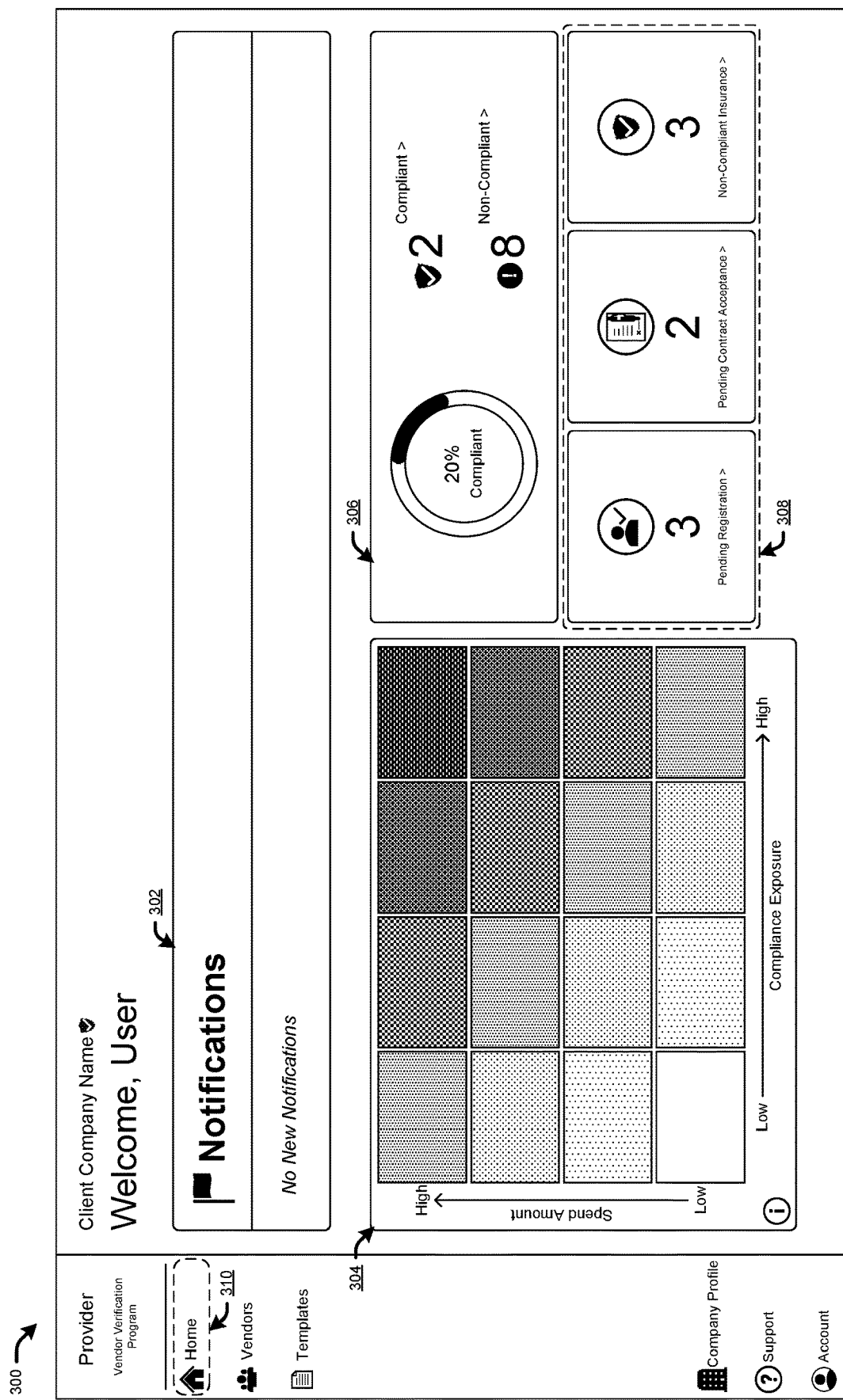
FIG. 3A illustrates an example user interface for displaying data associated with a client account representing notifications, exposure overview, and/or compliance overview.
Figure 3C:
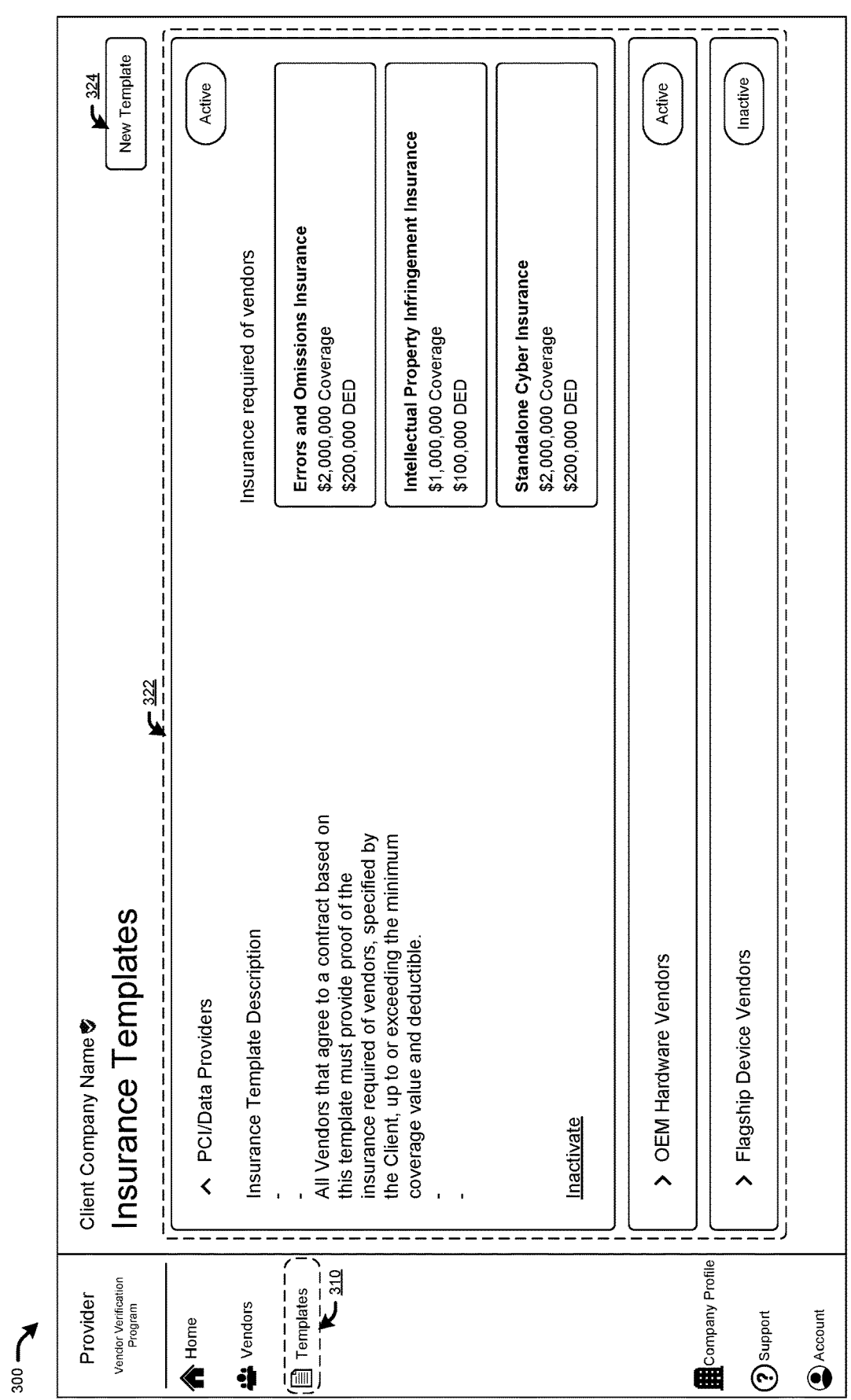
FIG. 3C illustrates an example user interface for displaying data associated with a client account representing an insurance template listing and/or one or more actionable elements.

FIGS. 3A-3C illustrate conceptual diagrams of example user interface(s) 300 that may receive contracts and utilize the vendor management platform to manage and enforce compliance of vendors associated with the contracts. The user interface(s) 300 may be generated by the user interface generation component 220 described with respect to FIG. 2 above. The user interface(s) 300 may be displayed on a display of an electronic device associated with a client account, such as the electronic device 102 as described with respect to FIG. 1 above. Additionally, or alternatively, the user interface(s) 300 may be displayed on a display of an electronic device associated with a vendor account, such that a client account may be configured to perform vendor account actions. While example user interface(s) 300 are shown in FIGS. 3A-3C, the user interface(s) 300 are not intended to be construed as a limitation, and the user interface(s) 300 may be configured to present any of the data described herein.

FIG. 3A illustrates an example user interface 300 configured to present data associated with a client account representing notifications, exposure overview, and/or compliance overview. The data may be presented utilizing a notifications window 302, an exposure overview window 304, a compliance overview window 306, and/or one or more compliance indication windows 308. Additionally, or alternatively, the user interface 300 may include a page indicator 310 indicating the current page that is being presented on the user interface. The user interface 300 may be displayed on a display of an electronic device associated with a client account, such as, for example, the electronic device 102 as described with respect to FIG. 1 above.

In some examples, the notifications window 302 may include one or more notifications configured to present information associated with the client account and/or vendor accounts associated with the client account. For example, the client notifications window 302 may include a notification that a vendor account in which the client account has entered into a contract with is no longer in compliance with an associated supply contract.

In some examples, the exposure overview window 304 may include a graphic representing an analysis of the level of exposure associated with a client account. In some examples, the graphic may be a data graph, such as, for example, a heatmap, a bar graph, a line graph, and/or any trend analysis graph. For example, the graphic may include a heat map comprised of cells, each cell indicating a level of exposure associated with a grouping of supply relationships between a client and its vendors. The level of exposure may be based on an amount of annual spending between a client and a vendor and/or a level of compliance exposure associated with a vendor account. For example, a client that has entered into a supply contract with a vendor in which the annual amount of spending is high relative to additional annual amounts of spending associated with additional supply contracts, and the vendor account has a low level of compliance with the contract associated with the client, then the relationship between the client account and that vendor account may be represented as a high level of exposure on the heatmap. Additionally, or alternatively, each cell of the heatmap may include a visual indication of the exposure level, such as, for example, a color. Additionally, or alternatively, each cell of the heatmap may include an indication of the amount of spending between the client account and all of the vendor accounts that are associated with that cell.

In some examples, the one or more compliance overview windows 306 may include a compliance overview window 306 including content to provide an indication of the number of compliant vendor accounts that are associated with the client account. Additionally, or alternatively, the compliance overview window 306 may include content to provide an indication of the number of non-compliant vendor accounts that are associated with the client account. In some examples, the content may include a percentage, a graphic indicating the number, or the like. Additionally, or alternatively, the compliance overview window 306 may include one or more compliance indication windows 308 that may include an indication of the number of vendor accounts associated with the client account that are pending registration, the number of vendor accounts associated with the client account that are pending contract acceptance, and/or the number of vendor accounts associated with the client account that have non-compliant insurance.

FIG. 3B illustrates an example user interface 300 configured to present data associated with a client account representing a vendor listing and/or one or more actionable elements. The data may be presented utilizing a vendor listing window 312 and/or one or more actionable element windows 314. Additionally, or alternatively, the user interface 300 may include a page indicator 310 indicating the current page that is being presented on the user interface. The user interface 300 may be displayed on a display of an electronic device associated with a client account, such as, for example, the electronic device 102 as described with respect to FIG. 1 above.

In some examples, the vendor listing window 312 may include a listing of the vendor accounts that have entered into a supply contract with the client account. The vendor listing window 312 may present the listing of the vendor accounts using individual cells for each vendor account. In some examples, each cell may include an indication of the name of the vendor, an indication of the vendor identification number, and an indication of compliance status representing the vendors compliance with one or more contract(s) associated with the client. Additionally, or alternatively, each cell may actionable and include additional information associated with the vendor account, such as, for example, an indication of the contracts between the client account and the vendor account, information associated with the contracts, required insurance coverage associated with the vendor account, current insurance coverage associated with the vendor account, and/or information associated with the insurance coverage.

In some examples, the one or more actionable element windows 314 may include a filter action element configured to filter the listing of the vendor accounts as selected. Additionally, or alternatively, the one or more actionable element windows 314 may include an add contract action element configured to allow a client to add a new contract between the client account and a vendor account. Additionally, or alternatively, the one or more actionable element windows 314 may include an actions action element configured to allow a client to perform one or more actions with respect to the listing of vendor accounts. Additionally, or alternatively, the one or more actionable element windows 314 may include a reset filters action element configured to reset or remove any filters that have been applied using the filter action element.

FIG. 3C illustrates an example user interface 300 configured to present data associated with a client account representing an insurance template listing and/or one or more actionable elements. The data may be presented utilizing an insurance template listing window 322 and/or a one or more actionable element windows 324. Additionally, or alternatively, the user interface 300 may include a page indicator 310 indicating the current page that is being presented on the user interface. The user interface 300 may be displayed on a display of an electronic device associated with a client account, such as, for example, the electronic device 102 as described with respect to FIG. 1 above.

In some examples, the insurance template listing window 322 may include a listing of the insurance templates, also referred to as supply contract templates, defined by the client account. The supply contract templates may specify a class of vendor that the template applies to and may include one or more insurance requirements for the specified class of vendor. The insurance template listing window 322 may present the listing of the supply contracts using individual cells for each template. In some examples, each cell may include information indicating the template name, a description of the template, one or more insurance requirements of a vendor, and/or an indication of whether the template is active or inactive.

In some examples, the one or more actionable element windows 314 may include a new template action element configured to allow a client to create a new supply contract template for use in the system.

Figure 4A:
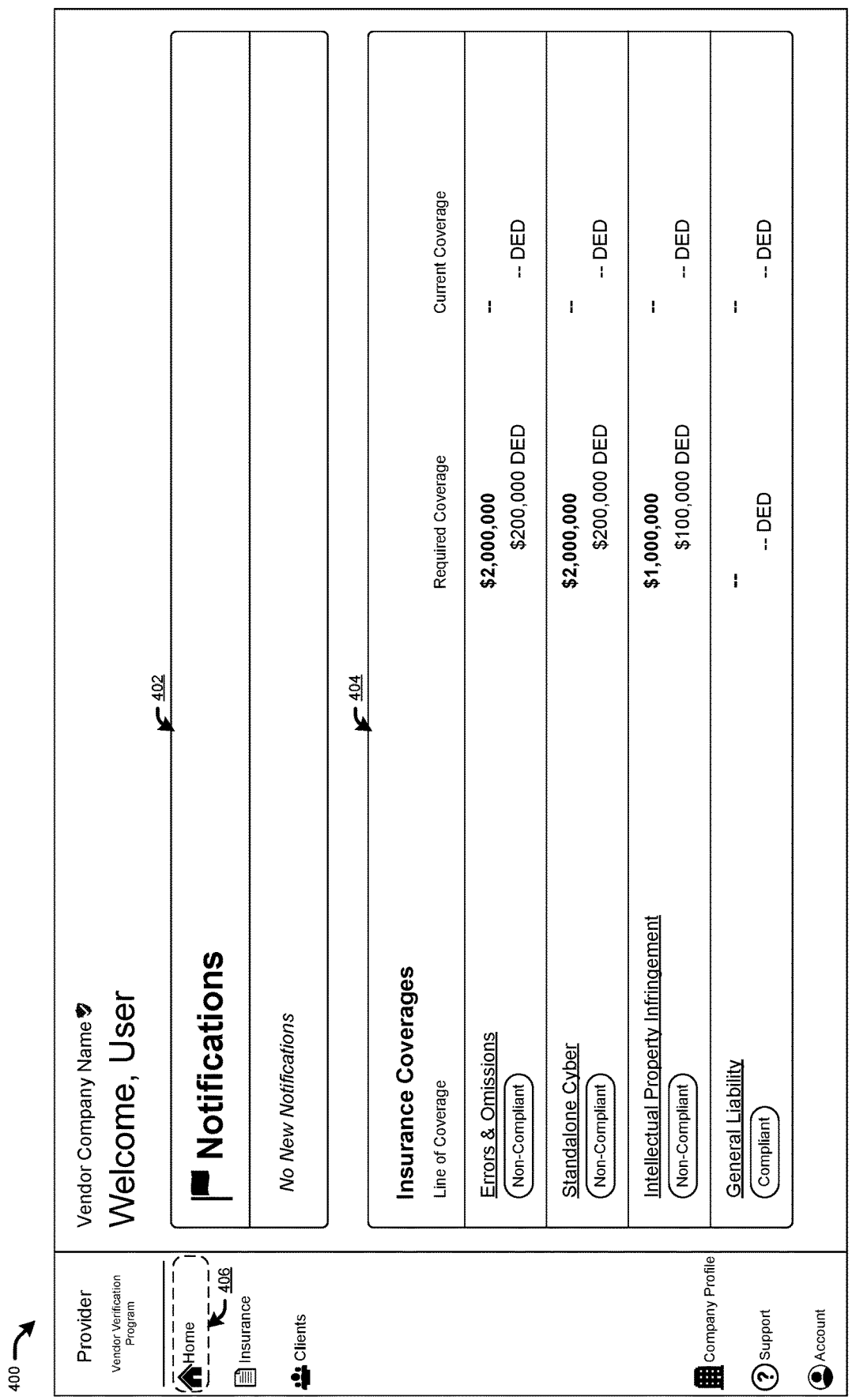
FIG. 4A illustrates an example user interface for displaying data associated with a vendor account representing notifications and/or insurance coverages.
Figure 4B:
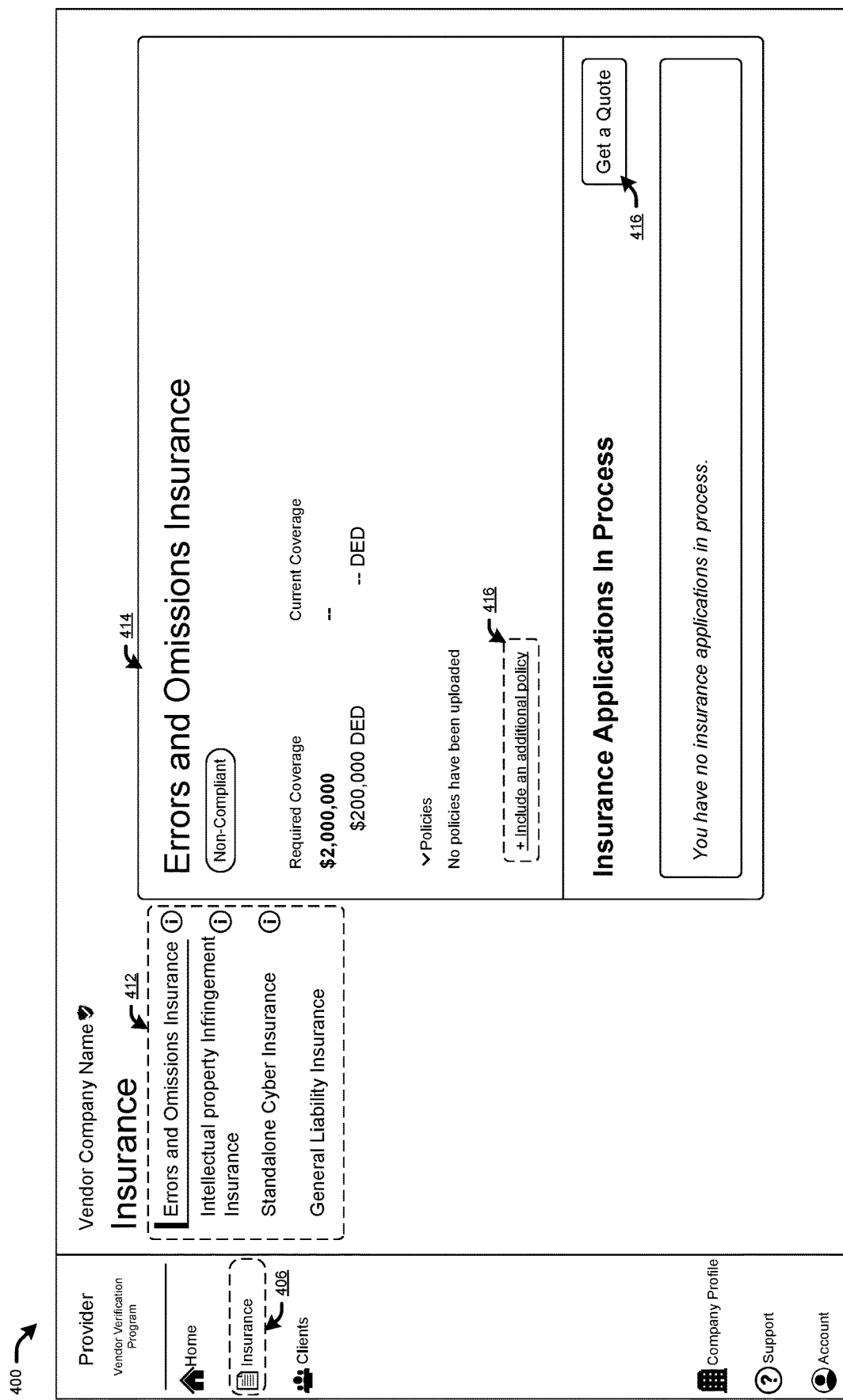
FIG. 4B illustrates an example user interface for displaying data associated with a vendor account representing a line of coverage listing and/or line of coverage information.
Figure 4C:
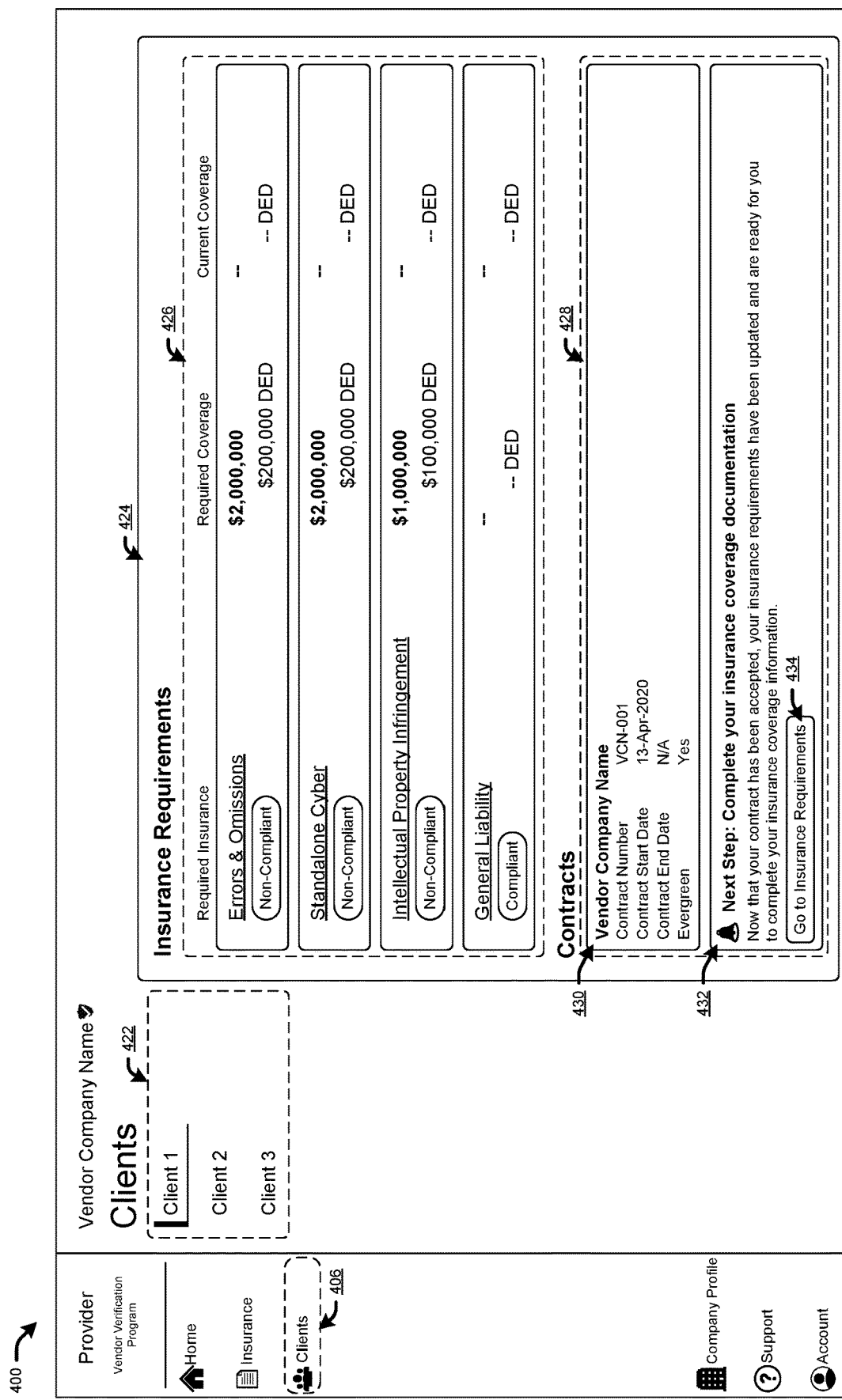
FIG. 4C illustrates an example user interface for displaying data associated with a vendor account representing a client listing and/or client information.

FIGS. 4A-4C illustrate conceptual diagrams of an example user interface 400 that may receive contracts and utilize the vendor management platform to manage lines of insurance required by contracts associated with client accounts. The user interface(s) 400 may be generated by the user interface generation component 220 described with respect to FIG. 2 above. The user interface 400 may be displayed on a display of an electronic device associated with a vendor account, such as the electronic device 102 as described with respect to FIG. 1 above. Additionally, or alternatively, the user interface(s) 300 may be displayed on a display of an electronic device associated with a client account, such that a vendor account may be configured to perform client account actions. While example user interface(s) 400 are shown in FIGS. 4A-4C, the user interface(s) 400 are not intended to be construed as a limitation, and the user interface(s) 400 may be configured to present any of the data described herein.

FIG. 4A illustrates an example user interface 400 configured to present data associated with a vendor account representing notifications and/or insurance coverages. The data may be presented utilizing a notifications window 402 and/or insurance coverages window 404. Additionally, or alternatively, the user interface 400 may include a page indicator 406 indicating the current page that is being presented on the user interface. The user interface 400 may be displayed on a display of an electronic device associated with a vendor account, such as, for example, electronic device 102 as described with respect to FIG. 1 above.

In some examples, the notifications window 402 may include one or more notifications presenting information associated with the vendor account and/or client accounts associated with the vendor account. For example, the client notifications window 402 may include a notification of a new contract between a client account and the vendor account that required action by the vendor.

In some examples, the insurance coverages window 404 may include information associated with the insurance coverages associated with the vendor account. In some examples, the insurance coverages associated with the vendor account may be one of multiple lines of coverage, such as, for example, errors and omissions coverage, standalone cyber coverage, intellectual property infringement coverage, general liability coverage, and the like. In some examples, the insurance coverages window 404 may present the information associated with the insurance coverages using individual cells for each line of insurance coverage. For example, each cell may include information associated with the insurance coverages indicating the line of insurance coverage, a required amount of insurance coverage, a current amount of insurance coverage, and/or an indication of compliance. In some examples, the indication of compliance may include, for example, compliant and non-compliant. In some examples, the indication of compliance may be based on the current amount of insurance coverage relative to the required amount of insurance coverage. In some examples, the required amount of insurance coverage for a line of insurance coverage may be determined by analyzing all of the contracts associated with the vendor account that include the line of insurance coverage and selecting a value that meets or exceeds the required amount of insurance coverage for all of the contracts that include the line of insurance coverage.

FIG. 4B illustrates an example user interface 400 configured to present data associated with a vendor account representing a line of coverage listing and/or line of coverage information. The data may be presented utilizing a line of coverage listing window 412 and/or a line of coverage information window 414. Additionally, or alternatively, the user interface 400 may include a page indicator 406 indicating the current page that is being presented on the user interface. The user interface 400 may be displayed on a display of an electronic device associated with a vendor account, such as, for example, electronic device 102 as described with respect to FIG. 1 above.

In some examples, the line of coverage listing window 412 may include a listing of the lines of insurance coverages associated with the vendor account and an associated indication of compliance associated with the line of coverage. The line of coverage listing window 412 may present the listing of the lines of insurance coverages on the user interface as selectable cells that when selected, may cause the line of coverage information window 414 to present information associated with the selected line of insurance coverage.

In some examples, the line of coverage information window 414 may include information indicating the selected line of insurance coverage, a required amount of insurance coverage, a current amount of insurance coverage, insurance policies corresponding to the line of coverage that the vendor account has uploaded, insurance applications corresponding to the line of coverage that the vendor has applied for, the level of compliance associated with the line of coverage, and/or one or more actionable elements 416.

In some examples, the one or more actionable elements 416 may include a get a quote actionable element configured to, when selected, present an insurance application associated with the line of coverage to the vendor account. In some examples, the compliance component may determine a required amount of insurance coverage that is sufficient to bring all of the contracts, that are associated with the vendor account and that include the selected line of insurance, into compliance with the terms specified therein. Additionally, or alternatively, the compliance component may determine a required amount of insurance coverage that is sufficient to bring a single supply contract, that is associated with the vendor account and that includes the selected line of insurance, into compliance with the terms specified therein.

In some examples, the one or more actionable elements 416 may include an add a policy actionable element configured to, when selected, allow the vendor to upload additional policies associated with the selected line of coverage. Additionally, or alternatively, when selected, the add a policy actionable element may cause the user interface to display one or more additional elements configured to intake user input from the vendor account.

FIG. 4C illustrates an example user interface 400 configured to display data associated with a vendor account representing a client listing and/or client information. The data may be presented utilizing a client listing window 422 and/or a client information window 424. Additionally, or alternatively, the user interface 400 may include a page indicator 406 indicating the current page that is being presented on the user interface. The user interface 400 may be displayed on a display of an electronic device associated with a vendor account, such as, for example, electronic device 102 as described with respect to FIG. 1 above.

In some examples, the client listing window 422 may include a listing of the client accounts that are associated with the vendor account, such that the vendor account has entered into respective contracts with the client accounts. The client listing window 422 may present the listing of the client accounts on the user interface as selectable cells that when selected, may cause the client information window 424 to present information associated with the selected client account.

In some examples, the client information window 424 may include information indicating insurance requirements 426 associated with a client account and/or information indicating contracts 428 associated with a client account.

In some examples, the information indicating the insurance requirements 426 associated with the client account may include information indicating a required line of insurance, a required amount of insurance coverage associated with the required line of insurance, a current amount of insurance coverage associated with the required line of insurance, and/or a level of compliance associated with the required line of insurance. In some examples, the required amount of insurance coverage for a line of insurance coverage may be determined by analyzing all of the contracts associated with the vendor account that include the line of insurance coverage and selecting a value that meets or exceeds the required amount of insurance coverage for all of the contracts that include the line of insurance coverage.

In some examples, the information indicating the contracts 428 associated with a client account may include blocks of information 430 associated with each contract, each block of information 430 indicating a company name associated with the vendor account, an identification number associated with the contract, a start date associated with the contract, an end date associated with the contract, and/or whether or not the contract is an evergreen contract. Additionally, or alternatively, the information indicating the contracts 428 associated with a client account may include a recommendation 432 associated with a contract. In some examples, the recommendation 432 is generated dynamically by a recommendation component executing as a sub-component of the compliance component. In some examples, the recommendation 432 may include an actionable element 434 configured such that, when selected, causes the user interface to present information corresponding to the recommendation 432 and/or causes the user interface 400 to redirect the vendor to a page associated with the recommendation 432.

Figure 5:
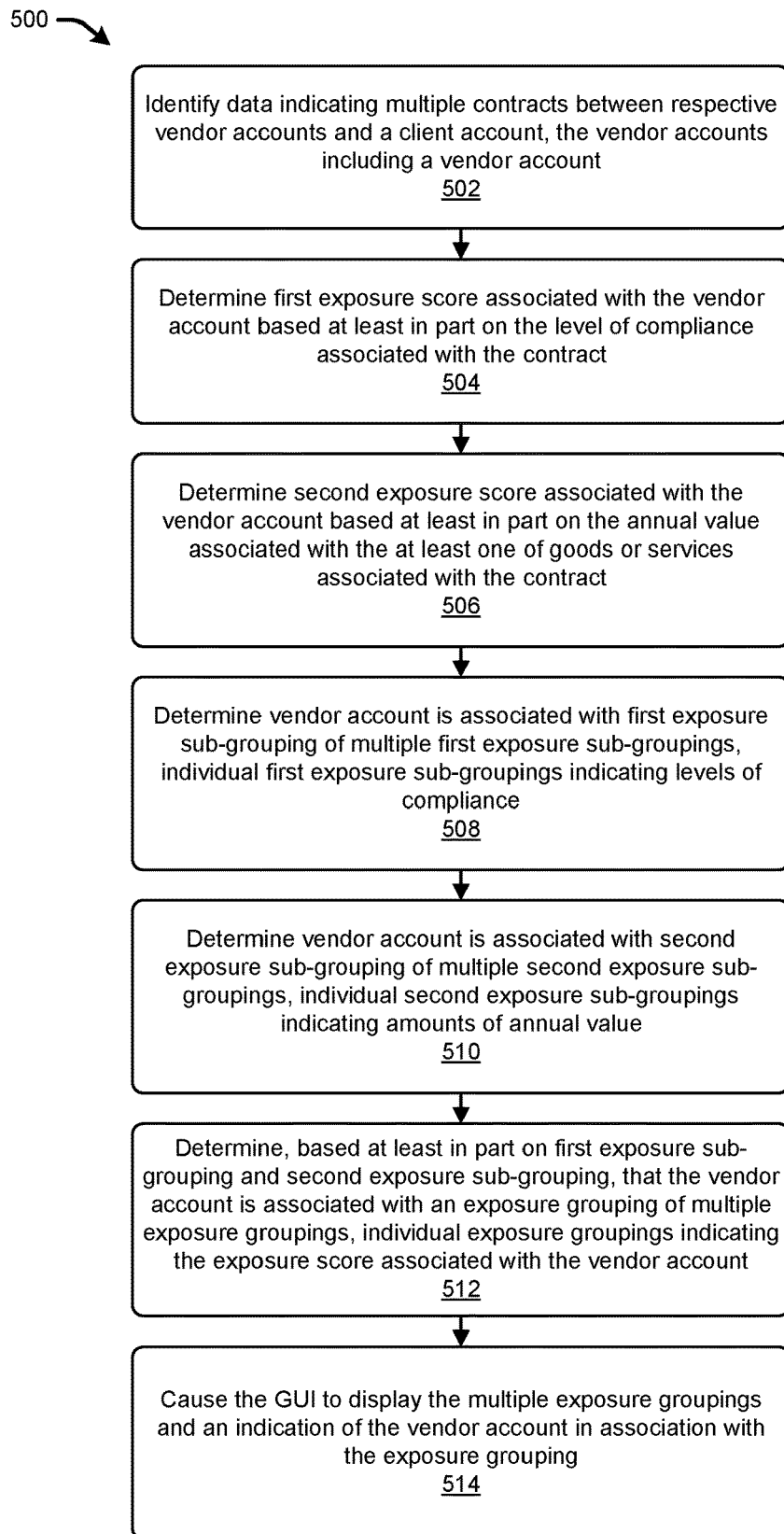
FIG. 5 illustrates an example flow diagram of an example process for generating a graphic representing the level of exposure of vendor accounts associated with a client account.

FIG. 5 illustrates an example process associated with the vendor management platform. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4C and 6-20, although the processes may be implemented in a wide variety of other environments, architectures and systems.

FIG. 5 illustrates an example flow diagram of an example process 500 for generating a graphic representing the level of exposure of vendor accounts associated with a client account. The order in which the operations or steps are described is not intended to be construed as a limitation, and any number of the described operations may be combined in any order and/or in parallel to implement process 500. The operations described with respect to the process 500 are described as being performed by an electronic device and/or a remote computing resource associated with the vendor management platform. However, it should be understood that some or all of these operations may be performed by some or all of components, devices, and/or systems described herein.

At block 502, the process 500 may include identifying data indicating multiple contracts between respective vendor accounts and a client account. For example, the data may include a first vendor account of the respective vendor accounts. In some examples, the data may be identified in the client account data, the vendor account data, and/or both. For example, the data may include the client account data, indicating individual contracts that a client, associated with the client account, has entered into with respective vendors.

At block 504, the process 500 may include determining a first exposure score associated with the vendor account. In some examples, the first exposure score may be determined by the exposure assessment component. In some examples, the first exposure score may be based at least in part on the level of compliance associated with the contract. The level of compliance associated with a supply contract may be determined, for a vendor account, by comparing a current insurance coverage value, associated with a line of coverage held by the vendor account, to a threshold coverage value, associated with an insurable obligation corresponding to the line of coverage required by the supply contract.

At block 506, the process 500 may include determining a second exposure score associated with the vendor account. In some examples, the second exposure score may be determined by the exposure assessment component. In some examples, the second exposure score may be based at least in part on an annual value associated with at least one of goods and/or services associated with the contract. For example, the supply contract may indicate that the vendor is to supply the at least one of goods and/or services to the client. In some examples, the client account data and/or vendor account data may indicate an annual value associated with the at least one of goods and/or services and may be utilized to determine the second exposure score associated with the vendor account.

At block 508, the process 500 may include determining that the vendor account is associated with a first exposure sub-grouping. In some examples, determining that the vendor account is associated with the first exposure sub-grouping may be based at least in part on the first exposure score. In some examples, the first exposure sub-grouping may be included in a set of multiple first exposure sub-groupings. For example, individual first exposure sub-groupings of the set of multiple first exposure sub-groupings may indicate respective levels of compliance. Additionally, or alternatively, the individual first exposure sub-groupings may indicate respective ranges of levels of compliance. For example, a first, first exposure sub-grouping may indicate a lower, or less favorable, level of compliance than a second, first exposure sub-grouping. Additionally, or alternatively, a first, first exposure sub-grouping may indicate a higher, or more favorable, level of compliance than a second, first exposure sub-grouping.

At block 510, the process 500 may include determining that the vendor account is associated with a second exposure sub-grouping. In some examples, determining that the vendor account is associated with the second exposure sub-grouping may be based at least in part on the second exposure score. In some examples, the second exposure sub-grouping may be included in a set of multiple second exposure sub-groupings. For example, individual second exposure sub-groupings of the set of multiple second exposure sub-groupings may indicate respective amounts of annual value associated with the at least one of goods and/or services. Additionally, or alternatively, the individual second exposure sub-groupings may indicate respective ranges of annual value associated with the at least one of goods and/or services. For example, a first, second exposure sub-grouping may indicate a lower, or less favorable, annual value associated with the at least one of goods and/or services than a second, second exposure sub-grouping. Additionally, or alternatively, a first, second exposure sub-grouping may indicate a higher, or more favorable, annual value associated with the at least one of goods and/or services than a second, second exposure sub-grouping.

At block 512, the process 500 may include determining that the vendor account is associated with an exposure grouping. In some examples, determining that the vendor account is associated with the exposure grouping may be based at least in part on the first exposure score and/or the second exposure score. Additionally, or alternatively, determining that the vendor account is associated with the exposure grouping may be based at least in part on the first exposure sub-grouping and/or the second exposure sub-grouping. In some examples, the exposure grouping may be included in a set of multiple exposure groupings. For example, individual exposure groupings of the set of multiple exposure groupings may indicate an exposure score associated with the vendor account. In some examples, the exposure score may be based at least in part on the first exposure score and/or the second exposure score associated with the vendor account. For example, a first exposure grouping may indicate a lower, or less favorable, exposure score than a second exposure grouping. Additionally, or alternatively, the first exposure grouping may indicate a higher, or more favorable, exposure score than the second exposure grouping. Additionally, or alternatively, the exposure grouping associated with the vendor account may be changed as the vendor account ages, such that, a first vendor account having the same level of compliance as a second vendor account may have a higher exposure score if the first vendor account is older, or has a greater period of time since joining the vendor management platform.

At block 514, the process 500 may include causing a graphical user interface to be presented on a computing device associated with the client account and/or the vendor account. In some examples, the user interface may include the multiple exposure groupings. Additionally, or alternatively, the user interface may include an indication of the vendor account in association with the exposure grouping. Additionally, or alternatively, the user interface may include indications of the first exposure sub-groupings and/or the second exposure sub-groupings. In some examples, the user interface may include a graphic representing the multiple exposure groupings. For example, the graphic may include a heat map comprised of cells, each cell indicating an exposure score and/or a range of exposure scores. In some example, the user interface may include a graphic such as, for example, the graphic illustrated with respect to FIG. 6.

Figure 6:
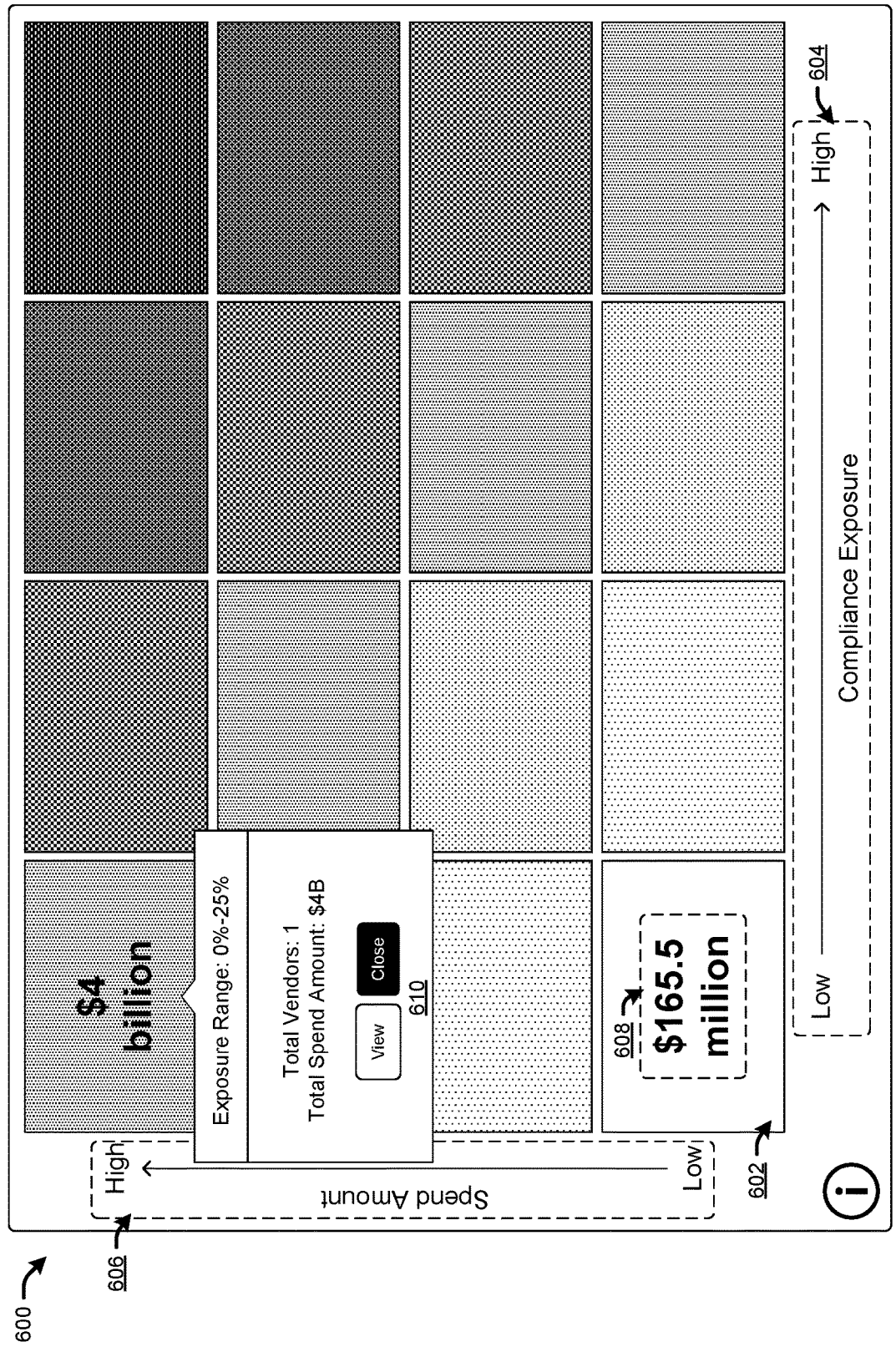
FIG. 6 illustrates an example user interface to present data representing a graphic indicating the exposure score of vendor accounts associated with a client account.

FIG. 6 illustrates an example user interface 600 to present data representing a graphic indicating the exposure score of vendor accounts that are associated with a client account. In some examples, the graphic may represent the exposure score of vendor accounts that have entered into supply contracts with the client account. While an example user interface 600 for displaying the graphic is shown in FIG. 6, the user interface 600 is not intended to be construed as a limitation, and the graphic may be represented using any other example graphic described herein and/or any other data analysis graphic.

In some examples, the user interface 600 may include a graphic representing the analysis of the level of exposure associated with a client account. For example, the graphic configured to present a visual representation indicating the respective exposure scores of vendor accounts that are associated with a client account. In some examples, the user interface 600 may include one or more cell(s) 602. In some examples, each cell 602 may represent an exposure grouping that indicates an exposure score and/or an exposure range associated with a vendor account. In some examples, the exposure score may include a first exposure score indicating a level of compliance associated with a client account. In some examples, the user interface 600 may include an indication of a first exposure sub-grouping 604 based at least in part on the first exposure score. Additionally, or alternatively, the exposure score may include a second exposure score indicating an annual value associated with at least one of goods and/or services associated with a supply contract. In some examples, the user interface 600 may include an indication of a second exposure sub-grouping 606 based at least in part on the second exposure score. In some examples, the user interface 600 may be configured to present an indication of total annual spending 608 associated with a cell 602. For example, a cell 602 representing an exposure grouping may include a number of vendors such as, for example, 10. The indication of total annual spending 608 may represent the total of the annual values associated with at least one of goods and/or services that are associated with supply contracts associated with the 10 vendors associated with the cell 602. Additionally, or alternatively, the user interface 600 may be configured such that the cells 602, when selected, may cause the user interface to present a cell information window 610. In some examples, the cell information window 610 may include data representing the range of exposure associated with the cell 602, a total number of vendors associated with the cell 602, a total spend amount associated with the cell 602 and corresponding to the indication of total annual spending 608, and/or one or more actionable elements associated with the cell. In some examples, the one or more actionable elements may be configured to, when selected, cause the user interface 600 to navigate the user to a page associated with the selected cell 602, close the cell information window 610, and/or present more information associated with the cell information window 610, such as, for example, information associated with supply contracts, vendor account data, and/or client account data.

FIGS. 7-20 illustrate processes associated with the vendor management platform. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, although the processes may be implemented in a wide variety of other environments, architectures and systems.

Figure 7:
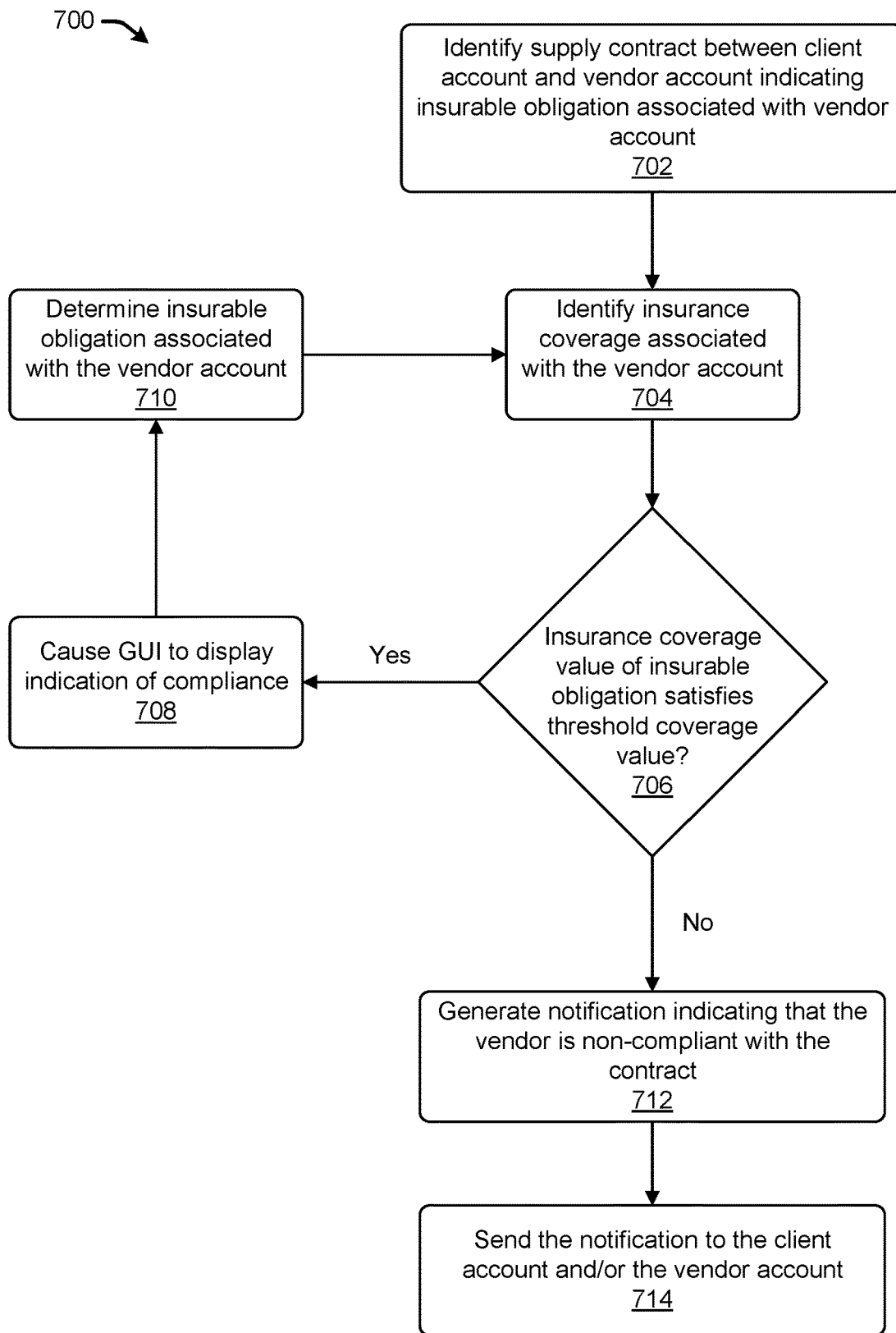
FIG. 7 illustrates an example flow diagram of an example process for periodic compliance checking of vendor accounts.

FIG. 7 illustrates an example flow diagram of an example process 700 for periodic compliance checking of vendor accounts. The order in which the operations or steps are described is not intended to be construed as a limitation, and any number of the described operations may be combined in any order and/or in parallel to implement process 700. The operations described with respect to the process 700 are described as being performed by a client device, vendor device, and/or remote computing resources associated with the vendor management platform. However, it should be understood that some or all of these operations may be performed by some or all of components, devices, and/or systems described herein.

At block 702, the process 700 may include receiving and/or identifying a supply contract between a client account and a vendor account. In some examples, the supply contract may indicate an insurable obligation associated with the vendor account. Additionally, or alternatively, the supply contract may indicate an intellectual-property related obligation associated with the vendor account.

At block 704, the process 700 may include identifying a line of coverage associated with the vendor account. In some examples, the vendor management platform may identify the line of coverage associated with the vendor account based on the client account data and/or the vendor account data. In some examples, the line of coverage may be associated with the insurable obligation and/or intellectual-property related obligation. For example, the line of coverage may include an insurance coverage value associated with the insurable obligation and/or intellectual-property related obligation.

At block 706, the process 700 may include determining that the insurance coverage value satisfies a threshold coverage value associated with the insurable obligation and/or intellectual-property related obligation. In some examples, the threshold coverage value may be determined based on the supply contract. Additionally, or alternatively, the vendor management platform may determine that the insurance coverage value satisfies a threshold coverage value associated with the insurable obligation and/or intellectual-property related obligation at a first time. Additionally, or alternatively, the vendor management platform may determine that the insurance coverage value satisfies a threshold coverage value associated with the insurable obligation and/or intellectual-property related obligation at a second time that is after the first time. Additionally, or alternatively, the vendor management platform may determine a level of compliance of the vendor account associated with the supply contract. In some examples, the level of compliance may be a first level of compliance determined at a first time. Additionally, or alternatively, the level of compliance may be a second level of compliance determined at a second time that is after the first time.

At block 708, the process 700 may include causing a graphical user interface (GUI), configured to be displayed on a computing device associated with the client account and/or the vendor account, to display an indication that the vendor account is in compliance with the supply contract. For example, the GUI may be configured to display an indication that the insurance coverage value satisfies the threshold coverage value associated with the insurable obligation and/or intellectual-property related obligation.

At block 710, the process 700 may include determining an insurable obligation and/or intellectual-property related obligation associated with the vendor account. In some examples, the vendor management platform may determine an additional insurable obligation and/or an additional intellectual-property related obligation associated with the supply contract. Additionally, or alternatively, the vendor management platform may determine, at a second time that is after the first time, that the insurable obligation and/or intellectual-property related obligation is still required by the supply contract.

Additionally, or alternatively, the process 700 may be configured to repeat the operations described at blocks 704-710 following execution of block 710. Returning to block 706, in examples where the insurance coverage value of the insurable obligation does not satisfy the threshold coverage value, then the process 700 may continue to block 712.

At block 712, the process 700 may include generating a notification to send to the client account and/or the vendor account. In some examples, the notification may include an indication that the vendor account is non-compliant with the supply contract. For example, the notification may include an indication that the insurance coverage value does not satisfy the threshold coverage value associated with the insurable obligation and/or intellectual-property related obligation.

At block 714, the process 700 may include sending the notification to the client account and/or the vendor account. In some example, the vendor management platform may cause a GUI, configured to be displayed on the client account and/or the vendor account, to display the notification.

Additionally, or alternatively, the process 700 may be implemented in any order according to a workflow specified by a client account and/or a vendor account accessing the vendor management platform. For example, a client account may define a workflow for the vendor management platform to periodically check compliance at the same time each day, week, month, and/or year. In some examples, the workflow may be a static, such as, for example, a daily compliance verification across all of the supply contracts associated with the client account. Additionally, or alternatively, the workflow may be dynamic, such as, for example, the system may be configured to verify that all vendor accounts, that are associated with supply contracts associated with the client account, are in compliance with their respective contracts when a vendor account updates account information and/or insurance information.

Figure 8:
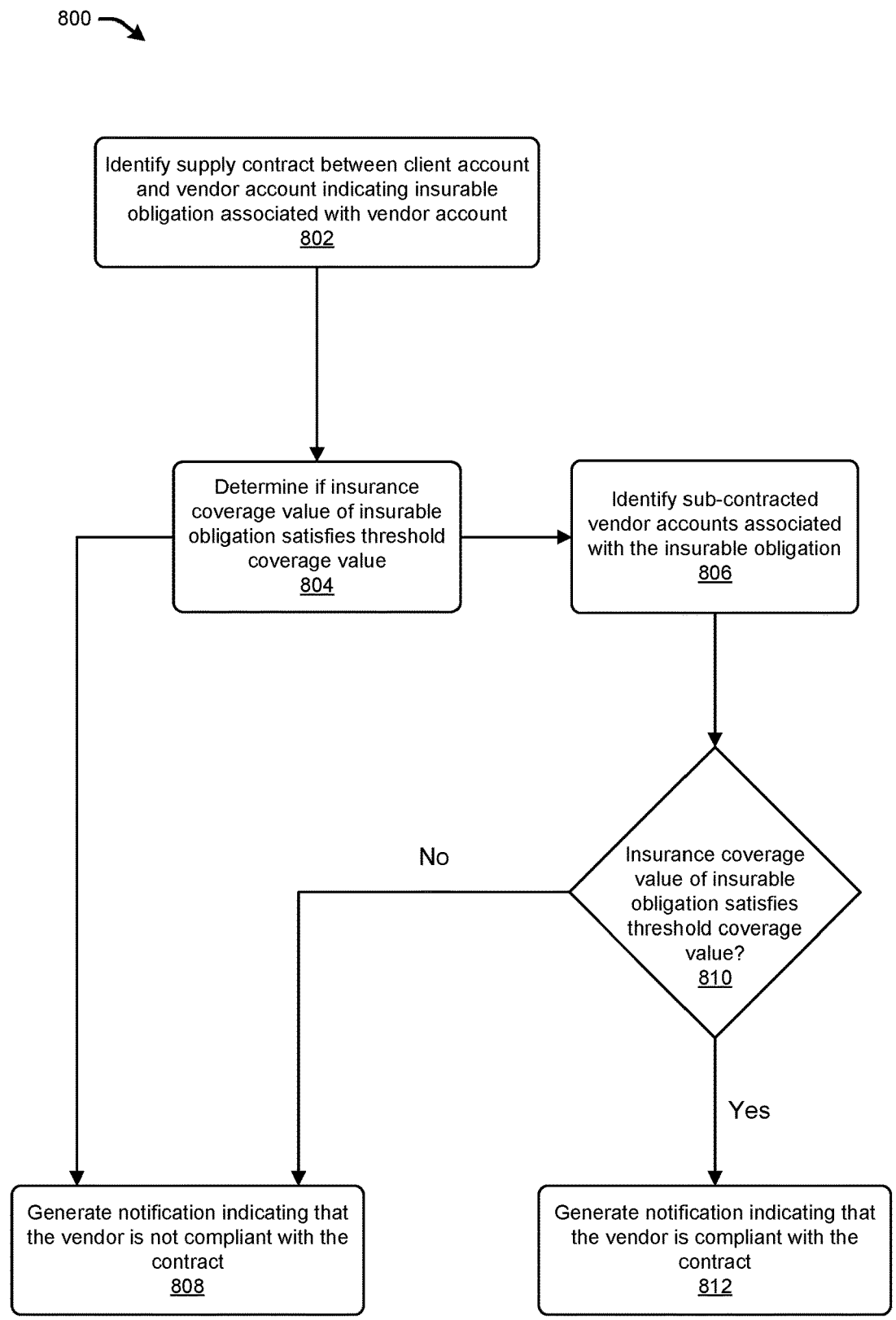
FIG. 8 illustrates an example flow diagram of an example process for determining compliance of sub-vendor accounts associated with vendor accounts.

FIG. 8 illustrates an example flow diagram of an example process 800 for determining compliance of sub-vendor accounts associated with vendor accounts. The order in which the operations or steps are described is not intended to be construed as a limitation, and any number of the described operations may be combined in any order and/or in parallel to implement process 800. The operations described with respect to the process 800 are described as being performed by a client device, vendor device, and/or remote computing resources associated with the vendor management platform. However, it should be understood that some or all of these operations may be performed by some or all of components, devices, and/or systems described herein.

At block 802, the process 800 may include receiving and/or identifying a supply contract between a client account and a vendor account. In some examples, the supply contract may indicate an insurable obligation associated with the vendor account. Additionally, or alternatively, the supply contract may indicate an intellectual-property related obligation associated with the vendor account.

At block 804, the process 800 may include determining that the insurance coverage value associated with the vendor account satisfies a threshold coverage value associated with the insurable obligation and/or intellectual-property related obligation. In some examples, the threshold coverage value may be determined based on the supply contract. Additionally, or alternatively, the vendor management platform may determine a level of compliance of the vendor account associated with the supply contract.

At block 806, the process 800 may include identifying one or more sub-contract vendor accounts that are associated with the vendor account. In some examples the one or more sub-contracted vendor accounts may be associated with the insurable obligation and/or intellectual-property related obligation, such that the sub-contract vendor account may supply at least one of goods and/or services associated with the supply contract to the vendor account. In some examples, the sub-contract vendor account may be required to posses a line of coverage including an insurance coverage value associated with the insurable obligation and/or intellectual-property related obligation that satisfies the threshold coverage value required by the supply contract.

Returning to block 804, in examples where the insurance coverage value of the insurable obligation does not satisfy the threshold coverage value, then the process 800 may continue to block 808.

At block 808, the process 800 may include generating a notification to send to the client account and/or the vendor account. In some examples, the notification may include an indication that the vendor account is non-compliant with the supply contract. For example, the notification may include an indication that the insurance coverage value associated with the vendor account does not satisfy the threshold coverage value associated with the insurable obligation and/or intellectual-property related obligation. Additionally, or alternatively, the notification may include an indication that the insurance coverage value associated with a sub-contracted vendor account associated with the vendor account does not satisfy the threshold coverage value associated with the insurable obligation and/or intellectual-property related obligation.

At block 810, the process 800 may include determining that the insurance coverage value associated with the sub-contract vendor account satisfies a threshold coverage value associated with the insurable obligation and/or intellectual-property related obligation. In some examples, the threshold coverage value may be determined based on the supply contract. Additionally, or alternatively, the vendor management platform may determine a level of compliance of the vendor account associated with the supply contract.

At block 812, the process 800 may include generating a notification to send to the client account and/or the vendor account. In some examples, the notification may include an indication that the sub-contract vendor account is in compliance with the supply contract. For example, the notification may include an indication that the insurance coverage value associated with the sub-contract vendor account satisfies the threshold coverage value associated with the insurable obligation and/or intellectual-property related obligation.

Returning to block 810, in examples where the insurance coverage value of the insurable obligation does not satisfy the threshold coverage value, then the process 800 may continue to block 808.

Figure 9:
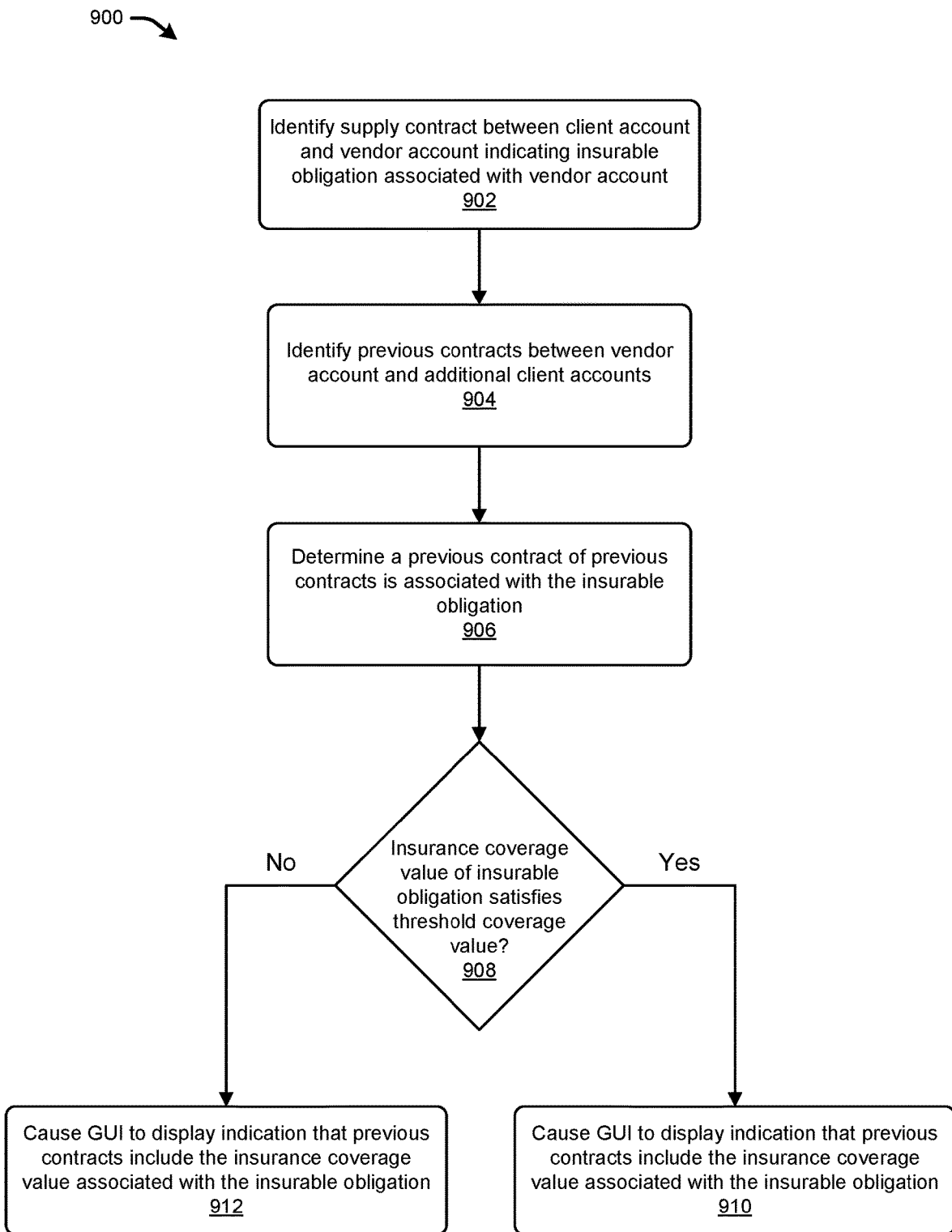
FIG. 9 illustrates an example flow diagram of an example process for identifying previous supply contracts associated with a vendor account and determining compliance based on the previous supply contracts.

FIG. 9 illustrates an example flow diagram of an example process 900 for identifying previous supply contracts associated with a vendor account and determining compliance based on the previous supply contracts. The order in which the operations or steps are described is not intended to be construed as a limitation, and any number of the described operations may be combined in any order and/or in parallel to implement process 900. The operations described with respect to the process 900 are described as being performed by a client device, vendor device, and/or remote computing resources associated with the vendor management platform. However, it should be understood that some or all of these operations may be performed by some or all of components, devices, and/or systems described herein.

At block 902, the process 900 may include receiving and/or identifying a supply contract between a client account and a vendor account. In some examples, the supply contract may indicate an insurable obligation associated with the vendor account. Additionally, or alternatively, the supply contract may indicate an intellectual-property related obligation associated with the vendor account.

At block 904, the process 900 may include identifying one or more previous supply contracts between the vendor account and one or more additional client accounts. For example, the vendor management platform may identify a previous supply contract between the vendor account and an additional client account.

At block 906, the process 900 may include determining that a previous contract of the one or more previous contracts is associated with the insurable obligation and/or intellectual-property related obligation. For example, the vendor management platform may determine that a previous contract of the one or more previous contracts includes the insurable obligation and/or intellectual-property related obligation associated with the supply contract between the vendor account and the client account. In some examples, the previous contact may indicate a line of coverage associated with the vendor account. In some examples, the line of coverage may be associated with the insurable obligation and/or intellectual-property related obligation. For example, the line of coverage may include an insurance coverage value associated with the insurable obligation and/or intellectual-property related obligation.

At block 908, the process 900 may include determining that the insurance coverage value associated with the previous contracts of the vendor account satisfies a threshold coverage value associated with the insurable obligation and/or intellectual-property related obligation. In some examples, the threshold coverage value may be determined based on the supply contract. Additionally, or alternatively, the vendor management platform may determine a level of compliance of the vendor account associated with the supply contract.

At block 910, the process 900 may include causing a graphical user interface (GUI), configured to be displayed on a computing device associated with the client account and/or the vendor account, to display an indication that the vendor account is in compliance with the supply contract. For example, the GUI may be configured to display an indication that the insurance coverage value associated with the previous supply contract satisfies the threshold coverage value associated with the insurable obligation and/or intellectual-property related obligation required by the supply contract.

Returning to block 908, in examples where the insurance coverage value of the insurable obligation does not satisfy the threshold coverage value, then the process 900 may continue to block 912.

At block 912, the process 900 may include causing a graphical user interface (GUI), configured to be displayed on a computing device associated with the client account and/or the vendor account, to display an indication that the vendor account is not in compliance with the supply contract. For example, the GUI may be configured to display an indication that the insurance coverage value associated with the previous supply contact does not satisfy the threshold coverage value associated with the insurable obligation and/or intellectual-property related obligation required by the supply contract.

Figure 10:
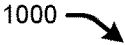
FIG. 10 illustrates an example flow diagram of an example process for determining an exposure score of a vendor account based on aggregated data associated with a technical field of the goods and/or services that the vendor has agreed to supply to the client.

FIG. 10 illustrates an example flow diagram of an example process 1000 for determining an exposure score of a vendor account based on aggregated data associated with a technical field of the goods and/or services that the vendor has agreed to supply to the client. The order in which the operations or steps are described is not intended to be construed as a limitation, and any number of the described operations may be combined in any order and/or in parallel to implement process 1000. The operations described with respect to the process 1000 are described as being performed by a client device, vendor device, and/or remote computing resources associated with the vendor management platform. However, it should be understood that some or all of these operations may be performed by some or all of components, devices, and/or systems described herein.

At block 1002, the process 1000 may include determining a technical field associated with the goods and/or services that are associated with a supply contract. For example, a supply contract may indicate that a vendor will supply the goods and/or services to a client, and the vendor management platform may determine that the goods and/or services are associated with a technical field of multiple technical fields.

At block 1004, the process 1000 may include identifying one or more additional vendor accounts that are associated with the technical field. In some examples, the one or more vendor accounts may be associated with supply contracts that include goods and/or services that are associated with the technical field and/or the client account(s) associated with the vendor accounts. Additionally, or alternatively, the process 1000 may include identifying one or more client accounts that are associated with the technical field. In some examples, the one or more client accounts may be associated with supply contracts that includes goods and/or services that are associated with the technical field and/or the vendor account(s) associated with the client accounts.

At block 1006, the process 1000 may include identifying a vendor exposure level, associated with the one or more additional vendor accounts. In some examples, the vendor management platform may determine, for each additional vendor account of the one or more additional vendor accounts, a vendor exposure level based at least in part on a level of compliance of the additional vendor account and the associated supply contracts and/or an annual value associated with the goods and/or services associated with the supply contracts. Additionally, or alternatively, the vendor account data may indicate the vendor exposure level for each additional vendor account.

At block 1008, the process 1000 may include generating data indicating an aggregated vendor exposure level associated with the technical field. In some examples, the aggregated vendor exposure level may be based at least in part on the vendor exposure level associated with each additional vendor account of the additional vendor accounts. In some examples, the aggregated vendor exposure level may be an average of the vendor exposure levels associated with each additional vendor account of the additional vendor accounts.

At block 1010, the process 1000 may include determining an exposure score associated with the vendor account based at least in part on the generated data. For example, the vendor management platform may determine an exposure score associated with the vendor account based at least in part on the data indicating the aggregated vendor exposure level associated with the technical field. Additionally, or alternatively, the vendor management platform may determine an exposure score associated with the vendor account based on a number of different determining factors, and may alter the exposure score, or redetermine the exposure score based at least in part on the data indicated the aggregated vendor exposure level.

Figure 11:
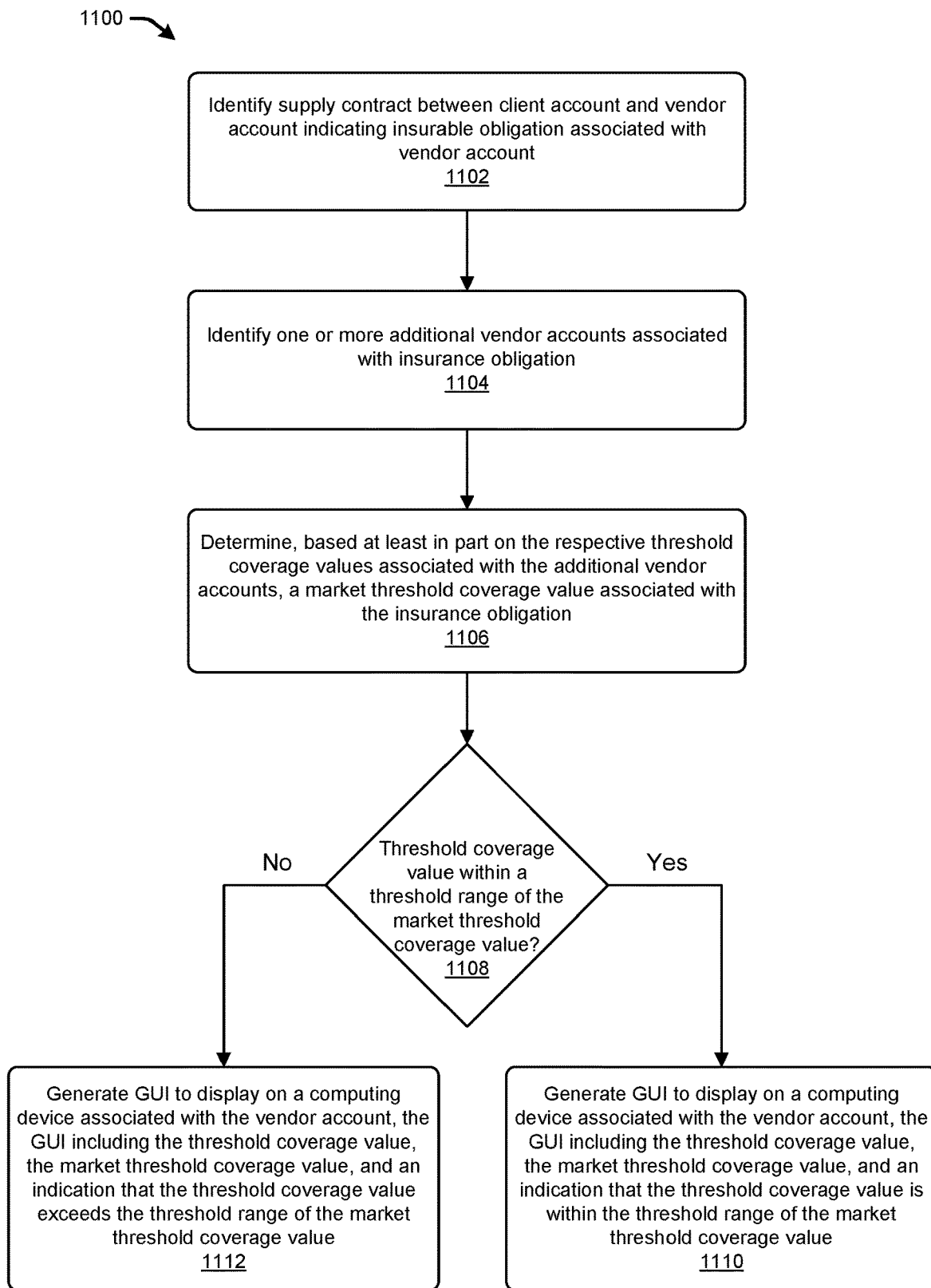
FIG. 11 illustrates an example flow diagram of an example process for providing vendor accounts with indications of market standardized values associated with corresponding insurable obligations.

FIG. 11 illustrates an example flow diagram of an example process 1100 for providing vendor accounts with indications of market standardized values associated with corresponding insurable obligations. The order in which the operations or steps are described is not intended to be construed as a limitation, and any number of the described operations may be combined in any order and/or in parallel to implement process 1100. The operations described with respect to the process 1100 are described as being performed by a client device, vendor device, and/or a remote computing resources associated with the vendor management platform. However, it should be understood that some or all of these operations may be performed by some or all of components, devices, and/or systems described herein.

At block 1102, the process 1100 may include receiving and/or identifying a supply contract between a client account and a vendor account. In some examples, the supply contract may indicate an insurable obligation associated with the vendor account. Additionally, or alternatively, the supply contract may indicate an intellectual-property related obligation associated with the vendor account.

At block 1104, the process 1100 may include identifying one or more additional vendor accounts that are associated with the insurable obligation and/or the intellectual-property related obligation. In some examples, an additional vendor account of the one or more additional vendor accounts may be associated with the insurable obligation and/or the intellectual-property related obligation if the additional vendor account has entered into a supply contract that includes the insurable obligation and/or the intellectual-property related obligation required by the supply contract.

At block 1106, the process 1100 may include determining a market threshold coverage value associated with the insurable obligation and/or the intellectual-property related obligation. In some examples, the market threshold coverage value may be based at least in part on respective threshold coverage values associated with the additional vendor accounts. For example, the additional vendor accounts may be associated with additional supply contracts indicating the insurable obligation and/or the intellectual-property related obligation. In some examples, the additional supply contracts may include a respective threshold coverage value associated with the insurable obligation. In some examples, the market threshold coverage value may be based at least in part on aggregated data indicating the respective threshold coverage values of the insurable obligation and/or intellectual-property related obligation associated with the additional vendor accounts. For example, the market threshold coverage value may be based on an average of the respective threshold coverage values of the insurable obligation and/or intellectual-property related obligation associated with the additional vendor accounts.

At block 1108, the process 1100 may include determining that the threshold coverage value associated with the insurable obligation and/or intellectual-property related obligation required by the supply contract between the vendor and the client is within a threshold range of the market threshold coverage value. In some examples, the threshold range may include values above and/or below the market threshold coverage value, such that the threshold coverage value may be determined to be in the threshold range even when the threshold coverage value is above or below the market threshold coverage value.

At block 1110, the process 1100 may include generating a graphical user interface (GUI) to display on a computing device associated with the client account and/or the vendor account. In some examples, the GUI may include the threshold coverage value, the market threshold coverage value, an indication of the threshold range of the market coverage value, and/or an indication that the threshold coverage value is within the threshold range of the market threshold coverage value.

Returning to block 1108, in examples where the threshold coverage value is not within the range of the market threshold coverage value, then the process 1100 may continue to block 1112.

At block 1112, the process 1100 may include generating a graphical user interface (GUI) to display on a computing device associated with the client account and/or the vendor account. In some examples, the GUI may include the threshold coverage value, the market threshold coverage value, an indication of the threshold range of the market coverage value, and/or an indication that the threshold coverage value is not within the threshold range of the market threshold coverage value.

Figure 12:
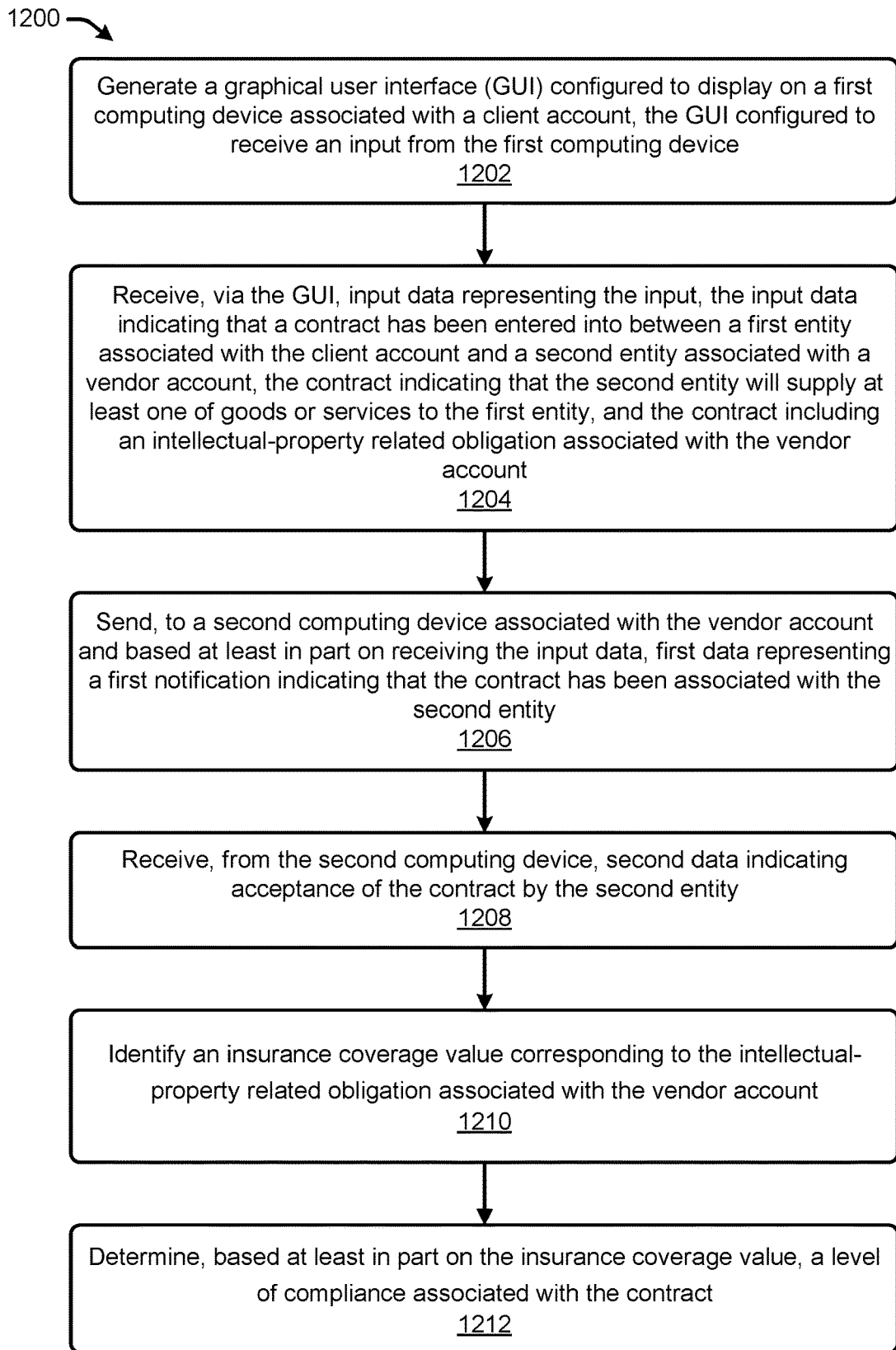
FIG. 12 illustrates an example flow diagram of an example process for generating user interfaces to display on a computing device associated with a client account to receive input data indicating a supply contract including an intellectual-property related obligation and provide indications associated with a level of compliance of a vendor account associated with the supply contract.

FIG. 12 illustrates an example flow diagram of an example process 1200 for generating user interfaces to display on a computing device associated with a client account to receive input data indicating a supply contract including an intellectual-property related obligation and provide indications associated with a level of compliance of a vendor account associated with the supply contract. The order in which the operations or steps are described is not intended to be construed as a limitation, and any number of the described operations may be combined in any order and/or in parallel to implement process 1200. The operations described with respect to the process 1200 are described as being performed by a client device, and/or remote computing resources associated with the vendor management platform. However, it should be understood that some or all of these operations may be performed by some or all of components, devices, and/or systems described herein.

At block 1202, the process 1200 may include generating a graphical user interface (GUI) configured to display on a first computing device associated with a client account. In some examples, the GUI may be configured to receive an input from the first computing device. The first computing device may be any of the electronic devices 102 and/or remote computing resources 104 described with respect to FIG. 1. Additionally, or alternatively, the GUI may include any of the example user interfaces 300, 600 described with respect to FIGS. 3A-3C and/or FIG. 6.

At block 1204, the process 1200 may include receiving input data representing the input. In some examples, the input data may be received via the GUI. In some examples, the input data may indicate that a contract has been entered into between a first entity associated with the client account and a second entity associated with a vendor account. Additionally, or alternatively, the first entity may be a client and the second entity may be a vendor. In some examples, the contract may indicate that the second entity will supply at least one of goods or services to the first entity. Additionally, or alternatively, the contract may include an intellectual-property related obligation associated with the vendor account.

At block 1206, the process 1200 may include sending, to second computing device associated with the vendor account, first data representing a first notification. Additionally, or alternatively, the sending may be based at least in part on receiving the input data. In some examples, the notification may indicate that the contract has been associated with the second entity. The second computing device may be any of the electronic devices 102 and/or remote computing resources 104 described with respect to FIG. 1.

At block 1208, the process 1200 may include receiving, from the second computing device, second data. In some examples, the second data may indicate acceptance of the contract by the second entity.

At block 1210, the process 1200 may include identifying an insurance coverage value corresponding to the intellectual-property related obligation associated with the vendor account. In some examples, the vendor account data associated with the vendor account may indicate the insurance coverage value. For example, the vendor account data may indicate a line of coverage associated with the vendor account. In some examples, the line of coverage may be associated with the intellectual-property related obligation. For example, the line of coverage may include an insurance coverage value associated with the intellectual-property related obligation.

At block 1212, the process 1200 may include determining a level of compliance associated with the contract. In some examples, the level of compliance may be determined using any of the techniques described above with respect to FIGS. 1 and 2. In some examples, the level of compliance may be based at least in part on the insurance coverage value. For example, the level of compliance may be based at least in part on comparing the insurance coverage value to a threshold coverage value associated with the intellectual-property related obligation.

Additionally, or alternatively, the process 1200 may include determining that the level of compliance does not satisfy a threshold coverage value corresponding to the intellectual-property related obligation. In some examples, wherein determining the level of compliance associated with the contract is based at least in part on determining that the insurance coverage value does not satisfy the threshold coverage value.

Additionally, or alternatively, the process 1200 may include determining that the level of compliance satisfies a threshold coverage value corresponding to the intellectual-property related obligation. In some examples, wherein determining the level of compliance associated with the contract is based at least in part on determining that the insurance coverage value satisfies the threshold coverage value.

Additionally, or alternatively, the process 1200 may include sending, to the client account, a second notification including an indication that the vendor account is non-compliant with the contract based at least in part on determining that the insurance coverage value does not satisfy the threshold coverage value corresponding to the intellectual-property related obligation and/or causing the GUI to display the indication that the vendor account is non-compliant with the contract in association with an indicator of the vendor account.

Additionally, or alternatively, the process 1200 may include identifying one or more intellectual-property assets associated with the vendor account. In some examples, the one or more intellectual-property assets may include subject matter associated with the at least one of goods or services. Additionally, or alternatively, the process 1200 may include determining, for individual ones of the intellectual-property assets, an intellectual-property asset score indicating at least a respective comparative breadth of an intellectual property asset. Additionally, or alternatively, the process 1200 may include determining that at least one of the intellectual-property asset scores satisfy a threshold intellectual-property asset score. Additionally, or alternatively, the threshold coverage value corresponding to the intellectual-property related obligation may be based at least in part on determining that at least one of the intellectual-property asset scores satisfy the threshold intellectual-property asset score.

Additionally, or alternatively, the process 1200 may include determining a user account currently logged into the system and/or determining that the user account is associated with an account type of multiple account types. In some examples, individual ones of the multiple account types may be associated with display preferences identifying information to be displayed via the GUI. Additionally, or alternatively, the process 1200 may include identifying the information to be displayed via the GUI based at least in part on determining that the user account is associated with the account type and/or causing the information to be displayed via the GUI, wherein the information includes a first portion of the information and excludes a second portion of the information.

Additionally, or alternatively, the GUI may include one or more contract information fields configured to receive the input indicating at least one of an identifier of the contract, an identifier of the vendor account, an insurance template indicating a threshold coverage value corresponding to the intellectual-property related obligation, a start date associated with the contract, an end date associated with the contract, and/or a revenue value associated with the first entity.

Additionally, or alternatively, the process 1200 may include determining that the identifier of the vendor account indicates a new vendor account and/or causing the GUI to display one or more vendor account information fields configured to receive the input indicating at least one of a legal name associated with the second entity, contact information associated with the second entity, and/or location information associated with the second entity.

Figure 13:
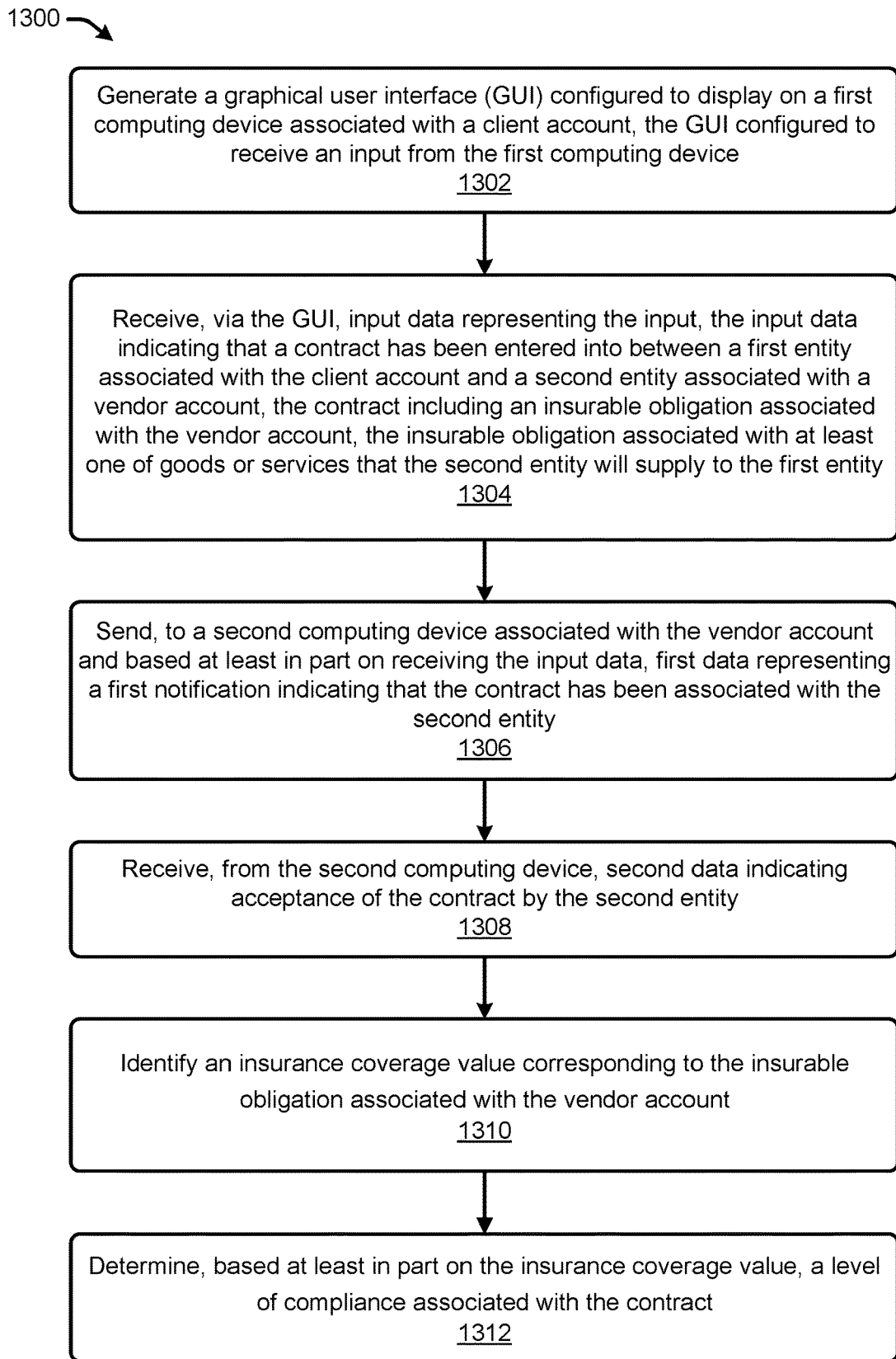
FIG. 13 illustrates an example flow diagram of an example process for generating user interfaces to display on a computing device associated with a client account to receive input data indicating a supply contract including an insurable obligation and provide indications associated with a level of compliance of a vendor account associated with the supply contract.

FIG. 13 illustrates an example flow diagram of an example process 1300 for generating user interfaces to display on a computing device associated with a client account to receive input data indicating a supply contract including an insurable obligation and provide indications associated with a level of compliance of a vendor account associated with the supply contract. The order in which the operations or steps are described is not intended to be construed as a limitation, and any number of the described operations may be combined in any order and/or in parallel to implement process 1300. The operations described with respect to the process 1300 are described as being performed by a client device, and/or remote computing resources associated with the vendor management platform. However, it should be understood that some or all of these operations may be performed by some or all of components, devices, and/or systems described herein.

At block 1302, the process 1300 may include generating a graphical user interface (GUI) configured to display on a first computing device associated with a client account. In some examples, the GUI may be configured to receive an input from the first computing device. The first computing device may be any of the electronic devices 102 and/or remote computing resources 104 described with respect to FIG. 1. Additionally, or alternatively, the GUI may include any of the example user interfaces 300, 600 described with respect to FIGS. 3A-3C and/or FIG. 6.

At block 1304, the process 1300 may include receiving input data representing the input. In some examples, the input data may be received via the GUI. In some examples, the input data may indicate that a contract has been entered into between a first entity associated with the client account and a second entity associated with a vendor account. Additionally, or alternatively, the first entity may be a client and the second entity may be a vendor. In some examples, the contract may indicate that the second entity will supply at least one of goods or services to the first entity. Additionally, or alternatively, the contract may include an insurable obligation associated with the vendor account. In some examples, the insurable obligation may include at least one of an intellectual-property related obligation, a cyber security related obligation, and/or an errors and omissions related obligation.

At block 1306, the process 1300 may include sending, to second computing device associated with the vendor account, first data representing a first notification. Additionally, or alternatively, the sending may be based at least in part on receiving the input data. In some examples, the notification may indicate that the contract has been associated with the second entity. The second computing device may be any of the electronic devices 102 and/or remote computing resources 104 described with respect to FIG. 1.

At block 1308, the process 1300 may include receiving, from the second computing device, second data. In some examples, the second data may indicate acceptance of the contract by the second entity.

At block 1310, the process 1300 may include identifying an insurance coverage value corresponding to the insurable obligation associated with the vendor account. In some examples, the vendor account data associated with the vendor account may indicate the insurance coverage value. For example, the vendor account data may indicate a line of coverage associated with the vendor account. In some examples, the line of coverage may be associated with the insurable obligation. For example, the line of coverage may include an insurance coverage value associated with the insurable obligation.

At block 1312, the process 1300 may include determining a level of compliance associated with the contract. In some examples, the level of compliance may be determined using any of the techniques described above with respect to FIGS. 1 and 2. In some examples, the level of compliance may be based at least in part on the insurance coverage value. For example, the level of compliance may be based at least in part on comparing the insurance coverage value to a threshold coverage value associated with the insurable obligation.

Additionally, or alternatively, the GUI may include one or more contract information fields configured to receive the input indicating at least one of an identifier of the contract, an identifier of the vendor account, an insurance template indicating a threshold coverage value corresponding to the insurable obligation, a start date associated with the contract, an end date associated with the contract, and/or a revenue value associated with the first entity.

Additionally, or alternatively, the process 1300 may include determining that the identifier of the vendor account indicates a new vendor account and/or causing the GUI to display one or more vendor account information fields configured to receive the input indicating at least one of a legal name associated with the second entity, contact information associated with the second entity, and/or location information associated with the second entity.

Additionally, or alternatively, the process 1300 may include determining that the level of compliance does not satisfy a threshold coverage value corresponding to the insurable obligation. In some examples, wherein determining the level of compliance associated with the contract is based at least in part on determining that the insurance coverage value does not satisfy the threshold coverage value.

Additionally, or alternatively, the process 1300 may include determining that the level of compliance satisfies a threshold coverage value corresponding to the insurable obligation. In some examples, wherein determining the level of compliance associated with the contract is based at least in part on determining that the insurance coverage value satisfies the threshold coverage value.

Additionally, or alternatively, the process 1300 may include determining a user account currently logged into the system and/or determining that the user account is associated with an account type of multiple account types. In some examples, individual ones of the multiple account types may be associated with display preferences identifying information to be displayed via the GUI. Additionally, or alternatively, the process 1200 may include identifying the information to be displayed via the GUI based at least in part on determining that the user account is associated with the account type and/or causing the information to be displayed via the GUI, wherein the information includes a first portion of the information and excludes a second portion of the information.

Additionally, or alternatively, the process 1300 may include determining a first level of compliance associated with the contract, at a first time, based at least in part on comparing the insurance coverage value corresponding to the insurable obligation to a threshold coverage value. Additionally, or alternatively, the process 1300 may include determining, at the first time, that the first level of compliance associated with the contract indicates that the vendor is compliant with the contract. Additionally, or alternatively, the process 1300 may include determining, at a second time, a second level of compliance associated with the contract based at least in part on comparing the insurance coverage value to the threshold coverage value. In some examples, the first time is before the second time. Additionally, or alternatively, the process 1300 may include determining, at the second time, that the second level of compliance associated with the contract indicates that the vendor is non-compliant with the contract. Additionally, or alternatively, the process 1300 may include generating a notification to send to the client account, the notification indicating that the vendor is non-compliant with the contract.

Figure 14:
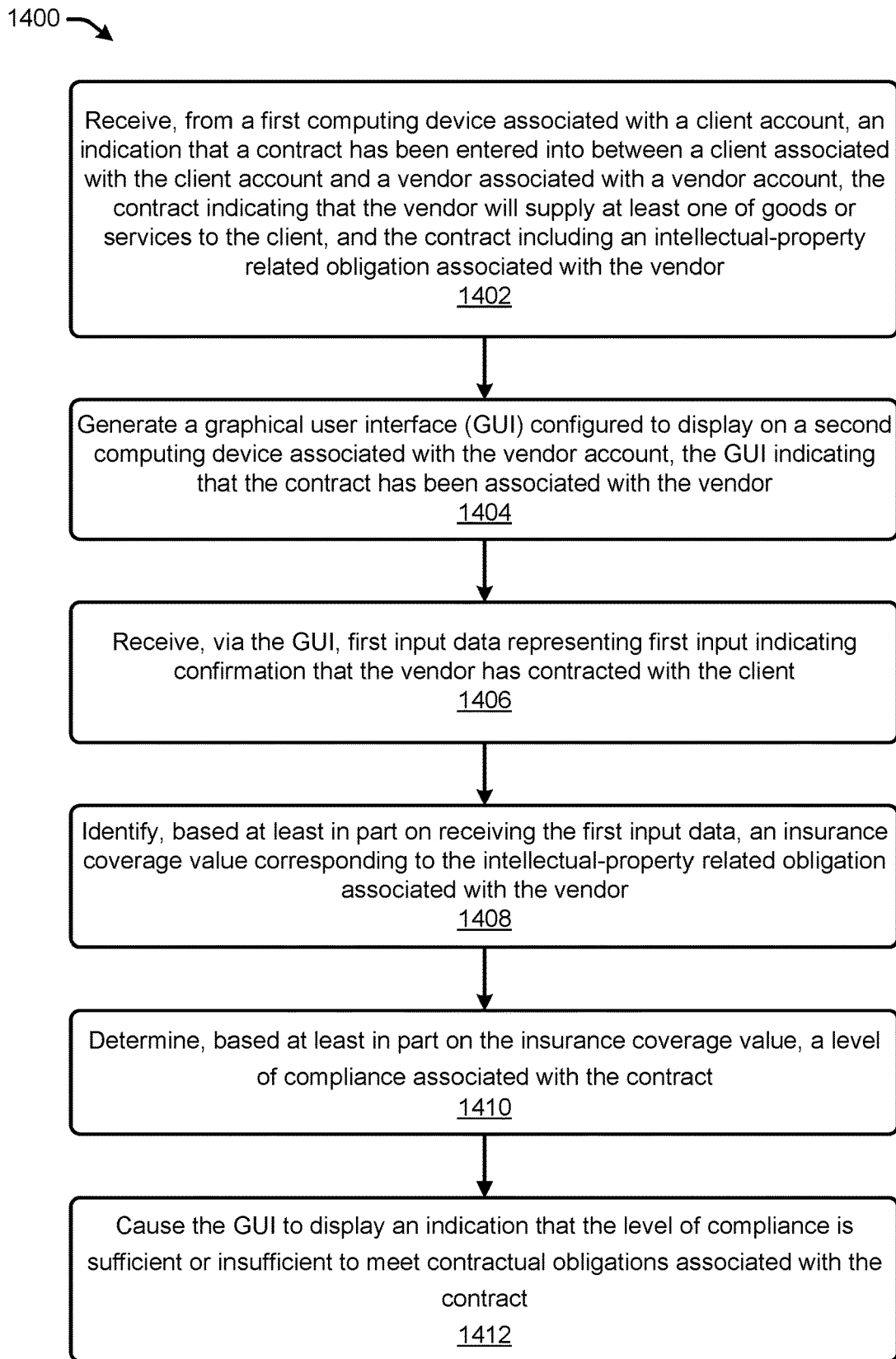
FIG. 14 illustrates an example flow diagram of an example process for generating user interfaces to display on a computing device associated with a vendor account to receive input data indicating a supply contract including an intellectual-property related obligation and provide indications associated with a level of compliance of the vendor account associated with the supply contract.

FIG. 14 illustrates an example flow diagram of an example process 1400 for generating user interfaces to display on a computing device associated with a vendor account to receive input data indicating a supply contract including an intellectual-property related obligation and provide indications associated with a level of compliance of the vendor account associated with the supply contract. The order in which the operations or steps are described is not intended to be construed as a limitation, and any number of the described operations may be combined in any order and/or in parallel to implement process 1400. The operations described with respect to the process 1400 are described as being performed by a vendor device, and/or remote computing resources associated with the vendor management platform. However, it should be understood that some or all of these operations may be performed by some or all of components, devices, and/or systems described herein.

At block 1402, the process 1400 may include receiving, from a first computing device associated with a client account, an indication that a contract has been entered into between a client associated with the client account and a vendor associated with a vendor account. The first computing device may be any of the electronic devices 102 and/or remote computing resources 104 described with respect to FIG. 1. In some examples, that the vendor will supply at least one of goods or services to the client. Additionally, or alternatively, the contract may include an intellectual-property related obligation associated with the vendor.

At block 1404, the process 1400 may include generating a graphical user interface (GUI) configured to display on a second computing device associated with the vendor account. In some examples, the GUI may indicate that the contract has been associated with the vendor. In some examples, the GUI may be configured to receive input data. The second computing device may be any of the electronic devices 102 and/or remote computing resources 104 described with respect to FIG. 1. Additionally, or alternatively, the GUI may include any of the example user interfaces 400, 600 described with respect to FIGS. 4A-4C and/or FIG. 6.

At block 1406, the process 1400 may include receiving, from the second computing device, first input data. In some examples, the first input data may be received via the GUI. Additionally, or alternatively, the first input data may represent first input indicating confirmation that the vendor has contracted with the client.

At block 1408, the process 1400 may include identifying an insurance coverage value corresponding to the intellectual-property related obligation associated with the vendor. In some examples, the insurance coverage value corresponding to the intellectual-property related obligation associated with the vendor may be based at least in part on receiving the first input data. Additionally, or alternatively, the vendor account data associated with the vendor account may include an indication of the insurance coverage value. For example, the vendor account data may indicate a line of coverage associated with the vendor account. In some examples, the line of coverage may be associated with the intellectual-property related obligation. For example, the line of coverage may include an insurance coverage value associated with the intellectual-property related obligation.

At block 1410, the process 1400 may include determining a level of compliance associated with the contract. In some examples, the level of compliance may be determined using any of the techniques described above with respect to FIGS. 1 and 2. In some examples, the level of compliance may be based at least in part on the insurance coverage value. For example, the level of compliance may be based at least in part on comparing the insurance coverage value to a threshold coverage value associated with the intellectual-property related obligation.

At block 1412, the process 1400 may include causing the GUI to display an indication that the level of compliance is sufficient or insufficient to meet contractual obligations associated with the contract.

Additionally, or alternatively, the process 1400 may include determining that the level of compliance does not satisfy a threshold coverage value corresponding to the intellectual-property related obligation. In some examples, wherein determining the level of compliance associated with the contract is based at least in part on determining that the insurance coverage value does not satisfy the threshold coverage value.

Additionally, or alternatively, the process 1400 may include determining that the level of compliance satisfies a threshold coverage value corresponding to the intellectual-property related obligation. In some examples, wherein determining the level of compliance associated with the contract is based at least in part on determining that the insurance coverage value satisfies the threshold coverage value.

Additionally, or alternatively, the process 1400 may include causing the GUI to display an insurance coverage information field configured to receive a second input from the second computing device. In some examples, the GUI may display the insurance coverage information field based at least in part on determining that the insurance coverage value does not satisfy the threshold coverage value. Additionally, or alternatively, the process 1400 may include receiving, via the GUI, second input data representing the second input, the second input data indicating at least one of an insurance company associated with the insurance coverage, a coverage amount associated with the insurance coverage, a deductible amount associated with the insurance coverage, a period of time during which the insurance coverage is valid and/or an extended reporting period associated with the insurance coverage.

Additionally, or alternatively, the process 1400 may include the process(es) 700, 800, and/or 900 described above with respect to FIGS. 7, 8, and/or 9.

Additionally, or alternatively, the process 1400 may include identifying one or more intellectual-property assets associated with the vendor account. In some examples, the one or more intellectual-property assets may include subject matter associated with the at least one of goods or services. Additionally, or alternatively, the process 1400 may include determining, for individual ones of the intellectual-property assets, an intellectual-property asset score indicating at least a respective comparative breadth of an intellectual property asset. Additionally, or alternatively, the process 1400 may include determining that at least one of the intellectual-property asset scores satisfy a threshold intellectual-property asset score. Additionally, or alternatively, the threshold coverage value corresponding to the intellectual-property related obligation may be based at least in part on determining that at least one of the intellectual-property asset scores satisfy the threshold intellectual-property asset score.

Figure 15:
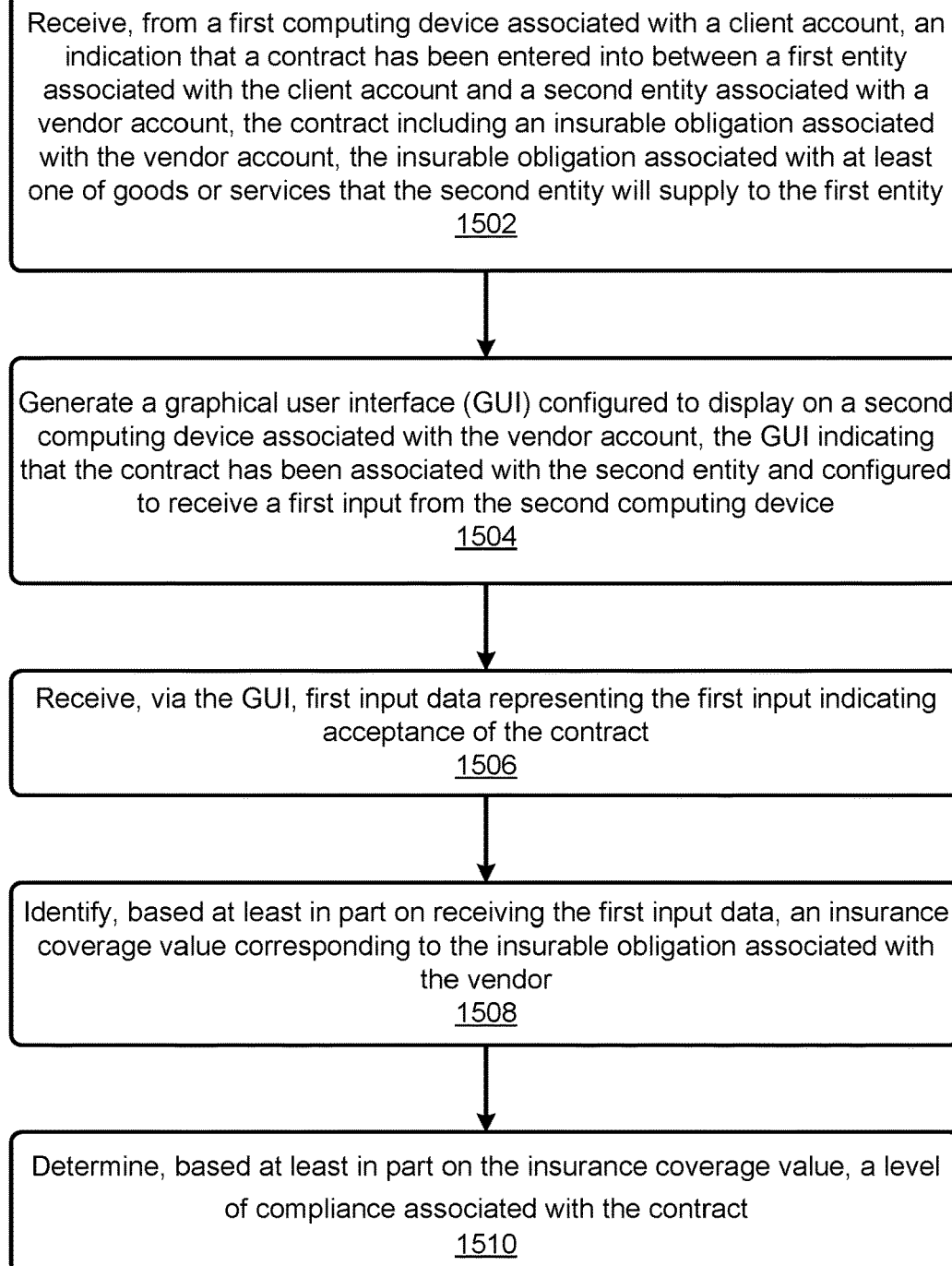
FIG. 15 illustrates an example flow diagram of an example process for generating user interfaces to display on a computing device associated with a vendor account to receive input data indicating a supply contract including an insurable obligation and provide indications associated with a level of compliance of the vendor account associated with the supply contract.

FIG. 15 illustrates an example flow diagram of an example process for generating user interfaces to display on a computing device associated with a vendor account to receive input data indicating a supply contract including an insurable obligation and provide indications associated with a level of compliance of the vendor account associated with the supply contract. The order in which the operations or steps are described is not intended to be construed as a limitation, and any number of the described operations may be combined in any order and/or in parallel to implement process 1500. The operations described with respect to the process 1500 are described as being performed by a vendor device, and/or remote computing resources associated with the vendor management platform. However, it should be understood that some or all of these operations may be performed by some or all of components, devices, and/or systems described herein.

At block 1502, the process 1500 may include receiving, from a first computing device associated with a client account, an indication that a contract has been entered into between a client associated with the client account and a vendor associated with a vendor account. The first computing device may be any of the electronic devices 102 and/or remote computing resources 104 described with respect to FIG. 1. In some examples, that the vendor will supply at least one of goods or services to the client. Additionally, or alternatively, the contract may include an insurable obligation associated with the vendor.

At block 1504, the process 1500 may include generating a graphical user interface (GUI) configured to display on a second computing device associated with the vendor account. In some examples, the GUI may indicate that the contract has been associated with the vendor. In some examples, the GUI may be configured to receive input data. The second computing device may be any of the electronic devices 102 and/or remote computing resources 104 described with respect to FIG. 1. Additionally, or alternatively, the GUI may include any of the example user interfaces 400, 600 described with respect to FIGS. 4A-4C and/or FIG. 6.

At block 1506, the process 1500 may include receiving, from the second computing device, first input data. In some examples, the first input data may be received via the GUI. Additionally, or alternatively, the first input data may represent first input indicating confirmation that the vendor has contracted with the client.

At block 1508, the process 1500 may include identifying an insurance coverage value corresponding to the insurable obligation associated with the vendor. In some examples, the insurance coverage value corresponding to the insurable obligation associated with the vendor may be based at least in part on receiving the first input data. Additionally, or alternatively, the vendor account data associated with the vendor account may include an indication of the insurance coverage value. For example, the vendor account data may indicate a line of coverage associated with the vendor account. In some examples, the line of coverage may be associated with the insurable obligation. For example, the line of coverage may include an insurance coverage value associated with the insurable obligation.

At block 1510, the process 1500 may include determining a level of compliance associated with the contract. In some examples, the level of compliance may be determined using any of the techniques described above with respect to FIGS. 1 and 2. In some examples, the level of compliance may be based at least in part on the insurance coverage value. For example, the level of compliance may be based at least in part on comparing the insurance coverage value to a threshold coverage value associated with the intellectual-property related obligation.

Additionally, or alternatively, the process 1500 may include determining that the level of compliance does not satisfy a threshold coverage value corresponding to the insurable obligation. In some examples, wherein determining the level of compliance associated with the contract is based at least in part on determining that the insurance coverage value does not satisfy the threshold coverage value.

Additionally, or alternatively, the process 1500 may include determining that the level of compliance satisfies a threshold coverage value corresponding to the insurable obligation. In some examples, wherein determining the level of compliance associated with the contract is based at least in part on determining that the insurance coverage value satisfies the threshold coverage value.

Additionally, or alternatively, the process 1500 may include sending, to the vendor account, a notification including an indication that the level of compliance is insufficient to meet contractual obligations associated with the contract based at least in part on determining that the insurance coverage value does not satisfy the threshold coverage value corresponding to the insurable obligation and/or causing the GUI to display the indication that the level of compliance is insufficient to meet the contractual obligations associated with the contract.

Additionally, or alternatively, the process 1500 may include sending, to the vendor account, a notification including an indication that the level of compliance is sufficient to meet contractual obligations associated with the contract based at least in part on determining that the insurance coverage value satisfies the threshold coverage value corresponding to the insurable obligation and/or causing the GUI to display the indication that the level of compliance is sufficient to meet the contractual obligations associated with the contract.

Additionally, or alternatively, the process 1500 may include causing the GUI to display an insurance coverage information field configured to receive a second input from the second computing device. In some examples, the GUI may display the insurance coverage information field based at least in part on determining that the insurance coverage value does not satisfy the threshold coverage value. Additionally, or alternatively, the process 1500 may include receiving, via the GUI, second input data representing the second input, the second input data indicating at least one of an insurance company associated with the insurance coverage, a coverage amount associated with the insurance coverage, a deductible amount associated with the insurance coverage, a period of time during which the insurance coverage is valid and/or an extended reporting period associated with the insurance coverage.

Additionally, or alternatively, the process 1500 may include determining that the insurable obligation is associated with an insurable obligation type of multiple insurable obligation types. In some examples, the individual ones of the multiple insurable obligation types may be associated with insurance criteria identifying information required to obtain an insurance coverage associated with the insurable obligation type. Additionally, or alternatively, the process 1500 may include identifying an insurance application to be displayed via the GUI. In some examples, the insurance application to be display may be based at least in part on the information required to obtain the insurance coverage. Additionally, or alternatively, the process 1500 may include causing the GUI to display the insurance application. In some examples, the insurance application may be configured to receive a second input from the second computing device. Additionally, or alternatively, the process 1500 may include receiving, via the GUI, second input data representing the second input indicating the information required to obtain the insurance coverage. Additionally, or alternatively, the process 1500 may include providing, to the vendor account, an insurance policy including the insurance coverage, the insurance policy configured to increase the level of compliance associated with the contract, such that the insurance policy is sufficient to meet the obligations required by the supply contract.

Additionally, or alternatively, the process 1500 may include the process(es) 700, 800, and/or 900 described above with respect to FIGS. 7, 8, and/or 9.

Figure 16:
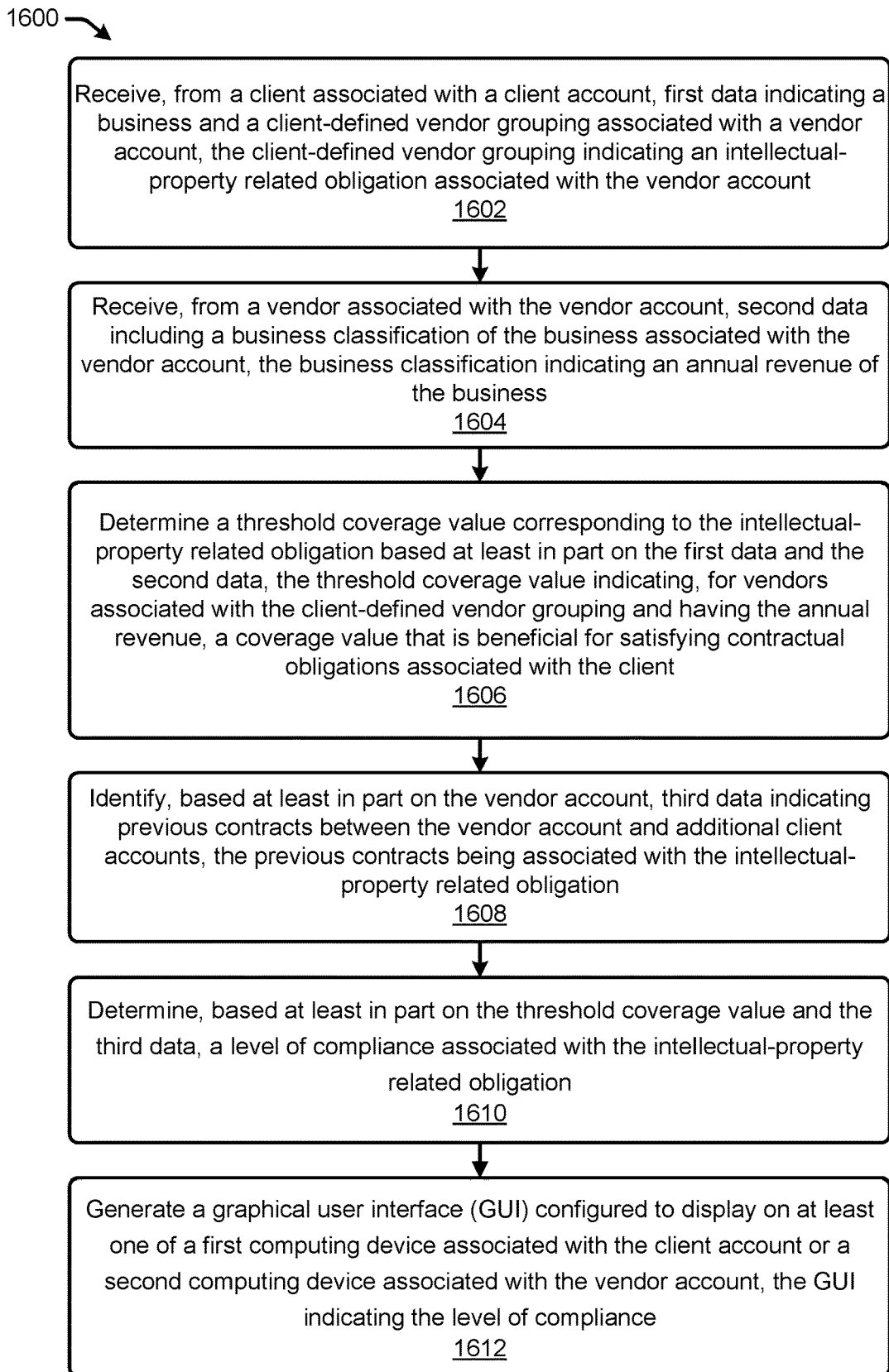
FIG. 16 illustrates an example flow diagram of an example process for the vendor management platform to utilize vendor account data and/or client account data to determine a level of compliance of a vendor account associated with an intellectual-property related obligation required by a supply contract.

FIG. 16 illustrates an example flow diagram of an example process for the vendor management platform to utilize vendor account data and/or client account data to determine a level of compliance of a vendor account associated with an intellectual-property related obligation required by a supply contract. The order in which the operations or steps are described is not intended to be construed as a limitation, and any number of the described operations may be combined in any order and/or in parallel to implement process 1600. The operations described with respect to the process 1600 are described as being performed by a client device, a vendor device, and/or remote computing resources associated with the vendor management platform. However, it should be understood that some or all of these operations may be performed by some or all of components, devices, and/or systems described herein.

At block 1602, the process 1600 may include receiving, from a client associated with a client account, first data. In some examples, the first data may indicate a business and/or a client-defined vendor grouping associated with a vendor account. In some examples, the client-defined vendor grouping may indicate an intellectual-property related obligation associated with the vendor account. In some examples, the client-defined grouping may indicate that the vendor account has entered into a contract with the client account and has been grouped with other vendor accounts based on client-defined criteria.

At block 1604, the process 1600 may include receiving, from a vendor associated with the vendor account, second data. In some examples, the second data may include a business classification of the business associated with the vendor account. In some examples, the business classification indicating an annual revenue of the business.

At block 1606, the process 1600 may include determining a threshold coverage value corresponding to the intellectual-property related obligation. In some examples, the threshold coverage value may be based at least in part on the first data and the second data. Additionally, or alternatively, the threshold coverage value may indicate, for vendors associated with the client-defined vendor grouping and having the annual revenue, a coverage value that is beneficial for satisfying contractual obligations associated with the client.

At block 1608, the process 1600 may include identifying third data indicating previous contracts between the vendor account and additional client accounts. In some examples, the third data may be based at least in part on the vendor account data associated with the vendor account. Additionally, or alternatively, the previous contracts may be associated with the intellectual-property related obligation. In some examples, identifying the third data may include the process 900 described with respect to FIG. 9.

At block 1610, the process 1600 may include determining a level of compliance associated with the intellectual-property related obligation. In some examples, the level of compliance may be determined using any of the techniques described above with respect to FIGS. 1 and 2. In some examples, the based at least in part on threshold coverage value and/or the third data. Additionally, or alternatively, the vendor account data may indicate a line of coverage associated with the vendor account. In some examples, the line of coverage may be associated with the intellectual-property related obligation. For example, the line of coverage may include an insurance coverage value associated with the intellectual-property related obligation, and the level of compliance may be based at least in part on comparing the insurance coverage value to the threshold coverage value associated with the intellectual-property related obligation.

At block 1612, the process 1600 may include generating a graphical user interface (GUI) configured to display on at least one of a first computing device associated with the client account or a second computing device associated with the vendor account. In some examples, the GUI may indicate the level of compliance. The first computing device and/or the second computing device may be any of the electronic devices 102 and/or remote computing resources 104 described with respect to FIG. 1. Additionally, or alternatively, the GUI may include any of the example user interfaces 300, 400, 600 described with respect to FIGS. 3A-4C and/or FIG. 6.

Additionally, or alternatively, the second data may include an industrial classification indicating an industry associated with the vendor account. Additionally, or alternatively, the process 1600 may include identifying a litigation history of the industry based at least in part on the industrial classification. Additionally, or alternatively, the process 1600 may include determining a litigation exposure associated with the industry based at least in part on the litigation history. Additionally, or alternatively, the threshold coverage value corresponding to the intellectual-property related obligation may be based at least in part on the litigation exposure associated with the industry.

Additionally, or alternatively, the process 1600 may include identifying a coverage template associated with the intellectual-property related obligation. In some examples, the coverage templated may be based at least in part on the vendor grouping. Additionally, or alternatively, the coverage template may include the threshold coverage value. Additionally, or alternatively, the process 1600 may include determining that an insurance coverage value associated with the intellectual-property related obligation satisfies the threshold coverage value. Additionally, or alternatively, the process 1600 may include causing the GUI to display an indication that the insurance coverage value associated with the intellectual-property related obligation satisfies the threshold coverage value associated with the intellectual-property related obligation.

Additionally, or alternatively, the process 1600 may include receiving, from the vendor account, fourth data. In some examples, the fourth data may indicate an insurance coverage corresponding to the intellectual-property related obligation. Additionally, or alternatively, the fourth data may include at least one of an insurance company associated with the insurance coverage, a coverage amount associated with the insurance coverage, a deductible amount associated with the insurance coverage, a period of time in which the insurance coverage is valid, an extended reporting period associated with the insurance coverage, and/or a virtual document representing the insurance coverage. Additionally, or alternatively, the process 1600 may include determining that the coverage amount associated with the insurance coverage satisfies the threshold coverage value and/or causing the GUI to display an indication that the coverage amount associated with the insurance coverage satisfies the threshold coverage value. Additionally, or alternatively, the process 1600 may include determining that the coverage amount associated with the insurance coverage does not satisfy the threshold coverage value and/or causing the GUI to display an indication that the coverage amount associated with the insurance coverage does not satisfy the threshold coverage value.

Additionally, or alternatively, the process 1600 may include identifying information for obtaining an insurance coverage associated with the intellectual-property related obligation. In some examples, the information may be based at least in part on the intellectual-property related obligation. Additionally, or alternatively, the process 1600 may include identifying an insurance application to be displayed via the GUI. In some examples, the insurance application to be display may be based at least in part on the information required to obtain the insurance coverage. Additionally, or alternatively, the process 1600 may include causing the GUI to display the insurance application. In some examples, the insurance application may be configured to receive an input from the vendor account. Additionally, or alternatively, the process 1600 may include receiving, from the vendor account, fourth data representing the input indicating the information required to obtain the insurance coverage. Additionally, or alternatively, the process 1600 may include providing, to the vendor account, an insurance policy including the insurance coverage, the insurance policy configured to increase the level of compliance associated with the contract, such that the insurance policy is sufficient to meet the obligations required by the supply contract. Additionally, or alternatively, the process 1600 may include determining that a coverage amount associated with the insurance coverage satisfies the threshold coverage value and/or causing the GUI to display an indication that the coverage amount associated with the insurance coverage satisfies the threshold coverage value.

Additionally, or alternatively, the process 1600 may include identifying fourth data indicating at least one of the business associated with the vendor account, an industry associated with the vendor account, a product associated with the vendor account, and/or a client-specific grouping created by the client account. Additionally, or alternatively, the client-defined vendor grouping may be based at least in part on the fourth data.

Figure 17:
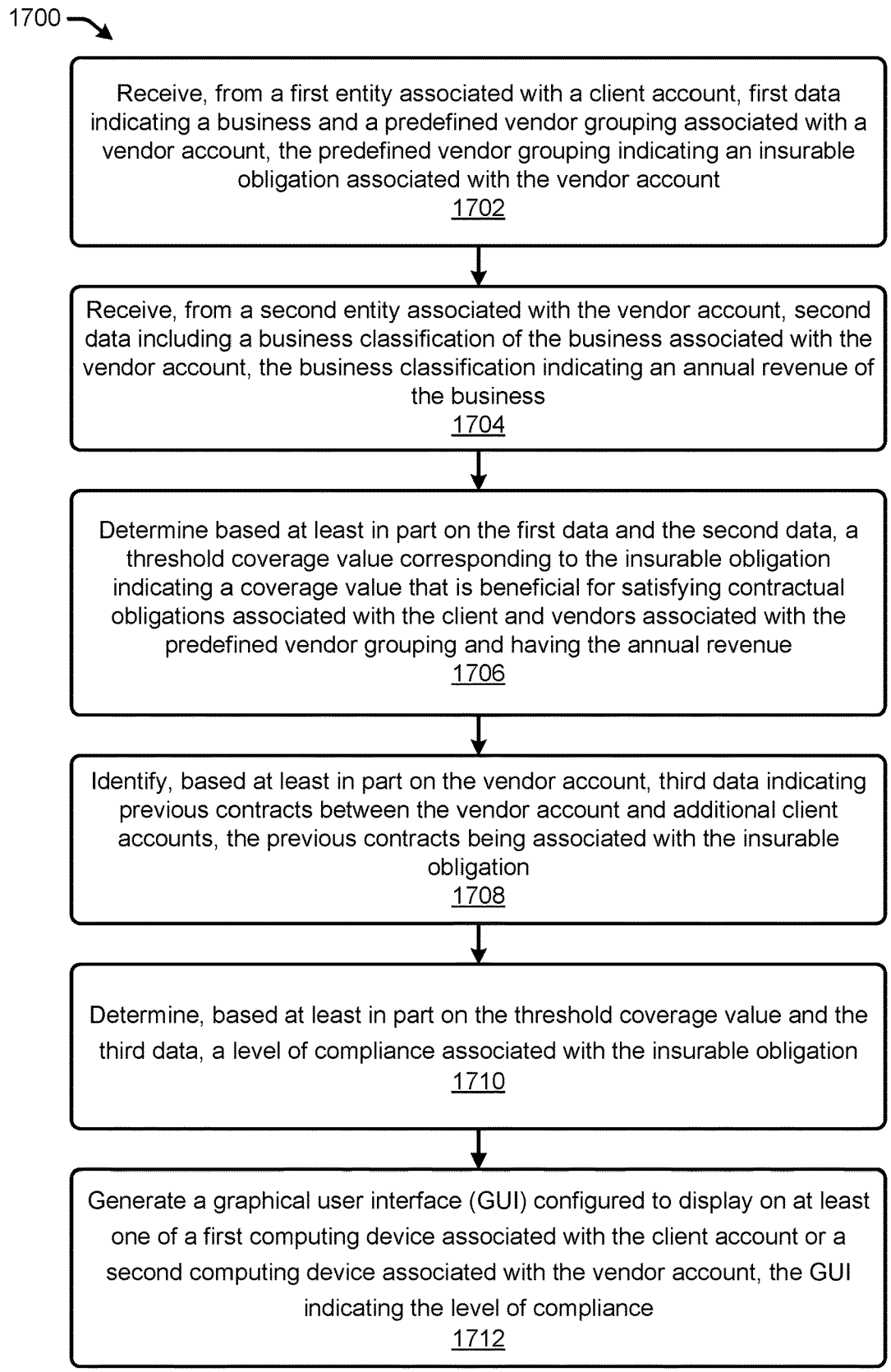
FIG. 17 illustrates an example flow diagram of an example process for the vendor management platform to utilize vendor account data and/or client account data to determine a level of compliance of a vendor account associated with an insurable obligation required by a supply contract.

FIG. 17 illustrates an example flow diagram of an example process for the vendor management platform to utilize vendor account data and/or client account data to determine a level of compliance of a vendor account associated with an insurable obligation required by a supply contract. The order in which the operations or steps are described is not intended to be construed as a limitation, and any number of the described operations may be combined in any order and/or in parallel to implement process 1700. The operations described with respect to the process 1700 are described as being performed by a client device, a vendor device, and/or remote computing resources associated with the vendor management platform. However, it should be understood that some or all of these operations may be performed by some or all of components, devices, and/or systems described herein.

At block 1702, the process 1700 may include receiving, from a client associated with a client account, first data. In some examples, the first data may indicate a business and/or a client-defined vendor grouping associated with a vendor account. In some examples, the client-defined vendor grouping may indicate an insurable obligation associated with the vendor account. In some examples, the client-defined vendor grouping may indicate that the vendor account has entered into a contract with the client account and has been grouped with other vendor accounts based on client-defined criteria.

At block 1704, the process 1700 may include receiving, from a vendor associated with the vendor account, second data. In some examples, the second data may include a business classification of the business associated with the vendor account. In some examples, the business classification indicating an annual revenue of the business.

At block 1706, the process 1700 may include determining a threshold coverage value corresponding to the insurable obligation. In some examples, the threshold coverage value may be based at least in part on the first data and the second data. Additionally, or alternatively, the threshold coverage value may indicate, for vendors associated with the client-defined vendor grouping and having the annual revenue, a coverage value that is beneficial for satisfying contractual obligations associated with the client.

At block 1708, the process 1700 may include identifying third data indicating previous contracts between the vendor account and additional client accounts. In some examples, the third data may be based at least in part on the vendor account data associated with the vendor account. Additionally, or alternatively, the previous contracts may be associated with the intellectual-property related obligation. In some examples, identifying the third data may include the process 900 described with respect to FIG. 9.

At block 1710, the process 1700 may include determining a level of compliance associated with the insurable obligation. In some examples, the level of compliance may be determined using any of the techniques described above with respect to FIGS. 1 and 2. In some examples, the based at least in part on threshold coverage value and/or the third data. Additionally, or alternatively, the vendor account data may indicate a line of coverage associated with the vendor account. In some examples, the line of coverage may be associated with the insurable obligation. For example, the line of coverage may include an insurance coverage value associated with the insurable obligation, and the level of compliance may be based at least in part on comparing the insurance coverage value to the threshold coverage value associated with the insurable obligation.

At block 1712, the process 1700 may include generating a graphical user interface (GUI) configured to display on at least one of a first computing device associated with the client account or a second computing device associated with the vendor account. In some examples, the GUI may indicate the level of compliance. The first computing device and/or the second computing device may be any of the electronic devices 102 and/or remote computing resources 104 described with respect to FIG. 1. Additionally, or alternatively, the GUI may include any of the example user interfaces 300, 400, 600 described with respect to FIGS. 3A-4C and/or FIG. 6.

Additionally, or alternatively, the second data may include an industrial classification indicating an industry associated with the vendor account. Additionally, or alternatively, the process 1700 may include identifying a litigation history of the industry based at least in part on the industrial classification. Additionally, or alternatively, the process 1700 may include determining a litigation exposure associated with the industry based at least in part on the litigation history. Additionally, or alternatively, the threshold coverage value corresponding to the insurable obligation may be based at least in part on the litigation exposure associated with the industry.

Additionally, or alternatively, the process 1700 may include identifying a coverage template associated with the insurable obligation. In some examples, the coverage templated may be based at least in part on the vendor grouping.

Additionally, or alternatively, the coverage template may include the threshold coverage value. Additionally, or alternatively, the process 1700 may include determining that an insurance coverage value associated with the insurable obligation satisfies the threshold coverage value. Additionally, or alternatively, the process 1700 may include causing the GUI to display an indication that the insurance coverage value associated with the insurable obligation satisfies the threshold coverage value associated with the insurable obligation.

Additionally, or alternatively, the process 1700 may include receiving, from the vendor account, fourth data. In some examples, the fourth data may indicate an insurance coverage corresponding to the insurable obligation. Additionally, or alternatively, the fourth data may include at least one of an insurance company associated with the insurance coverage, a coverage amount associated with the insurance coverage, a deductible amount associated with the insurance coverage, a period of time in which the insurance coverage is valid, an extended reporting period associated with the insurance coverage, and/or a virtual document representing the insurance coverage. Additionally, or alternatively, the process 1700 may include determining that the coverage amount associated with the insurance coverage satisfies the threshold coverage value and/or causing the GUI to display an indication that the coverage amount associated with the insurance coverage satisfies the threshold coverage value. Additionally, or alternatively, the process 1700 may include determining that the coverage amount associated with the insurance coverage does not satisfy the threshold coverage value and/or causing the GUI to display an indication that the coverage amount associated with the insurance coverage does not satisfy the threshold coverage value.

Additionally, or alternatively, the process 1700 may include determining that the insurable obligation is associated with an insurable obligation type of multiple insurable obligation types. In some examples, the individual ones of the multiple insurable obligation types may be associated with insurance criteria identifying information required to obtain an insurance coverage associated with the insurable obligation type. Additionally, or alternatively, the process 1700 may include identifying an insurance application to be displayed via the GUI. In some examples, the insurance application to be display may be based at least in part on the information required to obtain the insurance coverage. Additionally, or alternatively, the process 1700 may include causing the GUI to display the insurance application. In some examples, the insurance application may be configured to receive an input from the vendor account. Additionally, or alternatively, the process 1700 may include receiving, from the vendor account, fourth data representing the input indicating the information required to obtain the insurance coverage. Additionally, or alternatively, the process 1700 may include providing, to the vendor account, an insurance policy including the insurance coverage, the insurance policy configured to increase the level of compliance associated with the contract, such that the insurance policy is sufficient to meet the obligations required by the supply contract. Additionally, or alternatively, the process 1700 may include determining that a coverage amount associated with the insurance coverage satisfies the threshold coverage value and/or causing the GUI to display an indication that the coverage amount associated with the insurance coverage satisfies the threshold coverage value.

Additionally, or alternatively, the process 1700 may include identifying fourth data indicating at least one of the business associated with the vendor account, an industry associated with the vendor account, a product associated with the vendor account, and/or a client-specific grouping created by the client account. Additionally, or alternatively, the client-defined vendor grouping may be based at least in part on the fourth data.

Additionally, or alternatively, the process 1700 may include the process 800 described with respect to FIG. 8.

FIG. 18 illustrates an example flow diagram of another example process for the vendor management platform to utilize vendor account data and/or client account data to determine a level of compliance of a vendor account associated with an intellectual-property related obligation required by a supply contract. The order in which the operations or steps are described is not intended to be construed as a limitation, and any number of the described operations may be combined in any order and/or in parallel to implement process 1800. The operations described with respect to the process 1800 are described as being performed by a client device, a vendor device, and/or remote computing resources associated with the vendor management platform. However, it should be understood that some or all of these operations may be performed by some or all of components, devices, and/or systems described herein.

At block 1802, the process 1800 may include receiving, from a client associated with a client account, first data. In some examples, the first data may indicate a business and/or a client-defined vendor grouping associated with a vendor account. In some examples, the client-defined vendor grouping may indicate an insurable obligation associated with the vendor account. In some examples, the client-defined grouping may indicate that the vendor account has entered into a contract with the client account and has been grouped with other vendor accounts based on client-defined criteria.

At block 1804, the process 1800 may include receiving, from a vendor associated with the vendor account, second data. In some examples, the second data may include a business classification of the business associated with the vendor account. In some examples, the business classification indicating an annual revenue of the business.

At block 1806, the process 1800 may include determining a threshold coverage value corresponding to the insurable obligation. In some examples, the threshold coverage value may be based at least in part on the first data and the second data. Additionally, or alternatively, the threshold coverage value may indicate, for vendors associated with the client-defined vendor grouping and having the annual revenue, a coverage value that is beneficial for satisfying contractual obligations associated with the client.

At block 1808, the process 1800 may include determining a level of compliance associated with the insurable obligation. In some examples, the level of compliance may be determined using any of the techniques described above with respect to FIGS. 1 and 2. In some examples, the based at least in part on threshold coverage value. Additionally, or alternatively, the vendor account data may indicate a line of coverage associated with the vendor account. In some examples, the line of coverage may be associated with the insurable obligation. For example, the line of coverage may include an insurance coverage value associated with the insurable obligation, and the level of compliance may be based at least in part on comparing the insurance coverage value to the threshold coverage value associated with the insurable obligation.

At block 1810, the process 1800 may include generating a graphical user interface (GUI) configured to display on at least one of a first computing device associated with the client account or a second computing device associated with the vendor account. In some examples, the GUI may indicate the level of compliance. The first computing device and/or the second computing device may be any of the electronic devices 102 and/or remote computing resources 104 described with respect to FIG. 1. Additionally, or alternatively, the GUI may include any of the example user interfaces 300, 400, 600 described with respect to FIGS. 3A-4C and/or FIG. 6.

Additionally, or alternatively, the second data may include an industrial classification indicating an industry associated with the vendor account. Additionally, or alternatively, the process 1800 may include identifying a litigation history of the industry based at least in part on the industrial classification. Additionally, or alternatively, the process 1800 may include determining a litigation exposure associated with the industry based at least in part on the litigation history. Additionally, or alternatively, the threshold coverage value corresponding to the insurable obligation may be based at least in part on the litigation exposure associated with the industry.

Additionally, or alternatively, the process 1800 may include identifying a coverage template associated with the insurable obligation. In some examples, the coverage templated may be based at least in part on the vendor grouping. Additionally, or alternatively, the coverage template may include the threshold coverage value. Additionally, or alternatively, the process 1800 may include determining that an insurance coverage value associated with the insurable obligation satisfies the threshold coverage value. Additionally, or alternatively, the process 1800 may include causing the GUI to display an indication that the insurance coverage value associated with the insurable obligation satisfies the threshold coverage value associated with the insurable obligation.

Additionally, or alternatively, the process 1800 may include receiving, from the vendor account, third data. In some examples, the third data may indicate an insurance coverage corresponding to the insurable obligation. Additionally, or alternatively, the third data may include at least one of an insurance company associated with the insurance coverage, a coverage amount associated with the insurance coverage, a deductible amount associated with the insurance coverage, a period of time in which the insurance coverage is valid, an extended reporting period associated with the insurance coverage, and/or a virtual document representing the insurance coverage. Additionally, or alternatively, the process 1800 may include determining that the coverage amount associated with the insurance coverage satisfies the threshold coverage value and/or causing the GUI to display an indication that the coverage amount associated with the insurance coverage satisfies the threshold coverage value. Additionally, or alternatively, the process 1800 may include determining that the coverage amount associated with the insurance coverage does not satisfy the threshold coverage value and/or causing the GUI to display an indication that the coverage amount associated with the insurance coverage does not satisfy the threshold coverage value.

Additionally, or alternatively, the process 1800 may include determining that the insurable obligation is associated with an insurable obligation type of multiple insurable obligation types. In some examples, the individual ones of the multiple insurable obligation types may be associated with insurance criteria identifying information required to obtain an insurance coverage associated with the insurable obligation type. Additionally, or alternatively, the process 1800 may include identifying an insurance application to be displayed via the GUI. In some examples, the insurance application to be display may be based at least in part on the information required to obtain the insurance coverage. Additionally, or alternatively, the process 1800 may include causing the GUI to display the insurance application. In some examples, the insurance application may be configured to receive an input from the vendor account. Additionally, or alternatively, the process 1800 may include receiving, from the vendor account, third data representing the input indicating the information required to obtain the insurance coverage. Additionally, or alternatively, the process 1800 may include providing, to the vendor account, an insurance policy including the insurance coverage, the insurance policy configured to increase the level of compliance associated with the contract, such that the insurance policy is sufficient to meet the obligations required by the supply contract. Additionally, or alternatively, the process 1800 may include determining that a coverage amount associated with the insurance coverage satisfies the threshold coverage value and/or causing the GUI to display an indication that the coverage amount associated with the insurance coverage satisfies the threshold coverage value.

Additionally, or alternatively, the process 1800 may include identifying third data indicating at least one of the business associated with the vendor account, an industry associated with the vendor account, a product associated with the vendor account, and/or a client-specific grouping created by the client account. Additionally, or alternatively, the client-defined vendor grouping may be based at least in part on the third data.

Additionally, or alternatively, the process 1800 may include the process(es) 800 and/or 900 described with respect to FIGS. 8 and/or 9.

Figure 19:
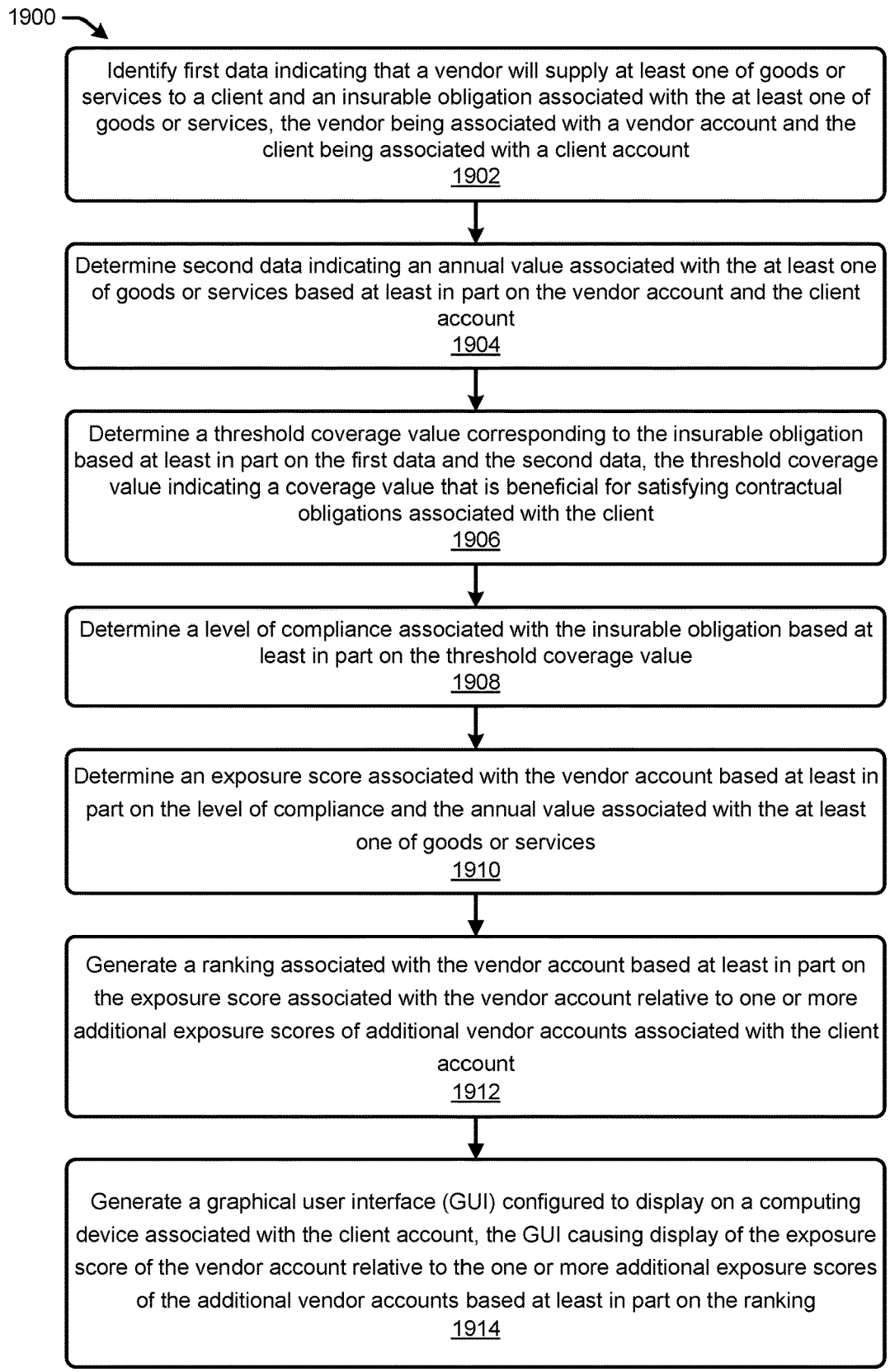
FIG. 19 illustrates an example flow diagram of an example process for the vendor management platform to utilize vendor account data and/or client account data to determine an exposure score associated with a vendor account and rank the vendor accounts associated with a client account based on respective exposure scores of the vendor accounts.

FIG. 19 illustrates an example flow diagram of an example process for the vendor management platform to utilize vendor account data and/or client account data to determine an exposure score associated with a vendor account and rank the vendor accounts associated with a client account based on respective exposure scores of the vendor accounts. The order in which the operations or steps are described is not intended to be construed as a limitation, and any number of the described operations may be combined in any order and/or in parallel to implement process 1900. The operations described with respect to the process 1900 are described as being performed by a client device, a vendor device, and/or remote computing resources associated with the vendor management platform. However, it should be understood that some or all of these operations may be performed by some or all of components, devices, and/or systems described herein.

At block 1902, the process 1900 may include identifying first data. In some examples, the first data may indicate that a vendor will supply at least one of goods or services to a client. Additionally, or alternatively, the first data may indicate an insurable obligation associated with the at least one of goods or services. Additionally, or alternatively, the vendor may be associated with a vendor account and/or the client may be associated with a client account At block 1904, the process 1900 may include determining second data. In some examples, the second data may indicate an annual value associated with the at least one of goods or services. In some examples, the second data may be based at least in part on the vendor account data associated with the vendor account and/or the client account data associated with the client account.

At block 1906, the process 1900 may include determining a threshold coverage value corresponding to the insurable obligation. In some examples, the threshold coverage value may be based at least in part on the first data and/or the second data. Additionally, or alternatively, the threshold coverage value may indicate a coverage value that is beneficial for satisfying contractual obligations associated with the client.

At block 1908, the process 1900 may include determining a level of compliance associated with the insurable obligation. In some examples, the level of compliance may be determined using any of the techniques described above with respect to FIGS. 1 and 2. In some examples, the level of compliance may be based at least in part on the threshold coverage value. Additionally, or alternatively, the vendor account data may indicate a line of coverage associated with the vendor account. In some examples, the line of coverage may be associated with the insurable obligation. For example, the line of coverage may include an insurance coverage value associated with the insurable obligation, and the level of compliance may be based at least in part on comparing the insurance coverage value to the threshold coverage value associated with the insurable obligation.

At block 1910, the process 1900 may include determining an exposure score associated with the vendor account. In some examples, the exposure score may be based at least in part on the level of compliance and/or the annual value associated with the at least one of goods or services. Additionally, or alternatively, the exposure score may represent a level of exposure associated with entering into a contract with the vendor.

At block 1912, the process 1900 may include generating a ranking associated with the vendor account. In some examples, the ranking may be based at least in part on the exposure score associated with the vendor account relative to one or more additional exposure scores of additional vendor accounts associated with the client account.

At block 1914, the process 1900 may include generating a graphical user interface (GUI) configured to display on a computing device associated with the client account. In some examples, the GUI may be configured to display the exposure score of the vendor account relative to the one or more additional exposure scores of the additional vendor accounts. Additionally, or alternatively, the GUI may be configured to display the vendor accounts based at least in part on the ranking.

Additionally, or alternatively, the process 1900 may include identifying third data. In some examples, the third data may indicate an insurance claim history associated with the vendor account. Additionally, or alternatively, the vendor account data may include the third data. Additionally, or alternatively, determining the exposure score associated with the vendor account may be based at least in part on the third data.

Additionally, or alternatively, the process 1900 may include determining that the at least one of goods or services is associated with a product type of multiple product types. In some examples, the individual ones of the multiple product types may indicate a product exposure level. Additionally, or alternatively, determining the exposure score associated with the vendor account may be based at least in part on the product type indicating the product exposure level.

Additionally, or alternatively, the process 1900 may include identifying third data indicating a standard industrial classification associated with the vendor account. In some examples, the standard industrial classification may correspond to an industry. Additionally, or alternatively, the process 1900 may include identifying a litigation history of the industry based at least in part on the standard industrial classification. Additionally, or alternatively, the process 1900 may include determining a litigation exposure associated with the industry based at least in part on the litigation history. Additionally, or alternatively, determining the exposure score associated with the vendor account may be based at least in part on the third data.

Additionally, or alternatively, the process 1900 may include the process(es) 500, 700, 800, and/or 1000 described with respect to FIGS. 5, 7, 8, and/or 10. Additionally, or alternatively, the exposure score associated with the vendor account may be based at least in part on any one of the process(es) 500, 700, 800, and/or 1000.

Figure 20:
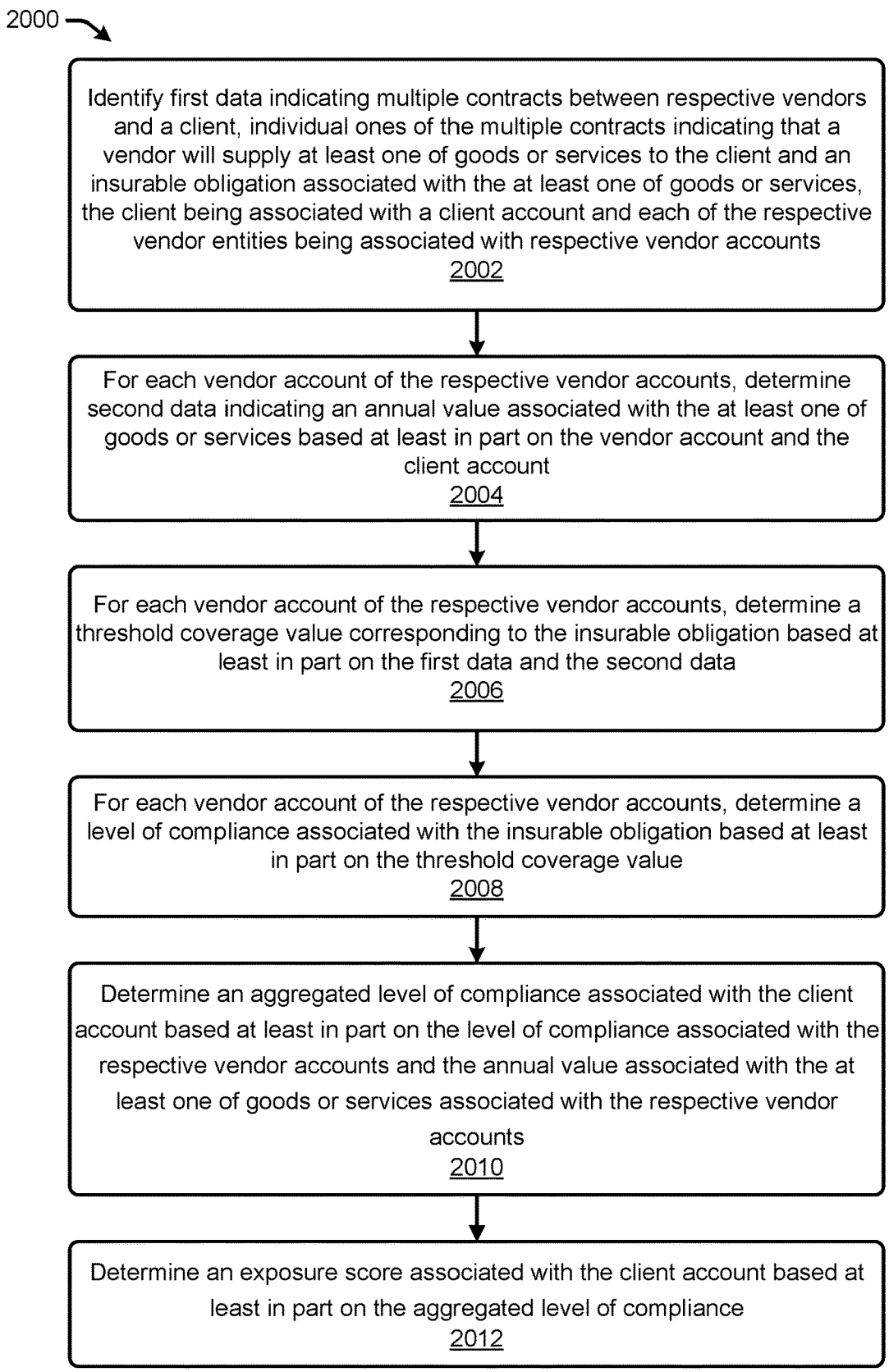
FIG. 20 illustrates an example flow diagram of an example process for the vendor management platform to utilize vendor account data and/or client account data to determine an aggregated level of compliance associated with vendor accounts that are associated with a client account and determine an exposure score of the client account based on the aggregated level of compliance.

FIG. 20 illustrates an example flow diagram of an example process for the vendor management platform to utilize vendor account data and/or client account data to determine an aggregated level of compliance associated with vendor accounts that are associated with a client account and determine an exposure score of the client account based on the aggregated level of compliance. The order in which the operations or steps are described is not intended to be construed as a limitation, and any number of the described operations may be combined in any order and/or in parallel to implement process 2000. The operations described with respect to the process 2000 are described as being performed by a client device, a vendor device, and/or remote computing resources associated with the vendor management platform. However, it should be understood that some or all of these operations may be performed by some or all of components, devices, and/or systems described herein.

At block 2002, the process 2000 may include identifying first data indicating multiple contracts between respective vendors and a client. In some examples, the individual ones of the multiple contracts may indicate that a vendor will supply at least one of goods or services to the client. Additionally, or alternatively, the individual ones of the multiple contracts may indicate an insurable obligation associated with the at least one of goods or services. Additionally, or alternatively, the client may be associated with a client account and/or each of the respective vendor entities may be associated with respective vendor accounts.

At block 2004, the process 2000 may include, for each vendor account of the respective vendor accounts, determining second data indicating an annual value associated with the at least one of goods or services. In some examples, the second data may be based at least in part on vendor account data associated with the vendor account and/or the client account data associated with the client account.

At block 2006, the process 2000 may include, for each vendor account of the respective vendor accounts, determining a threshold coverage value corresponding to the insurable obligation. In some examples, the threshold coverage value may be based at least in part on the first data and/or the second data. Additionally, or alternatively, the threshold coverage value may indicate a coverage value that is beneficial for satisfying contractual obligations associated with the client.

At block 2008, the process 2000 may include, for each vendor account of the respective vendor accounts, determining a level of compliance associated with the insurable obligation. In some examples, the level of compliance may be determined using any of the techniques described above with respect to FIGS. 1 and 2. In some examples, the level of compliance may be based at least in part on the threshold coverage value. Additionally, or alternatively, the vendor account data may indicate a line of coverage associated with the vendor account. In some examples, the line of coverage may be associated with the insurable obligation. For example, the line of coverage may include an insurance coverage value associated with the insurable obligation, and the level of compliance may be based at least in part on comparing the insurance coverage value to the threshold coverage value associated with the insurable obligation.

At block 2010, the process 2000 may include determining an aggregated level of compliance associated with the client account. In some examples, the aggregated level of compliance may be based at least in part on the level of compliance associated with the respective vendor accounts. Additionally, or alternatively, the aggregated level of compliance may be based at least in part on the annual value associated with the at least one of goods or services associated with the respective vendor accounts.

At block 2012, the process 2000 may include determining an exposure score associated with the client account. In some examples, the aggregated exposure score may be based at least in part on the aggregated level of compliance. Additionally, or alternatively, the exposure score may represent a level of exposure associated with all of the contracts between the client and the individual vendors.

Additionally, or alternatively, the process 2000 may include identifying third data indicating a standard industrial classification associated with the client account. In some examples, the standard industrial classification may correspond to an industry. Additionally, or alternatively, the process 1900 may include identifying a litigation history of the industry based at least in part on the standard industrial classification. Additionally, or alternatively, the process 1900 may include determining a litigation exposure associated with the industry based at least in part on the litigation history. Additionally, or alternatively, determining the exposure score associated with the client account may be based at least in part on the third data.

Additionally, or alternatively, the process 2000 may include, for each vendor account of the respective vendor accounts, determining a vendor exposure score associated with the vendor account. In some examples, the vendor exposure score may be based at least in part on the level of compliance and/or the annual value associated with the at least one of goods or services. Additionally, or alternatively, the vendor exposure score may represent a level of exposure associated with entering into a contract with the vendor. Additionally, or alternatively, the process 2000 may include, for each vendor account of the respective vendor accounts, generating a ranking associated with the vendor account. In some examples, the ranking may be based at least in part on the vendor exposure score associated with the vendor account relative to one or more additional vendor exposure scores of additional vendor accounts associated with the client account. Additionally, or alternatively, the process 2000 may include generating a graphical user interface (GUI) configured to display on a computing device associated with the client account. In some examples, the GUI may display the vendor exposure scores of the vendor accounts based at least in part on the ranking.

Additionally, or alternatively, the process 2000 may include, for each vendor account of the respective vendor accounts, determining that the vendor is associated with a vendor type of multiple vendor types. In some examples, the individual ones of the multiple vendor types may be associated with a level of exposure. Additionally, or alternatively, the process 2000 may include determining an aggregated level of exposure associated with the respective vendor accounts. In some examples, the aggregated level of exposure associated with the respective vendor accounts may be based at least in part on the vendor type associated with the respective vendor accounts. Additionally, or alternatively, the process 2000 may include determining the exposure score associated with the client account based at least in part on the aggregated level of exposure.

Additionally, or alternatively, the process 2000 may include the process(es) 500, 700, 800, and/or 1000 described with respect to FIGS. 5, 7, 8, and/or 10. Additionally, or alternatively, the exposure score associated with the client account and/or the individual vendor accounts may be based at least in part on any one of the process(es) 500, 700, 800, and/or 1000.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
one or more computer-readable media storing computer-executable instructions that, when executed by the one or more processors, cause the one or more processors to perform operations comprising:
generating a graphical user interface (GUI) configured to display on a first computing device associated with a client account, the GUI configured to receive, from the first computing device, an input configured to create a contract by defining terms of the contract, the input indicating selection of an insurance template from different insurance templates, the insurance template including a threshold coverage value corresponding to an intellectual-property infringement related obligation;
receiving, via the GUI, input data representing the input configured to create the contract, the input data indicating that the contract has been entered into between a first entity associated with the client account and a second entity associated with a vendor account, the terms of the contract indicating that the second entity will supply at least one of goods or services to the first entity, and the terms of the contract including the threshold insurance coverage value associated with the intellectual-property infringement related obligation associated with the vendor account;
responsive to creating the contract, sending, to a second computing device associated with the vendor account, first data representing a first notification indicating that the contract has been created and associated with the second entity;
receiving, from the second computing device, second data indicating acceptance of the terms of the contract by the second entity;
identifying, by an insurance component associated with the system, an insurance coverage value corresponding to the intellectual-property infringement related obligation associated with the vendor account;

determining, by a compliance component associated with the system and based at least in part on the insurance coverage value and the threshold insurance coverage value, a level of compliance associated with the contract; and causing the GUI to display, on the first computing device, an indication of the level of compliance associated with the contract.

2. The system of claim 1, the operations further comprising:

determining that the insurance coverage value does not satisfy the threshold coverage value corresponding to the intellectual-property related obligation; and wherein determining the level of compliance associated with the contract is based at least in part on determining that the insurance coverage value does not satisfy the threshold coverage value.

3. The system of claim 2, the operations further comprising:

sending, to the client account, a second notification indicating that the vendor account is non-compliant with the contract based at least in part on determining that the insurance coverage value does not satisfy the threshold coverage value corresponding to the intellectual-property related obligation; and causing the GUI to display the second notification indicating that the vendor account is non-compliant with the contract in association with an indicator of the vendor account.

4. The system of claim 2, the operations further comprising:

identifying one or more intellectual-property assets associated with the vendor account, the one or more intellectual-property assets including subject matter associated with the at least one of goods or services;

determining, for individual ones of the intellectual-property assets, an intellectual-property asset score indicating at least a respective comparative breadth of an intellectual property asset;

determining that at least one of the intellectual-property asset scores satisfy a threshold intellectual-property asset score; and wherein the threshold coverage value corresponding to the intellectual-property related obligation is based at least in part on determining that at least one of the intellectual-property asset scores satisfy the threshold intellectual-property asset score.

5. The system of claim 1, the operations further comprising:

determining a user account currently logged into the system;

determining that the user account is associated with an account type of multiple account types, individual ones of the multiple account types associated with display preferences identifying information to be displayed via the GUI;

identifying the information to be displayed via the GUI based at least in part on determining that the user account is associated with the account type; and causing the information to be displayed via the GUI, wherein the information includes a first portion of the information and excludes a second portion of the information.

6. The system of claim 1, wherein the GUI includes one or more contract information fields configured to receive the input indicating at least one of:

an identifier of the contract;
an identifier of the vendor account;
a start date associated with the contract;
an end date associated with the contract; and
a revenue value associated with the first entity.

7. The system of claim 6, the operations further comprising:

determining that the identifier of the vendor account indicates a new vendor account; and causing the GUI to display one or more vendor account information fields configured to receive the input indicating at least one of:

a legal name associated with the second entity;
contact information associated with the second entity; and
location information associated with the second entity.

8. A method comprising:

generating a graphical user interface (GUI) configured to display on a first computing device associated with a client account, the GUI configured to receive, from the first computing device, an input configured to create a contract by defining terms of the contract, the input indicating selection of an insurance template from different insurance templates, the insurance template indicating a threshold coverage value corresponding to an intellectual-property infringement related obligation;

receiving, via the GUI, input data representing the input, the input data indicating that the contract has been entered into between a first entity associated with the client account and a second entity associated with a vendor account, the terms of the contract including the threshold insurance coverage value associated with the intellectual-property infringement related obligation associated with the vendor account;

responsive to creating the contract, sending, to a second computing device associated with the vendor account, first data representing a first notification indicating that the contract has been created and associated with the second entity;

receiving, from the second computing device, second data indicating acceptance of the terms of the contract by the second entity;

identifying, by an insurance component, an insurance coverage value corresponding to the intellectual-property infringement related obligation associated with the vendor account;

determining, by a compliance component and based at least in part on the insurance coverage value, a level of compliance associated with the contract; and causing the GUI to display, on the first computing device, the level of compliance associated with the contract.

9. The method of claim 8, further comprising:

determining a user account currently logged in;

determining that the user account is associated with an account type of multiple account types, individual ones of the multiple account types associated with display preferences identifying information to be displayed via the GUI;

identifying the information to be displayed via the GUI based at least in part on determining that the user account is associated with the account type; and causing the information to be displayed via the GUI, wherein the information includes a first portion of the information and excludes a second portion of the information.

10. The method of claim 8, further comprising:
determining that the insurance coverage value does not satisfy a threshold coverage value corresponding to the intellectual-property related obligation; and
wherein determining the level of compliance associated with the contract is based at least in part on determining that the insurance coverage value does not satisfy the threshold coverage value.

11. The method of claim 10, further comprising:
sending, to the client account, a second notification indicating that the vendor account is non-compliant with the contract based at least in part on determining that the insurance coverage value does not satisfy the threshold coverage value corresponding to the intellectual-property related obligation; and
causing the GUI to display the second notification indicating that the vendor account is non-compliant with the contract in association with an indicator of the vendor account.

12. The method of claim 10, further comprising:
identifying one or more intellectual-property assets associated with the vendor account, the one or more intellectual-property assets including subject matter associated with the at least one of goods or services;
determining, for individual ones of the intellectual-property assets, an intellectual-property asset score indicating at least a respective comparative breadth of an intellectual property asset;
determining that at least one of the intellectual-property asset scores satisfy a threshold intellectual-property asset score; and
wherein the threshold coverage value corresponding to the intellectual-property related obligation is based at least in part on determining that at least one of the intellectual-property asset scores satisfy the threshold intellectual-property asset score.

13. The method of claim 8, wherein the GUI includes one or more contract information fields configured to receive the input indicating at least one of:
an identifier of the contract;
an identifier of the vendor account;
a start date associated with the contract;
an end date associated with the contract; and
a revenue value associated with the first entity.

14. The method of claim 13, further comprising:
determining that the identifier of the vendor account indicates a new vendor account; and
causing the GUI to display one or more vendor account information fields configured to receive the input indicating at least one of:
a legal name associated with the second entity;
contact information associated with the second entity; and
location information associated with the second entity.

15. One or more non-transitory computer-readable media storing computer-executable instructions that, when executed by one or more processors, cause the one or more processors to perform operations comprising:
generating a graphical user interface (GUI) configured to display on a first computing device associated with a client account, the GUI configured to receive, from the first computing device, an input configured to create a contract by defining terms of the contract, the input indicating selection of an insurance template from different insurance templates, the insurance template including a threshold coverage value corresponding to an intellectual-property infringement related obligation;
receiving, via the GUI, input data representing the input, the input data indicating that the contract has been entered into between a first entity associated with the client account and a second entity associated with a vendor account, the terms of the contract including the threshold insurance coverage value associated with the intellectual-property infringement related obligation associated with the vendor account;
sending, to a second computing device associated with the vendor account and in response to creating the contract, first data representing a first notification indicating that the contract has been created and associated with the second entity;
receiving, from the second computing device, second data indicating acceptance of the terms of the contract by the second entity;
identifying, by an insurance component, an insurance coverage value corresponding to the intellectual-property infringement related obligation associated with the vendor account;
determining, by a compliance component and based at least in part on the insurance coverage value and the threshold insurance coverage value, a level of compliance associated with the contract; and
causing the GUI to display, on the first computing device, the level of compliance associated with the contract.

16. The one or more non-transitory computer-readable media of claim 15, the operations further comprising:
determining a user account currently logged in;
determining that the user account is associated with an account type of multiple account types, individual ones of the multiple account types associated with display preferences identifying information to be displayed via the GUI;
identifying the information to be displayed via the GUI based at least in part on determining that the user account is associated with the account type; and
causing the information to be displayed via the GUI, wherein the information includes a first portion of the information and excludes a second portion of the information.

17. The one or more non-transitory computer-readable media of claim 15, the operations further comprising:
determining that the insurance coverage value does not satisfy a threshold coverage value corresponding to the intellectual-property related obligation; and
wherein determining the level of compliance associated with the contract is based at least in part on determining that the insurance coverage value does not satisfy the threshold coverage value.

18. The one or more non-transitory computer-readable media of claim 17, the operations further comprising:
sending, to the client account, a second notification indicating that the vendor account is non-compliant with the contract based at least in part on determining that the insurance coverage value does not satisfy the threshold coverage value corresponding to the intellectual-property related obligation; and
causing the GUI to display the second notification indicating that the vendor account is non-compliant with the contract in association with an indicator of the vendor account.

19. The one or more non-transitory computer-readable media of claim 17, the operations further comprising:
- identifying one or more intellectual-property assets associated with the vendor account, the one or more intellectual-property assets including subject matter associated with the at least one of goods or services;
- determining, for individual ones of the intellectual-property assets, an intellectual-property asset score indicating at least a respective comparative breadth of an intellectual property asset;
- determining that at least one of the intellectual-property asset scores satisfy a threshold intellectual-property asset score; and
- wherein the threshold coverage value corresponding to the intellectual-property related obligation is based at least in part on determining that at least one of the intellectual-property asset scores satisfy the threshold intellectual-property asset score.

20. The one or more non-transitory computer-readable media of claim 15, wherein the GUI includes one or more contract information fields configured to receive the input indicating at least one of:
- an identifier of the contract;
- an identifier of the vendor account;
- a start date associated with the contract;
- an end date associated with the contract; and
- a revenue value associated with the first entity.

* * * * *